(12) United States Patent
Rock et al.

(10) Patent No.: US 7,183,942 B2
(45) Date of Patent: Feb. 27, 2007

(54) SPEED TRAP DETECTION AND WARNING SYSTEM

(75) Inventors: Timothy Michael Rock, Fulham (GB); Mark David Groves, Fulham (GB)

(73) Assignee: Origin Technologies Limited (GB)

( * ) Notice: Subject to any disclaimer, the term of this patent is extended or adjusted under 35 U.S.C. 154(b) by 308 days.

(21) Appl. No.: 10/182,291

(22) PCT Filed: Jan. 25, 2001

(86) PCT No.: PCT/GB01/00290

§ 371 (c)(1),
(2), (4) Date: Jul. 26, 2002

(87) PCT Pub. No.: WO01/55744

PCT Pub. Date: Aug. 2, 2001

(65) Prior Publication Data

US 2003/0052797 A1    Mar. 20, 2003

(30) Foreign Application Priority Data

Jan. 26, 2000 (GB) ................................ 0001808.5
Jul. 13, 2000 (GB) ................................ 0017255.1

(51) Int. Cl.
G08G 1/09 (2006.01)
(52) U.S. Cl. ............... 340/905; 340/901; 340/902; 342/20
(58) Field of Classification Search ............... 340/905, 340/901, 902; 342/20, 357.09
See application file for complete search history.

(56) References Cited

U.S. PATENT DOCUMENTS

| 4,733,356 | A | 3/1988 | Haeussermann et al. |
| 4,737,927 | A | 4/1988 | Hanabusa et al. |
| 4,949,088 | A | 8/1990 | Ryan et al. ................. 342/20 |
| 5,067,081 | A | 11/1991 | Person |
| 5,170,164 | A | 12/1992 | Lewis |
| 5,177,685 | A | 1/1993 | Davis et al. ................. 340/988 |
| 5,184,123 | A | 2/1993 | Bremer et al. ............. 340/995 |
| 5,410,486 | A | 4/1995 | Kishi et al. ................. 340/990 |
| 5,485,161 | A | 1/1996 | Vaughn ....................... 342/357 |

(Continued)

FOREIGN PATENT DOCUMENTS

DE      39 25 057      1/1991

(Continued)

Primary Examiner—Brent A. Swarthout
(74) Attorney, Agent, or Firm—Fogg & Associates, LLC; Scott V. Lundberg

(57) ABSTRACT

A speed trap detection and warning system for a vehicle (9) comprises a GPS or mobile telephone signal receiver and processor which calculates the location of the vehicle (9), the speed thereof and the direction of travel thereof, a memory storing data defining the location of a number of speed traps (5, 6) and alerts the driver if the vehicle is within a predetermined distance of a speed trap and the vehicle's speed is greater than the road speed limit. Also disclosed is a system for calculating the location and speed of a vehicle (9), comparing the calculated data with stored data defining the locations of roads and the speed limits therefor, and alerting the driver if the vehicle's speed exceeds the speed limit for the road on which it is travelling. A further system is disclosed for displaying to the driver the speed limit for the road on which the vehicle is travelling.

30 Claims, 61 Drawing Sheets

U.S. PATENT DOCUMENTS

| | | | | |
|---|---|---|---|---|
| 5,510,793 | A | 4/1996 | Gregg, III et al. | 342/20 |
| 5,523,765 | A | 6/1996 | Ichikawa | |
| 5,717,392 | A | 2/1998 | Eldridge | 340/996 |
| 5,737,225 | A | 4/1998 | Schulte | 364/443 |
| 5,767,795 | A | 6/1998 | Schaphorst | 340/988 |
| 5,774,071 | A | 6/1998 | Konishi et al. | 340/988 |
| 5,902,350 | A | 5/1999 | Tamai et al. | 701/211 |
| 5,904,728 | A | 5/1999 | Tamai et al. | 701/211 |
| 5,924,653 | A | 7/1999 | Pedersen et al. | 246/167 R |
| 5,977,884 | A | 11/1999 | Ross | |
| 6,084,543 | A | 7/2000 | Iizuka | 701/205 |
| 6,118,403 | A * | 9/2000 | Lang | 342/357.09 |
| 6,204,798 | B1 * | 3/2001 | Fleming, III | 342/20 |
| 6,384,776 | B1 * | 5/2002 | Martin | 342/357.09 |
| 6,670,905 | B1 * | 12/2003 | Orr | 342/20 |
| 6,895,324 | B2 * | 5/2005 | Straub | 701/93 |

FOREIGN PATENT DOCUMENTS

| | | |
|---|---|---|
| DE | 42 19 171 A1 | 1/1993 |
| DE | 41 26 495 A1 | 2/1993 |
| DE | 43 27 780 | 3/1994 |
| DE | 196 04 892 | 7/1997 |
| EP | 0 303 371 | 2/1989 |
| EP | 0 440 105 A2 | 8/1991 |
| EP | 0 441 489 A2 | 8/1991 |
| EP | 0 508 787 | 10/1992 |
| EP | 0 524 814 A2 | 1/1993 |
| EP | 0 539 143 A2 | 4/1993 |
| EP | 0 720 137 | 7/1996 |
| EP | 0 782 118 A1 | 7/1997 |
| EP | 0 789 344 | 8/1997 |
| EP | 0 836 074 | 4/1998 |
| EP | 0 840 269 | 5/1998 |
| EP | 0 875 729 | 11/1998 |
| FR | 2 778 240 | 4/1998 |
| FR | 2 785 384 | 11/1998 |
| GB | 2 283 353 | 5/1995 |
| GB | 2 324 605 A | 10/1998 |
| GB | 2 353 160 | 2/2001 |
| GB | 2 353 647 | 2/2001 |
| GB | 2 353 650 | 2/2001 |
| GB | 2377106 A | 12/2002 |
| JP | 5-93631 | 4/1993 |
| JP | 07 334795 | 12/1995 |
| JP | 09027096 | 1/1997 |
| JP | 9-311996 | 12/1997 |
| WO | WO 97/11384 | 3/1987 |
| WO | WO 92/02891 | 2/1992 |
| WO | WO 92/04683 | 3/1992 |
| WO | WO 93/09510 | 5/1993 |
| WO | WO 93/20546 | 10/1993 |
| WO | WO 94/27268 | 11/1994 |
| WO | WO 95/06304 | 3/1995 |
| WO | WO 95/19021 | 7/1995 |
| WO | WO 97/47095 | 12/1997 |
| WO | WO 99/11086 | 3/1999 |
| WO | WO 99/21028 | 4/1999 |
| WO | WO 99/63308 | 12/1999 |
| WO | WO 00/29811 | 5/2000 |
| WO | WO 00/29869 | 5/2000 |
| WO | WO 00/77539 A1 | 12/2000 |

* cited by examiner

SPEED TRAP DETECTION AND WARNING SYSTEM

This invention relates to a speed trap detection and warning system for alerting the driver of a vehicle to the presence of a nearby speed trap, such as a speed camera, radar gun detector etc. The invention also relates to a system for alerting the driver of a vehicle to the speed limit of the road on which the vehicle is travelling.

Speed traps of a number of different types are used in increasing numbers by law enforcement authorities around the world. Originally used at accident black spots to cause motorists to reduce speed and therefore reduce accidents, speed traps are now being used in many other locations to generate revenue through speed fines.

Speed traps fall into one of two categories; active traps and passive traps.

Active traps work by transmitting a signal towards a vehicle and measuring time delay, Doppler effects or other parameters to measure the speed of the vehicle. These traps typically use radar or laser light for detection. Examples include Gatso cameras used on UK roads, which record license plate numbers on film, and digital cameras, which store or transmit license plate numbers electronically. Active speed traps may operate from fixed or mobile sites.

Passive traps work by identifying a vehicle at a first position and at a second position. By knowing the distance between the first and second positions and the time taken for the vehicle to travel between the first and second positions, the average speed of the vehicle can be determined. Examples include VASCAR type detectors and SPECS type detectors. Passive speed traps are typically only deployed at fixed sites although some are deployed as mobile units.

A number of methods exist for locating a speed trap. One such method is visual spotting—that is, the driver of a vehicle may see a speed trap as he approaches it. The driver may therefore undertake rapid braking to ensure that his vehicle is travelling at a speed less than the speed limit when it passes the speed trap. This has the problem that undertaking rapid braking is in many circumstances very dangerous and can easily cause accidents.

Another method of detecting speed traps is to use an apparatus for detecting radar signals. Such an apparatus works by detecting the radar signals from a radar operated speed trap and provides an alert that radar signals are incident on the vehicle. Such a system suffers from a number of problems, however. In particular, the driver of a vehicle is only alerted once the radar beam from the speed trap is incident on his vehicle. The driver may therefore undertake extremely rapid braking to ensure that the average speed of his vehicle as detected by the speed trap is below the speed limit. Further, radar detectors will not detect active speed traps using laser light or passive speed traps. Yet further, radar detectors have an additional problem that they may be set off by things other than speed traps which operate on similar frequencies. For example, traffic lights, building alarm systems and petrol stations may trigger a radar detector. The radar detector may therefore provide many false alarms, thereby reducing the usefulness of the detector since it is irritating to the driver and encourages the driver to undertake rapid braking regularly and, from the point of view of other road users, at random.

A further method of detecting speed traps is to detect incident light from active speed traps utilising laser light. As with a radar detector, a laser detector alerts the driver only when a laser beam is incident on his vehicle, and will not detect speed traps utilising other detection methods.

It is therefore the object of this invention to address one or more of the above problems.

According to the present invention, there is provided an apparatus and method for alerting the driver of a vehicle to a speed trap by monitoring the position of the vehicle, using a stored speed trap database to determine whether the vehicle is within a predetermined distance of a speed trap and whether the speed trap is a threat, and alerting the driver to a speed trap which is a threat.

By selecting the distance from the speed trap at which the driver is alerted to be relatively large, safety is increased because the driver is given more time to reduce speed progressively.

Whether a speed trap is a threat may be determined in any of a number of ways. For example, the direction of travel of the vehicle may be compared with stored data defining the operating direction of the speed trap. In addition, or instead, whether the vehicle is travelling towards or away from the speed trap may be determined.

In addition or instead, the speed of the vehicle may be compared with stored data defining the road speed limit at the speed trap. In addition or instead, a laser, radar or any other suitable electromagnetic wave detector may be enabled to detect whether incident radiation from the speed trap is present and hence whether the speed trap is a threat.

The processing functions according to the invention may be split between one or more units carried in the vehicle and one or more remote units. Accordingly, the present invention also comprises each separate unit.

The present invention further provides an apparatus and method for warning the driver of a vehicle of the road speed limit on which the vehicle is travelling, in which the position of the vehicle is calculated, and stored data defining road positions and speed limits thereof is used to display to the driver the speed limit for the road on which the vehicle is travelling. Optionally, the speed of the vehicle may be calculated and the driver warned if the vehicle speed exceeds the road speed limit.

The present invention further provides an apparatus and method for alerting the driver of a vehicle to an active speed trap, in which the position of the vehicle is monitored against stored sped trap locations and, when the vehicle comes within a predetermined distance of a speed trap, one or more electromagnetic wave detectors (such as a laser detector and/or radar detector) is activated to warn the driver if incident radiation from the speed trap is detected.

In this way, false alarms from the electromagnetic wave detector(s) are reduced.

The present invention also provides a method and apparatus for transferring database data for use in the above systems (for example data defining the locations of speed traps) to an apparatus, in which database data is stored and, upon receiving a request for data, the request is processed, and the database data is sent to the requesting apparatus.

In this way, a central database (for example of speed traps) can be maintained and updated each time there is a change to the data (for example when a new speed trap is added on a road), and the apparatus can access and download data from the remote database so as to maintain an up-to-date database.

Embodiments of the present invention will now be described, by way of example only, with reference to the accompanying figures in which.

Figure 5A:
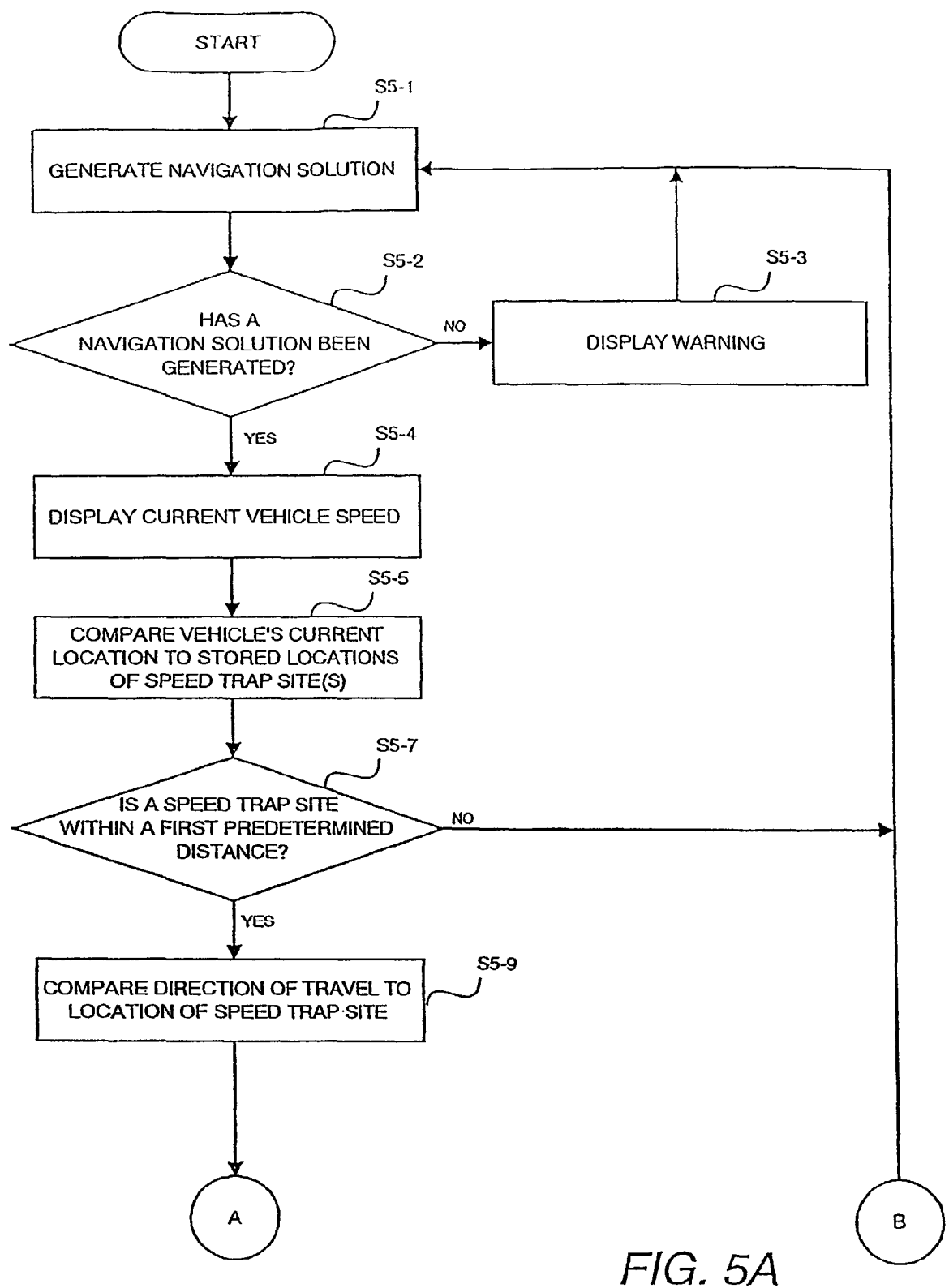
Figure 5B:
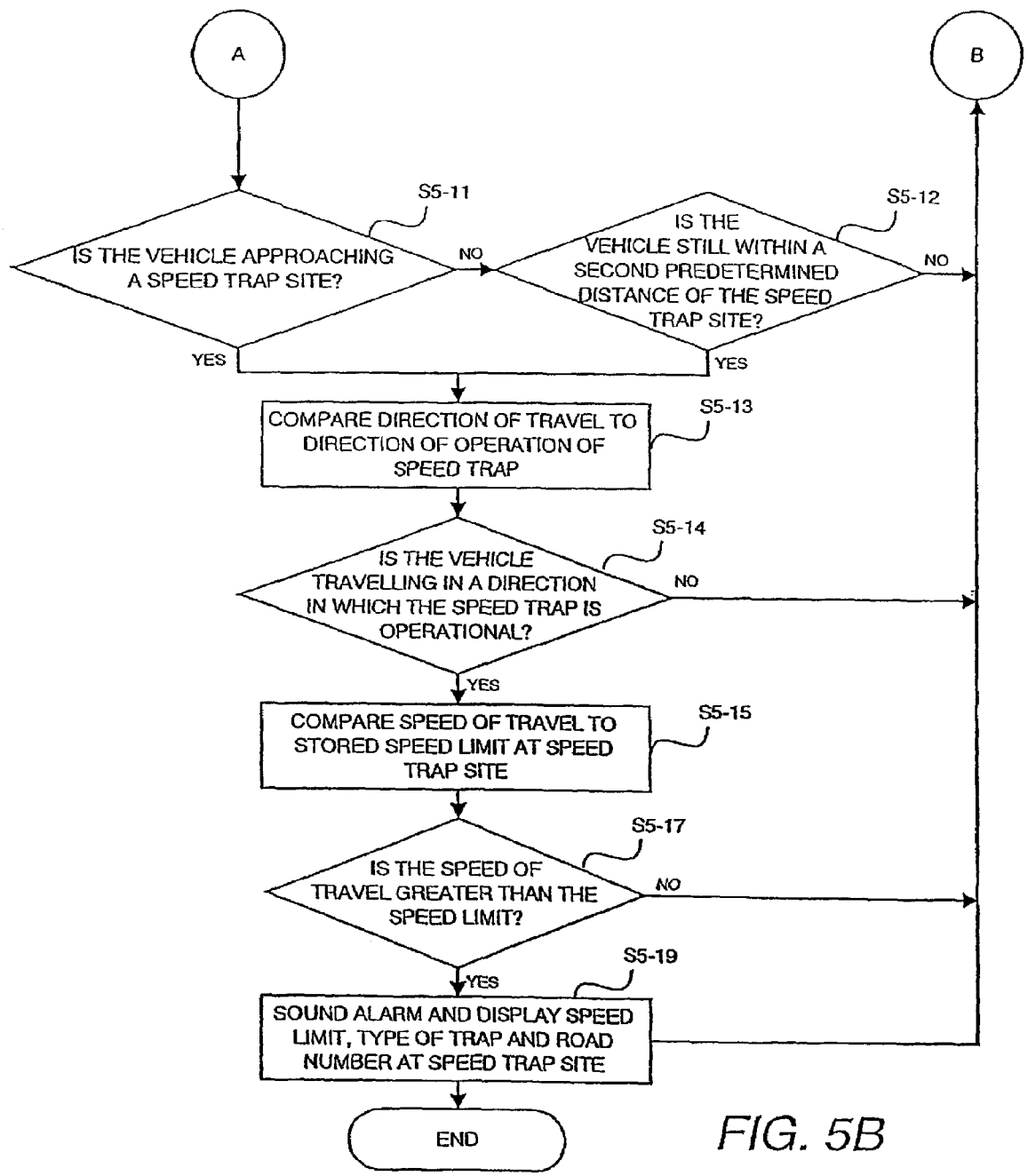
Figure 6:
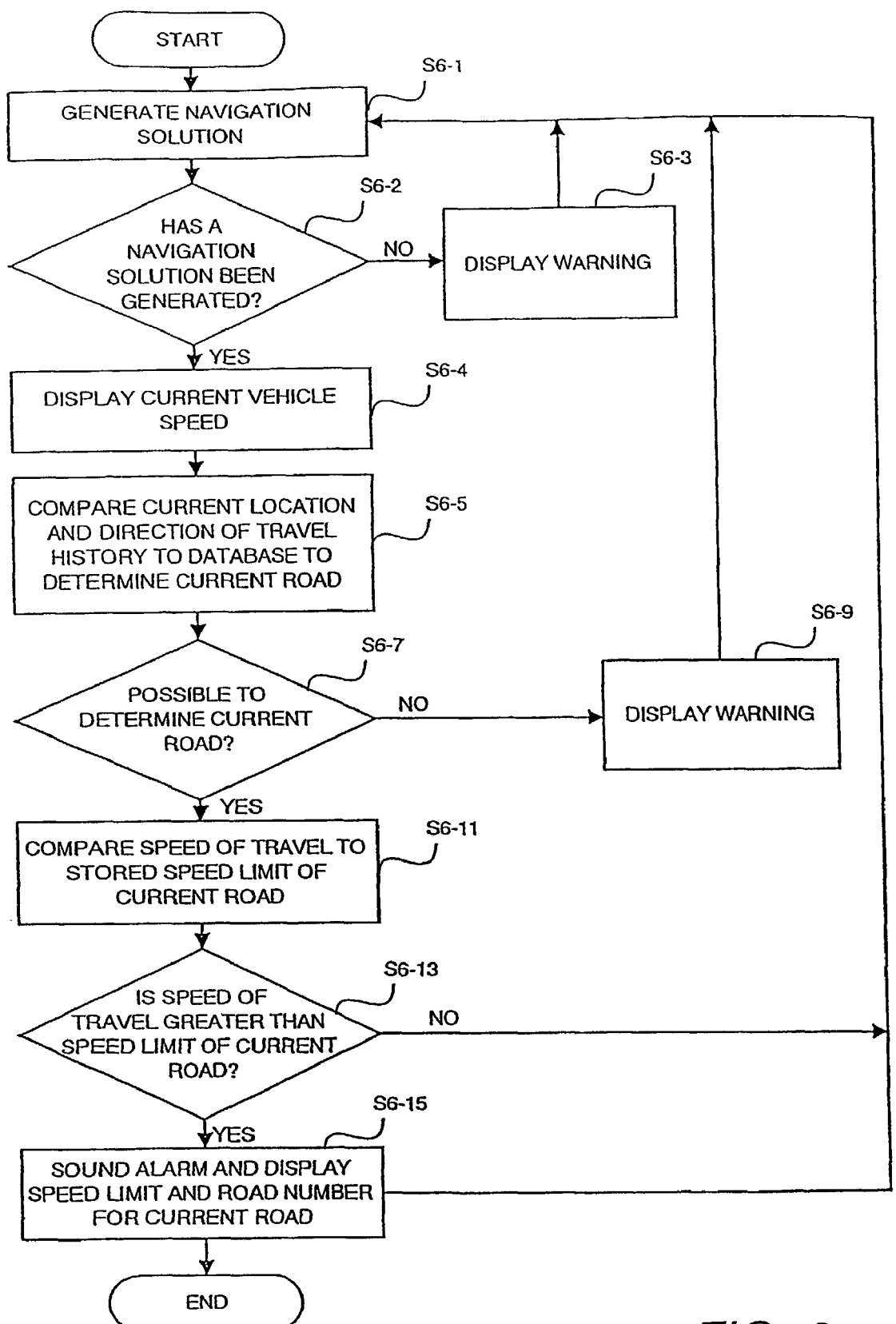
Figure 7:
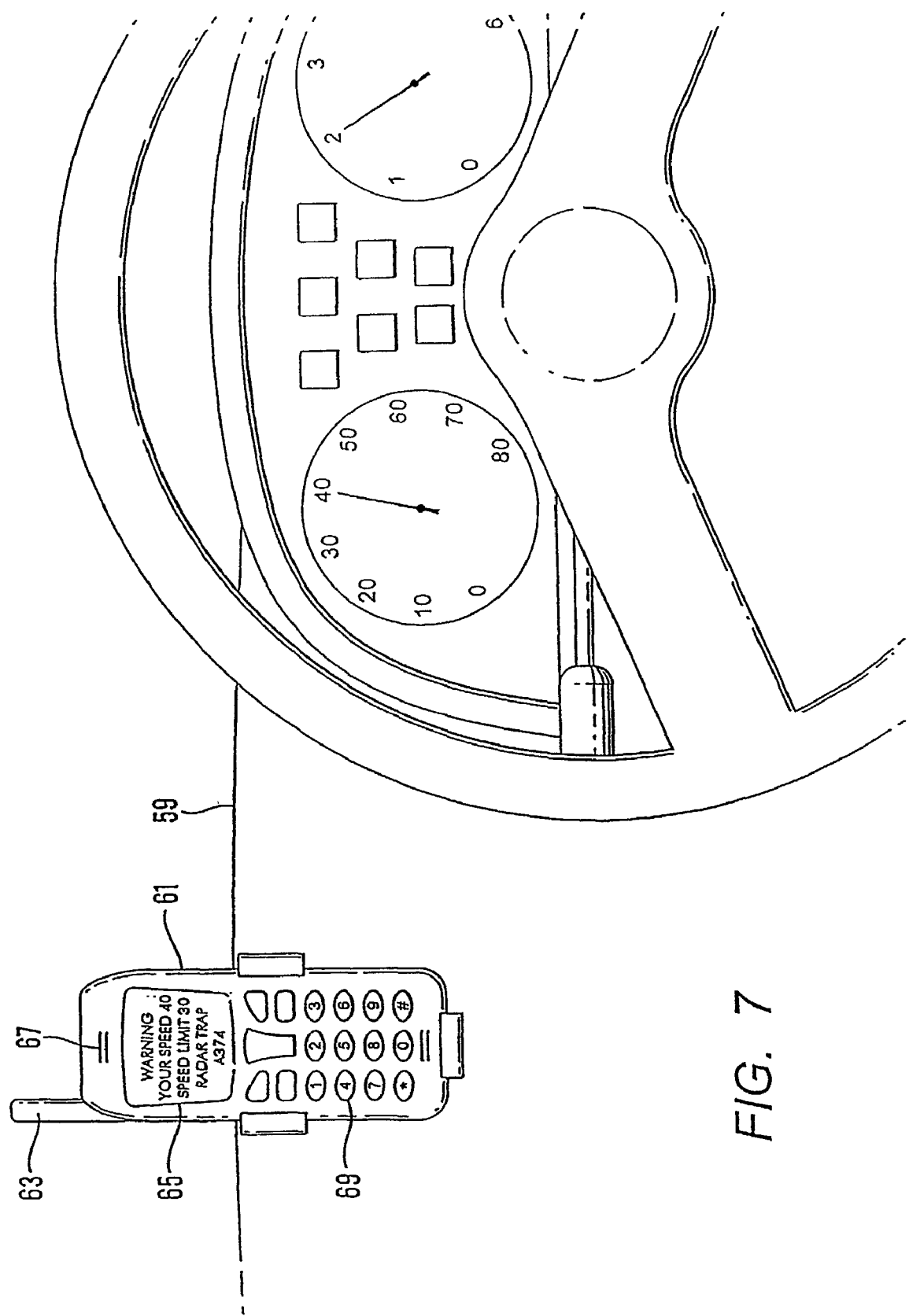
Figure 8:
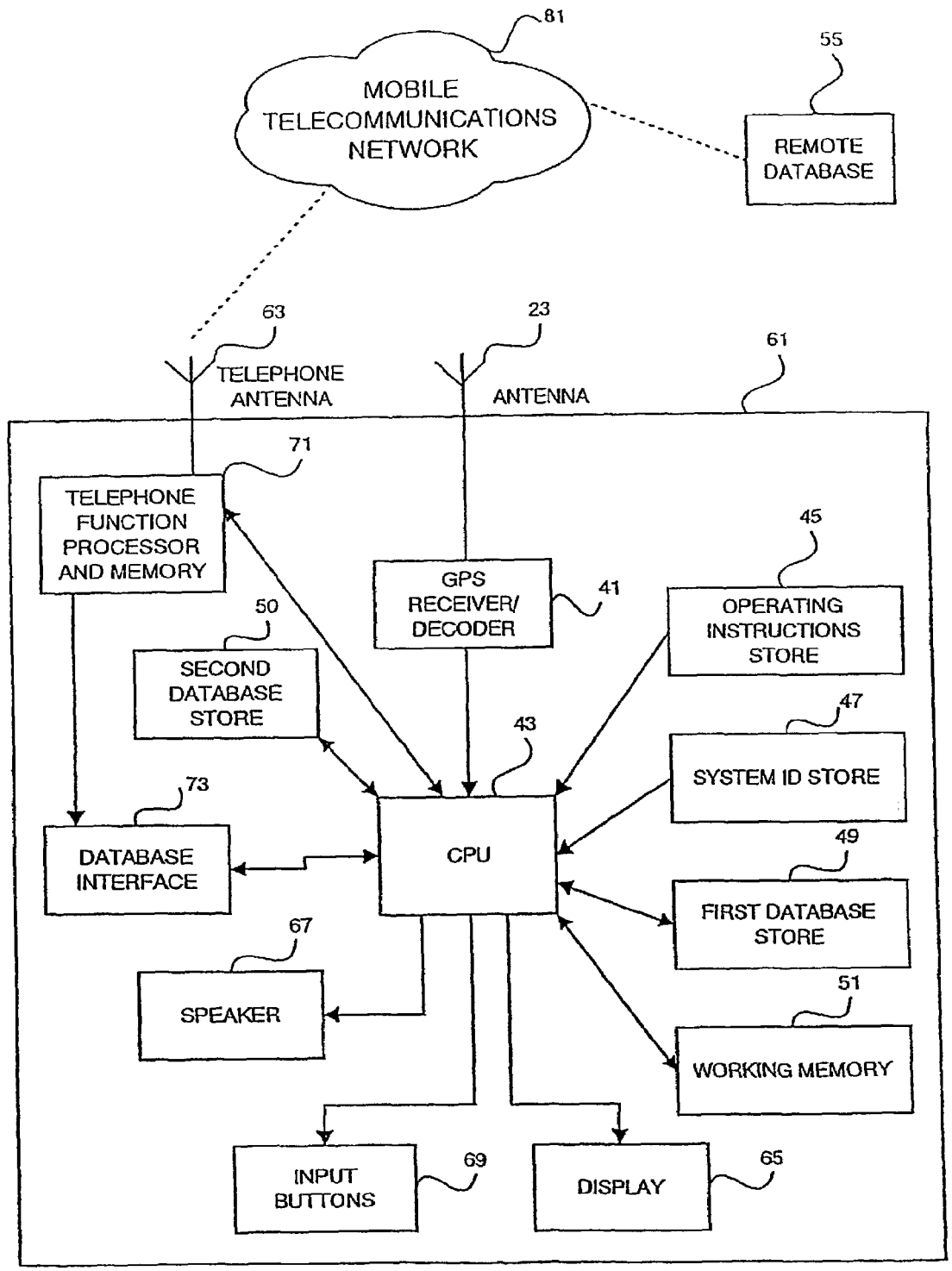
Figure 9A:
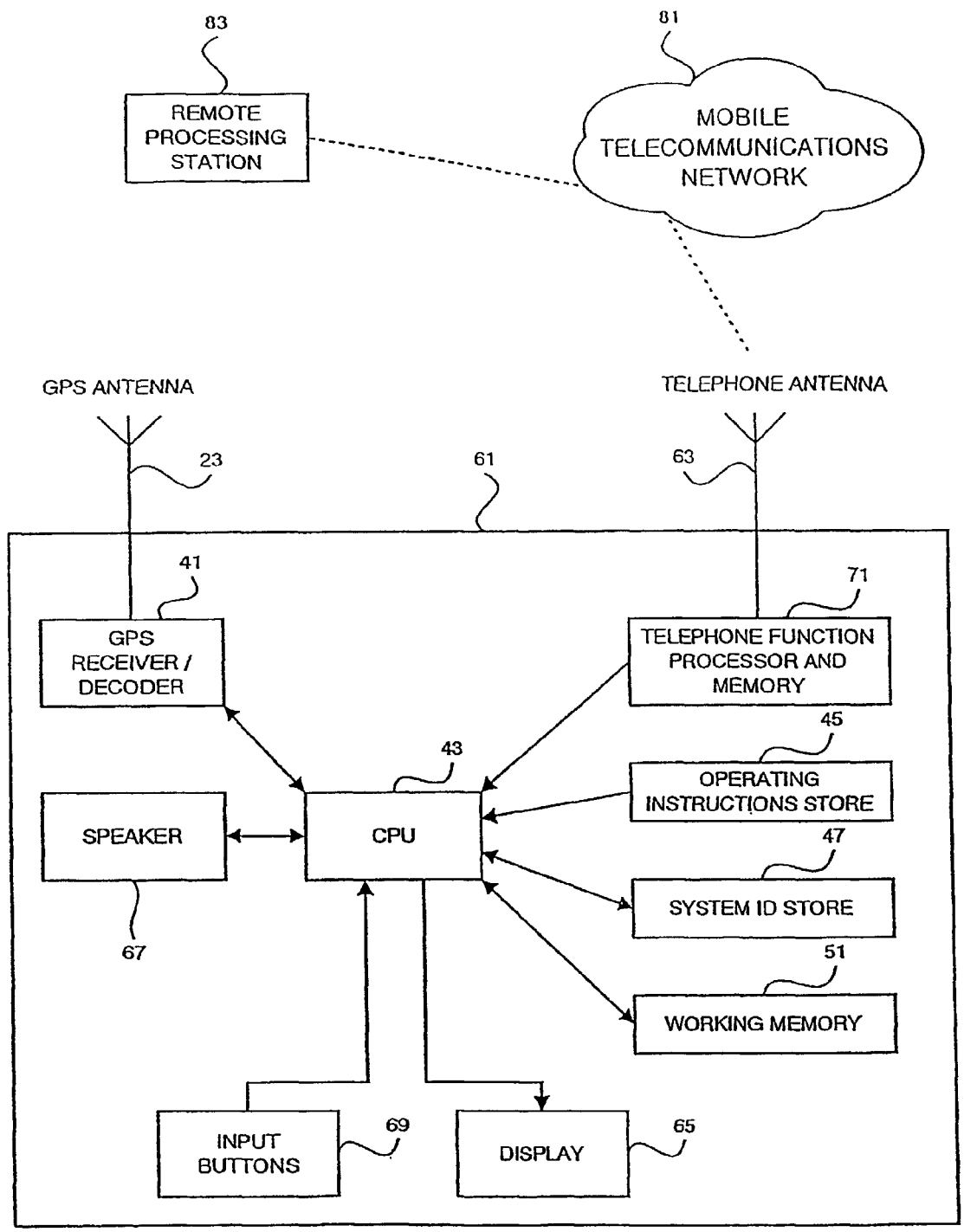
Figure 9B:
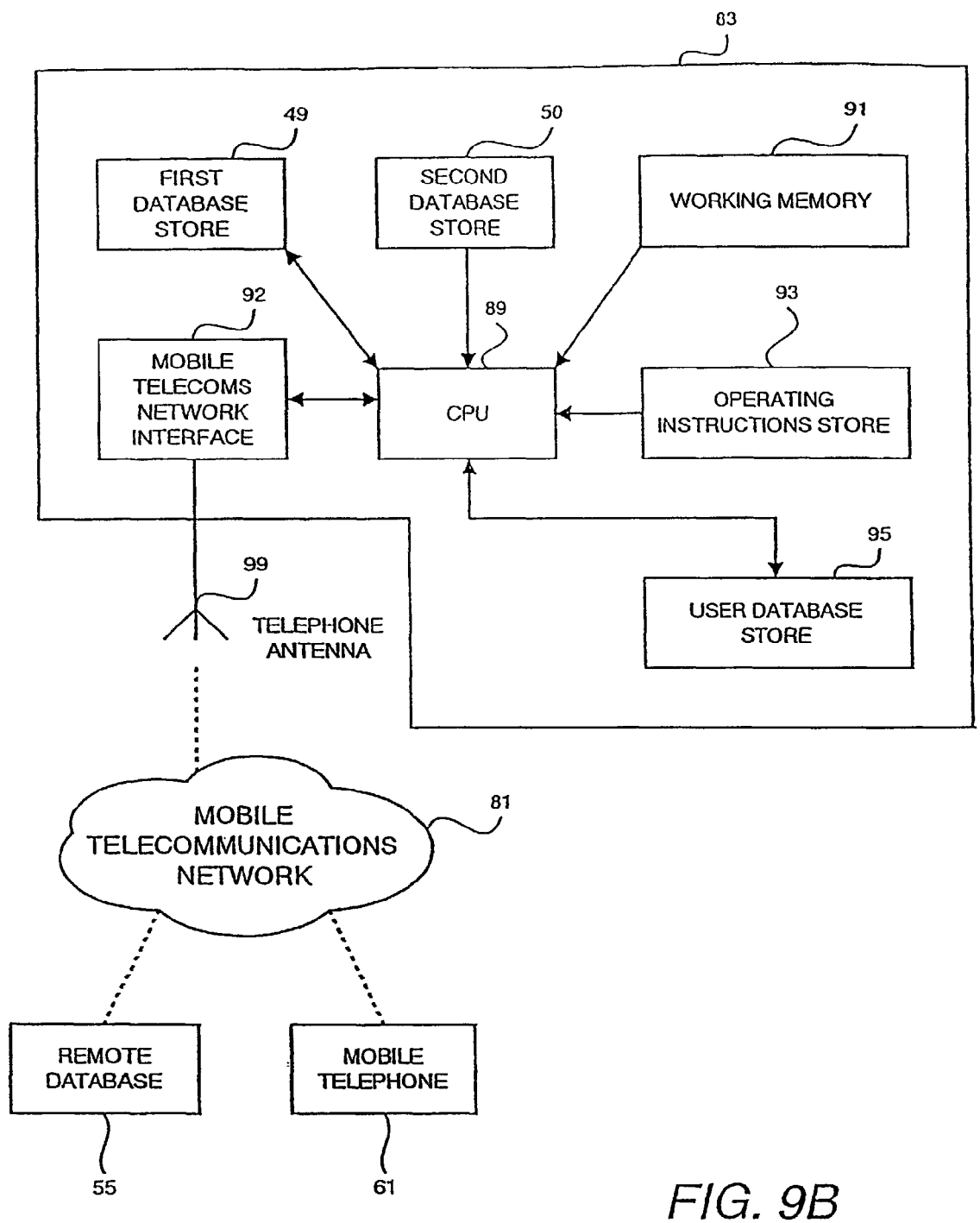
Figure 10A:
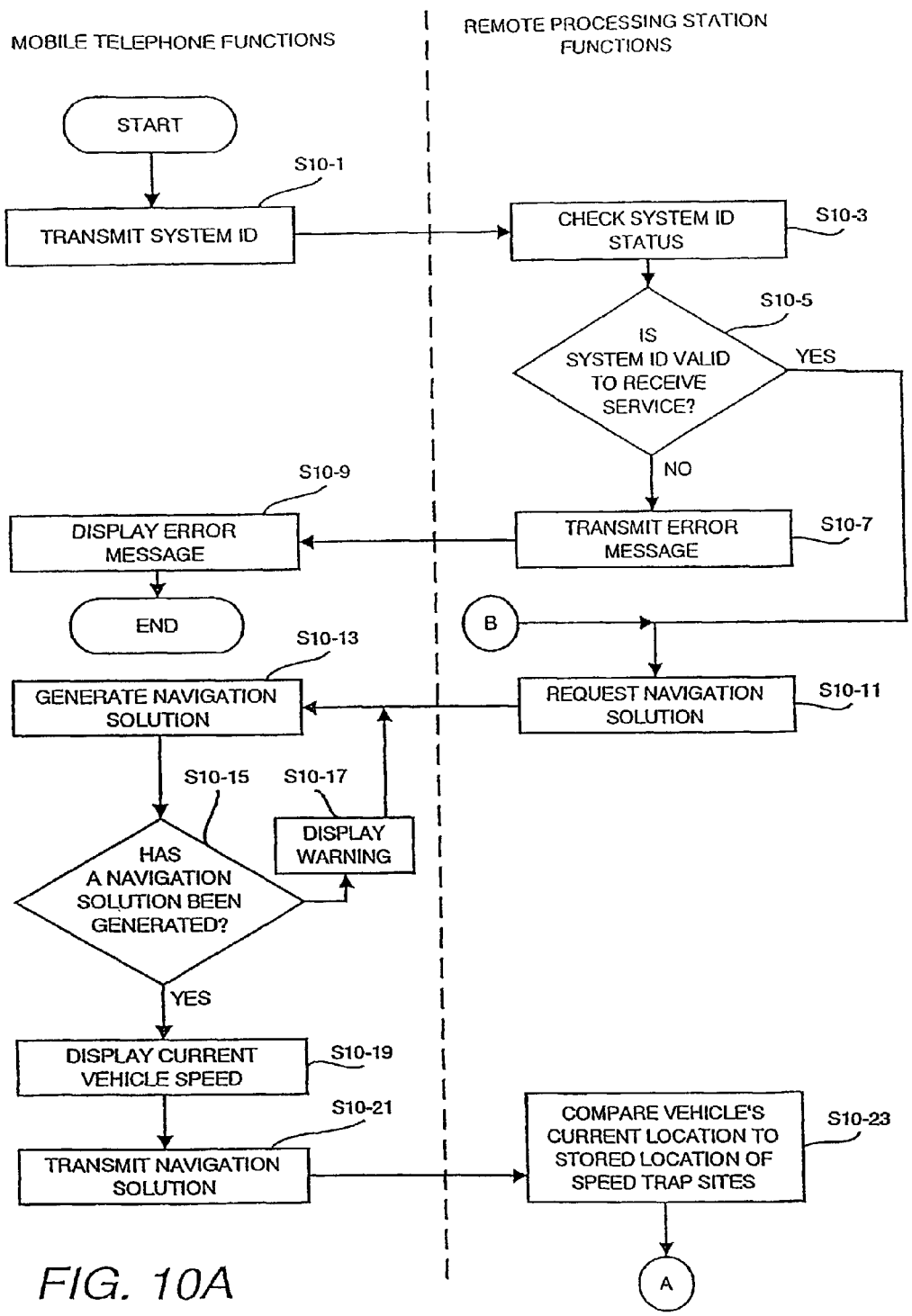
Figure 10B:
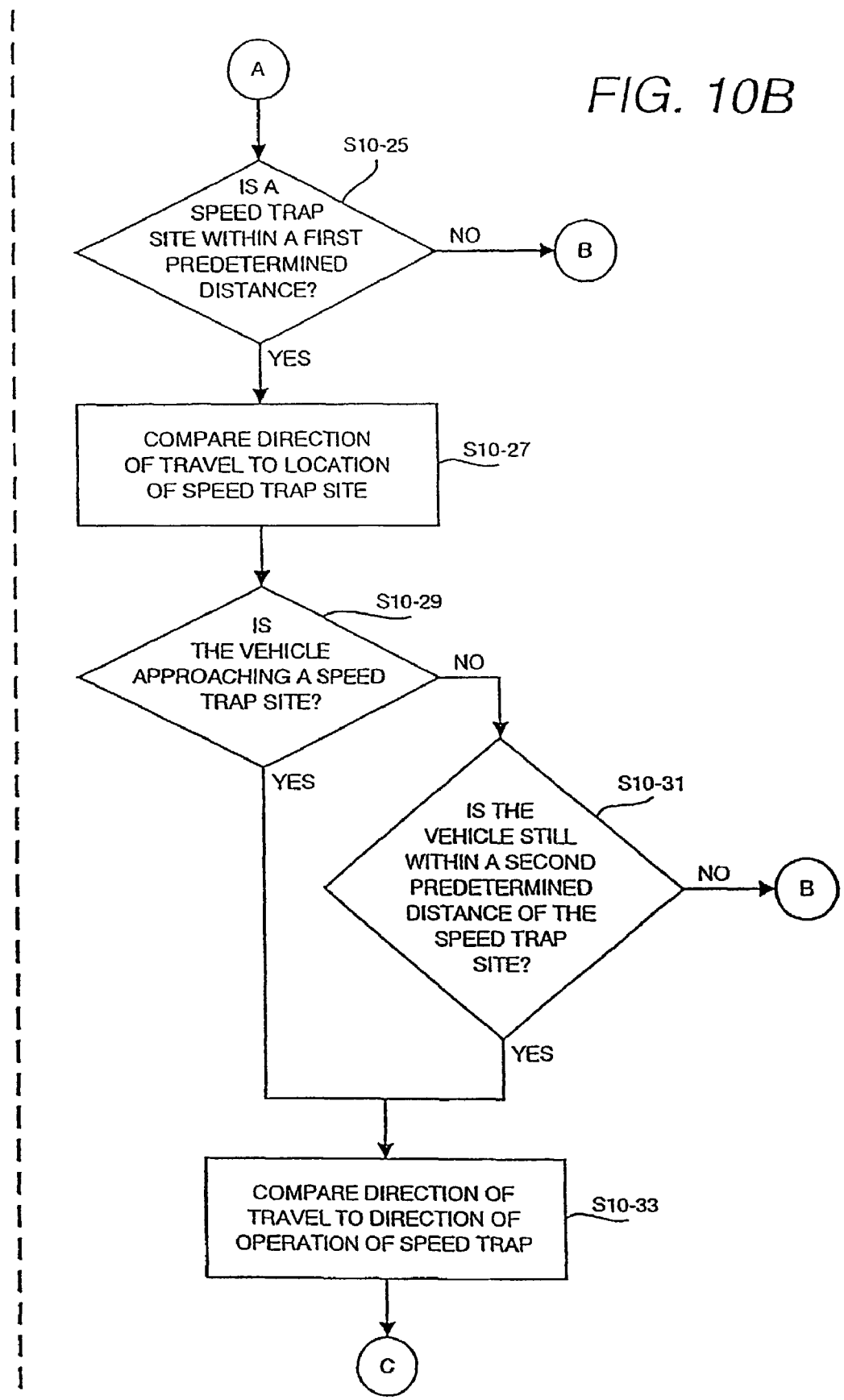
Figure 10C:
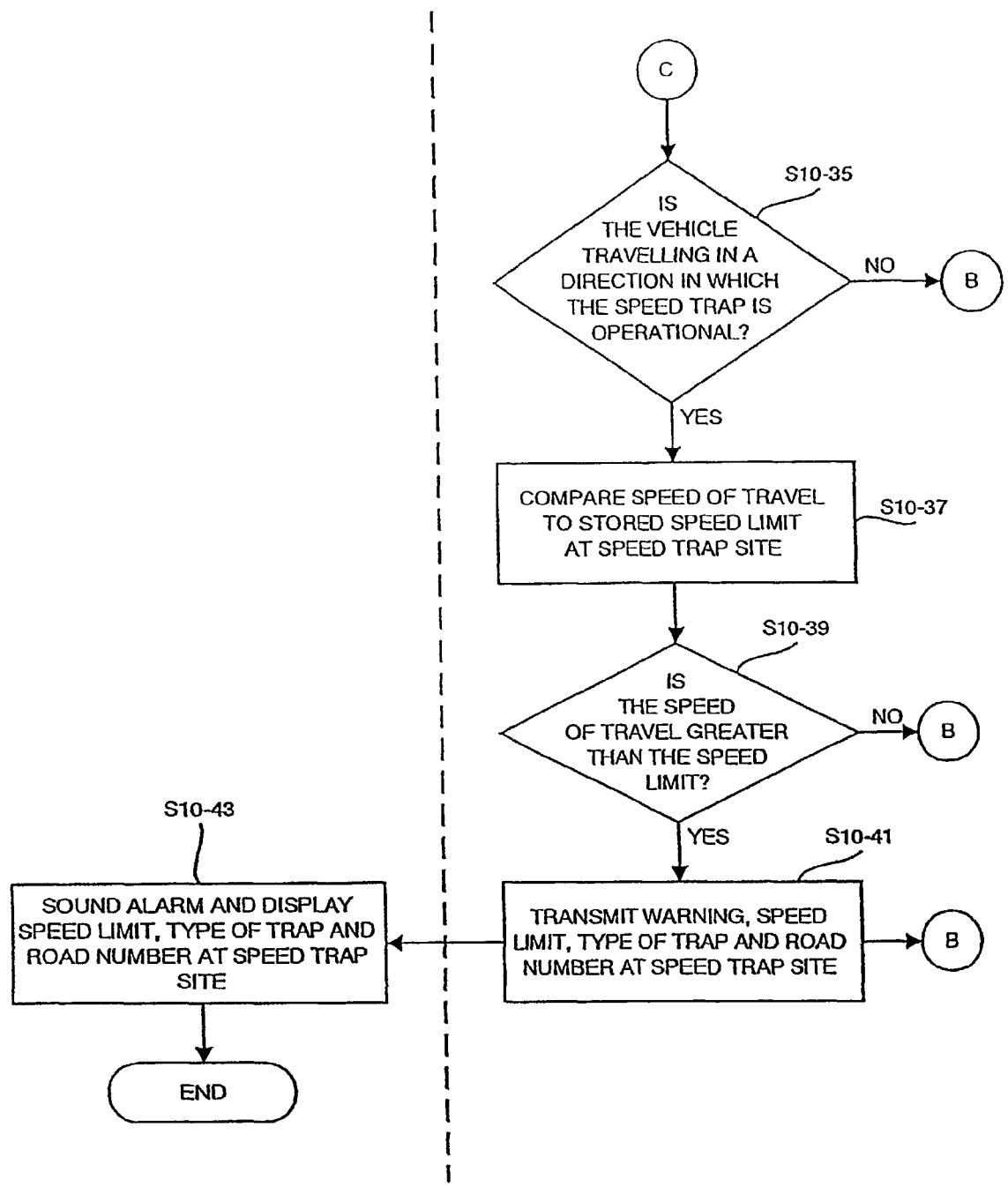
Figure 11A:
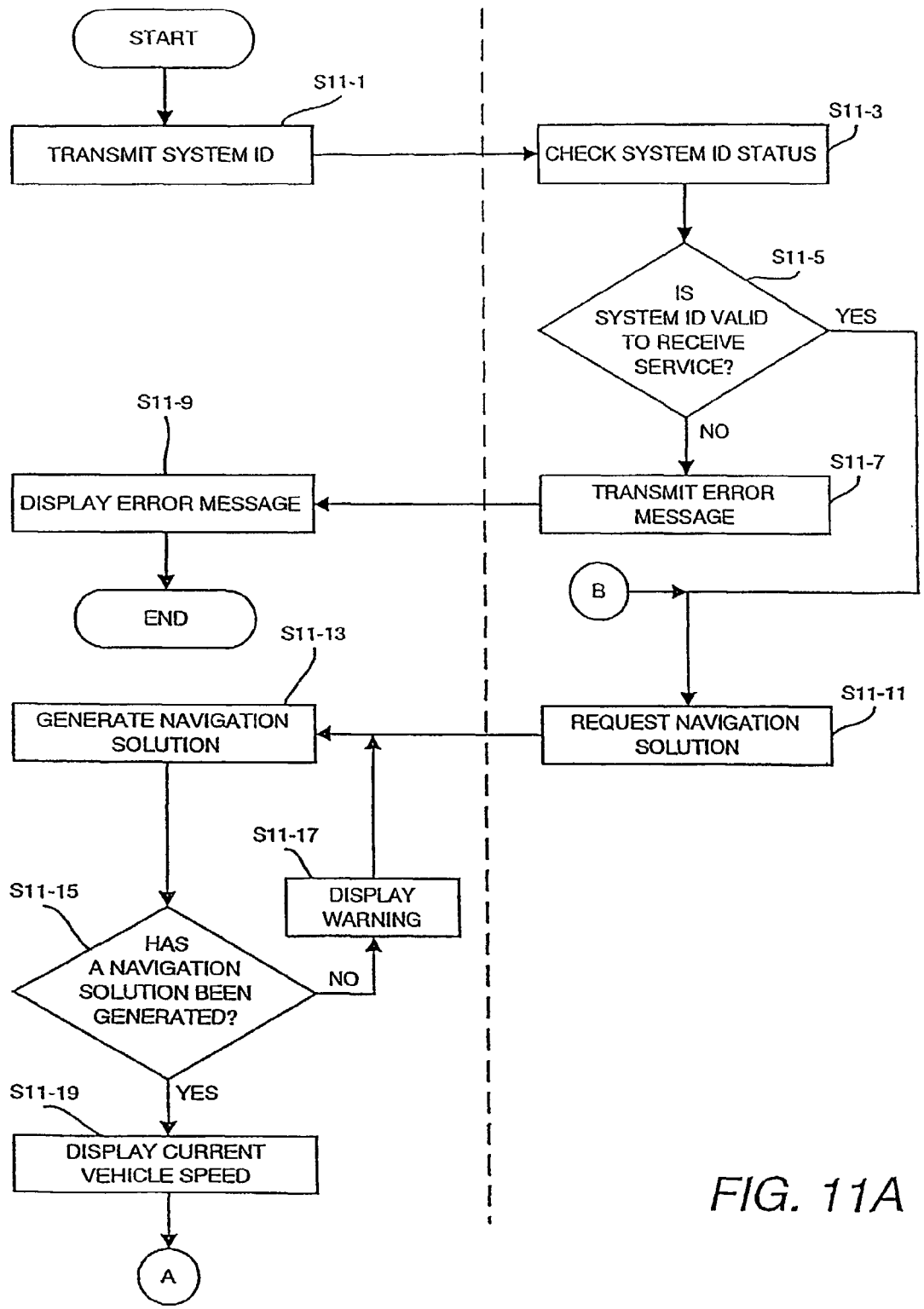
Figure 11B:
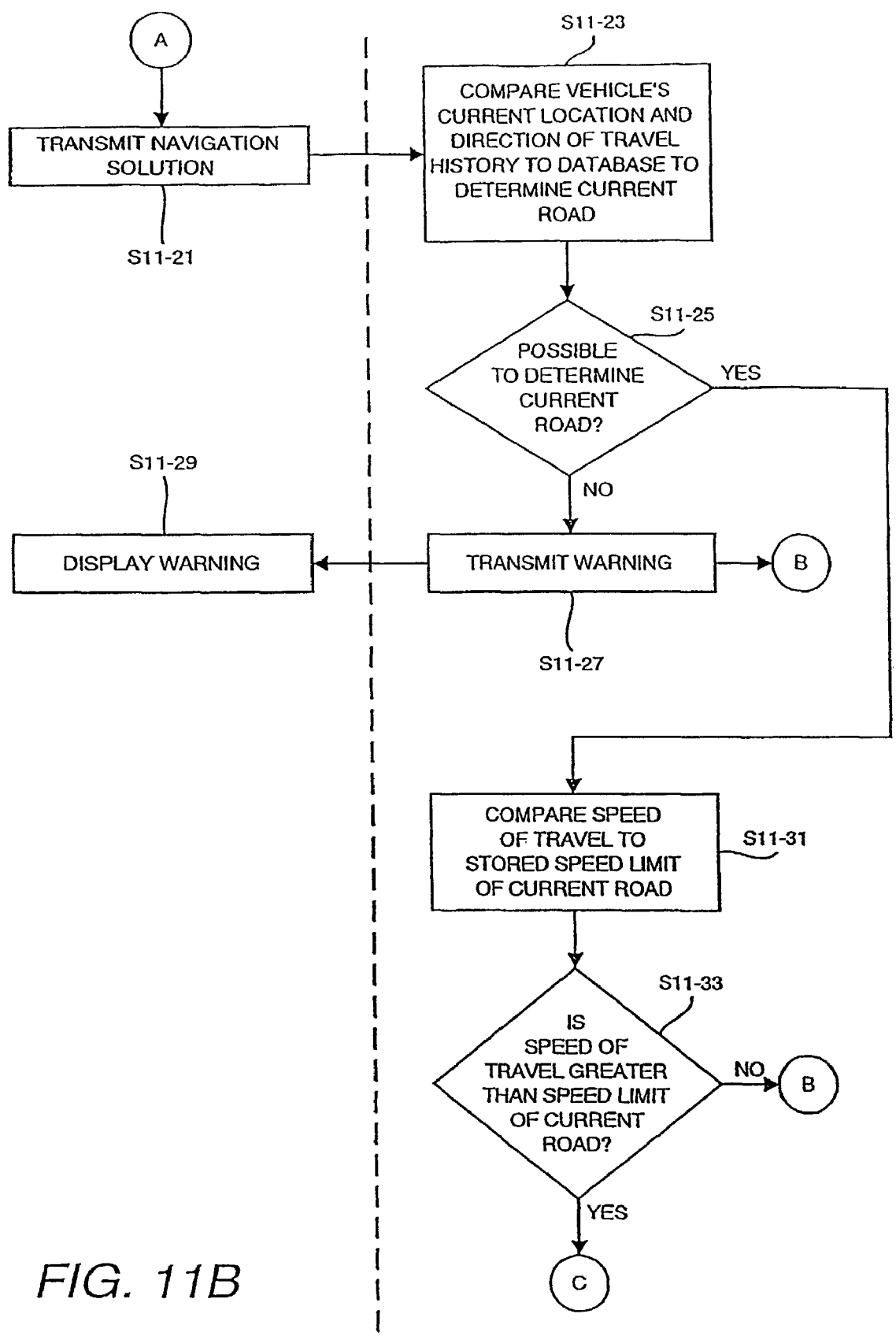
Figure 11C:
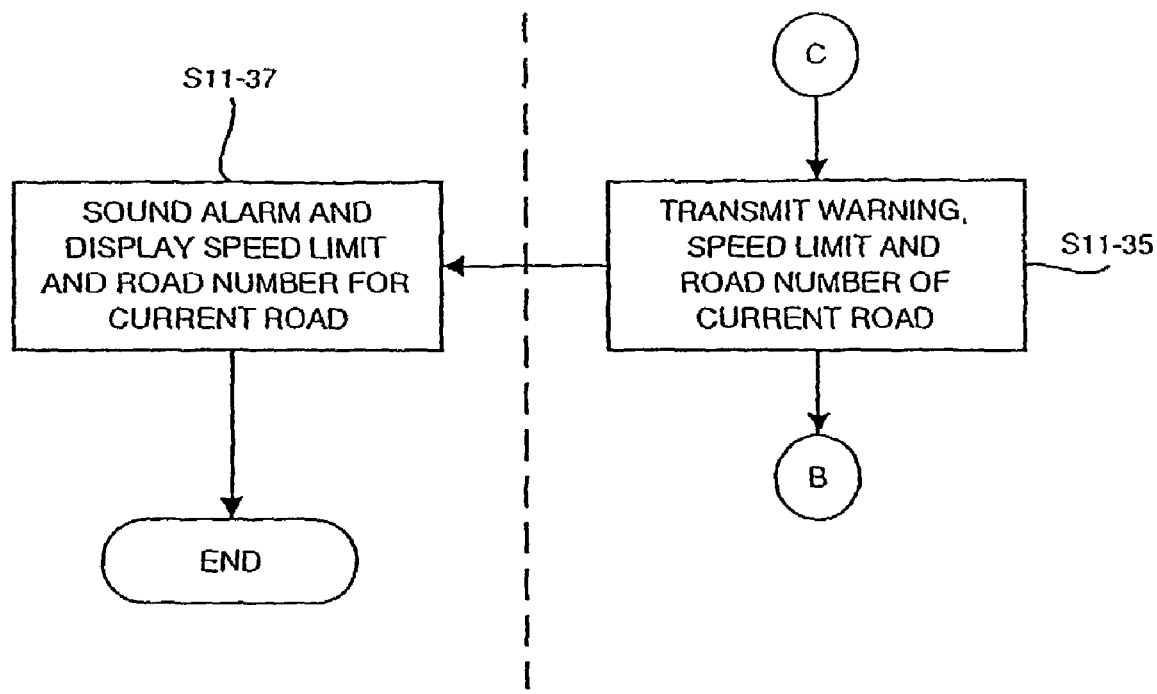
Figure 12:
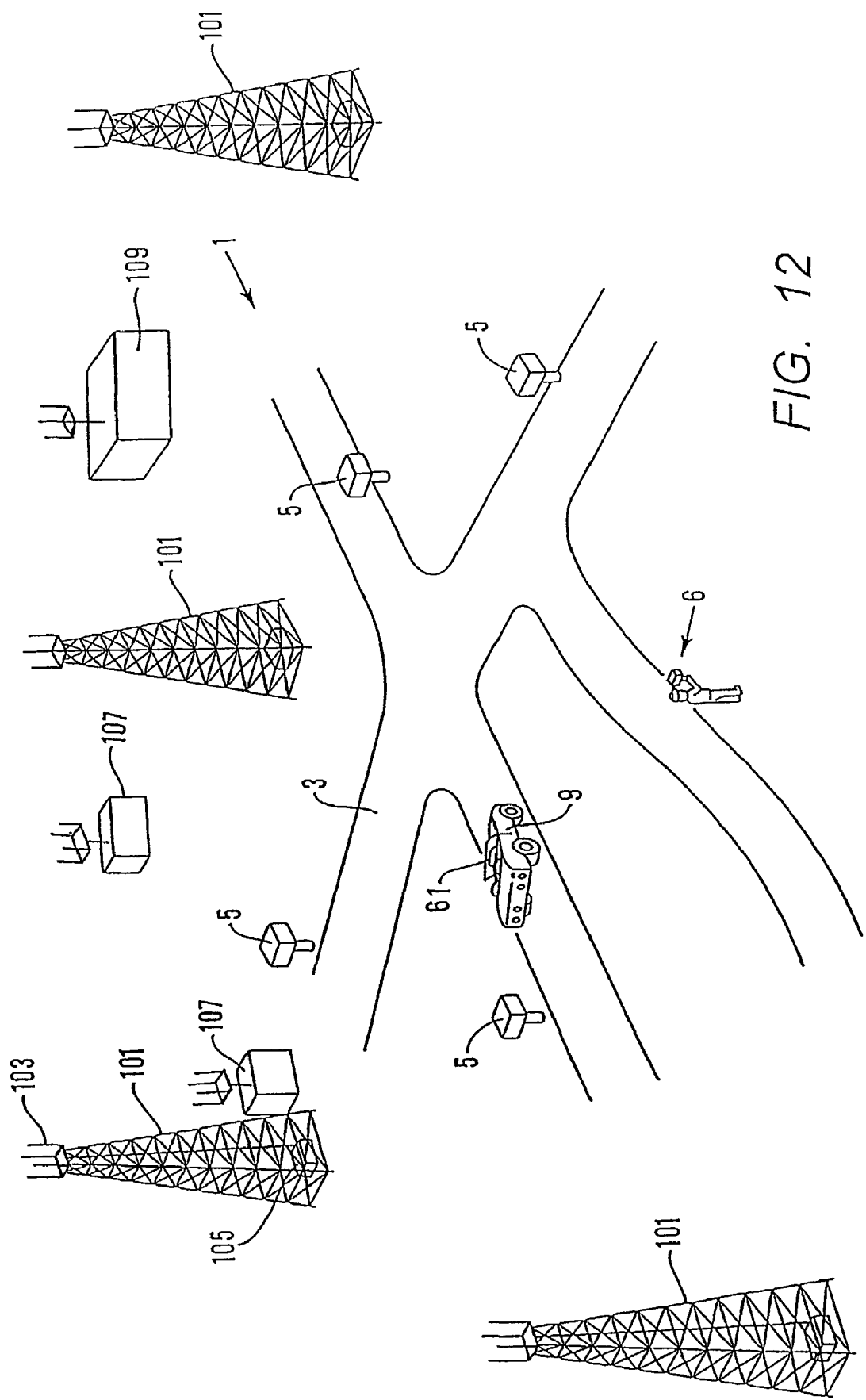
Figure 13:
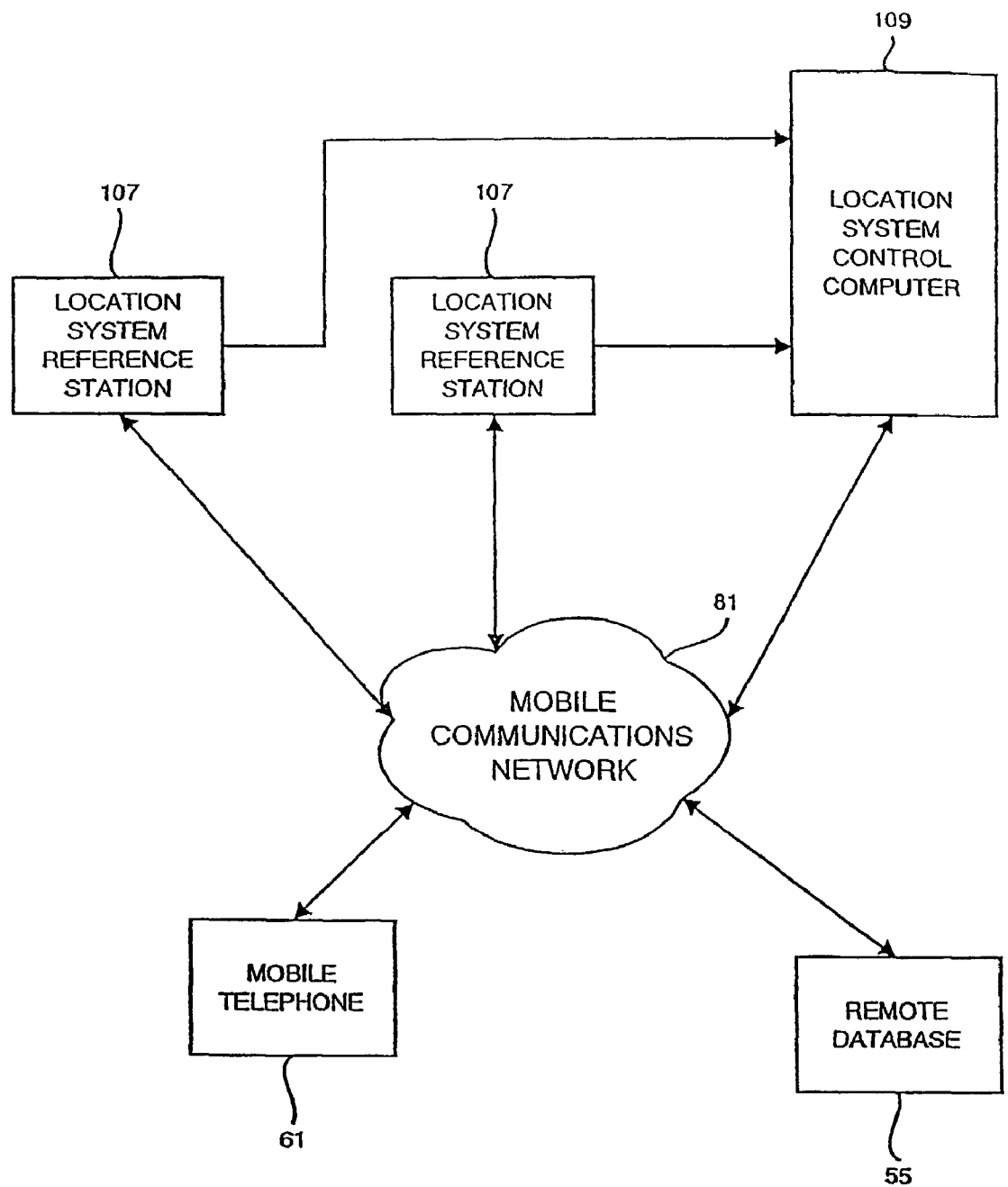
Figure 14:
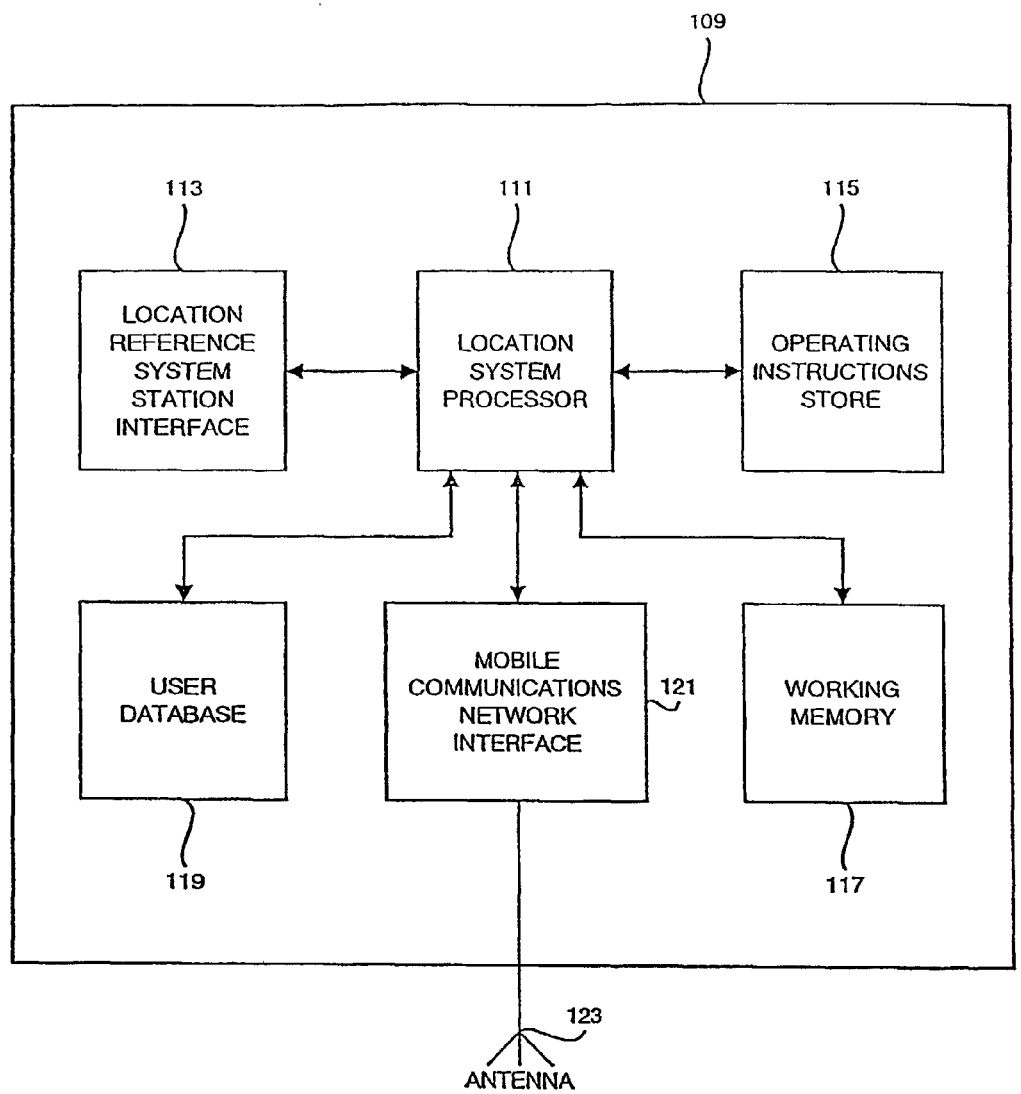
Figure 15:
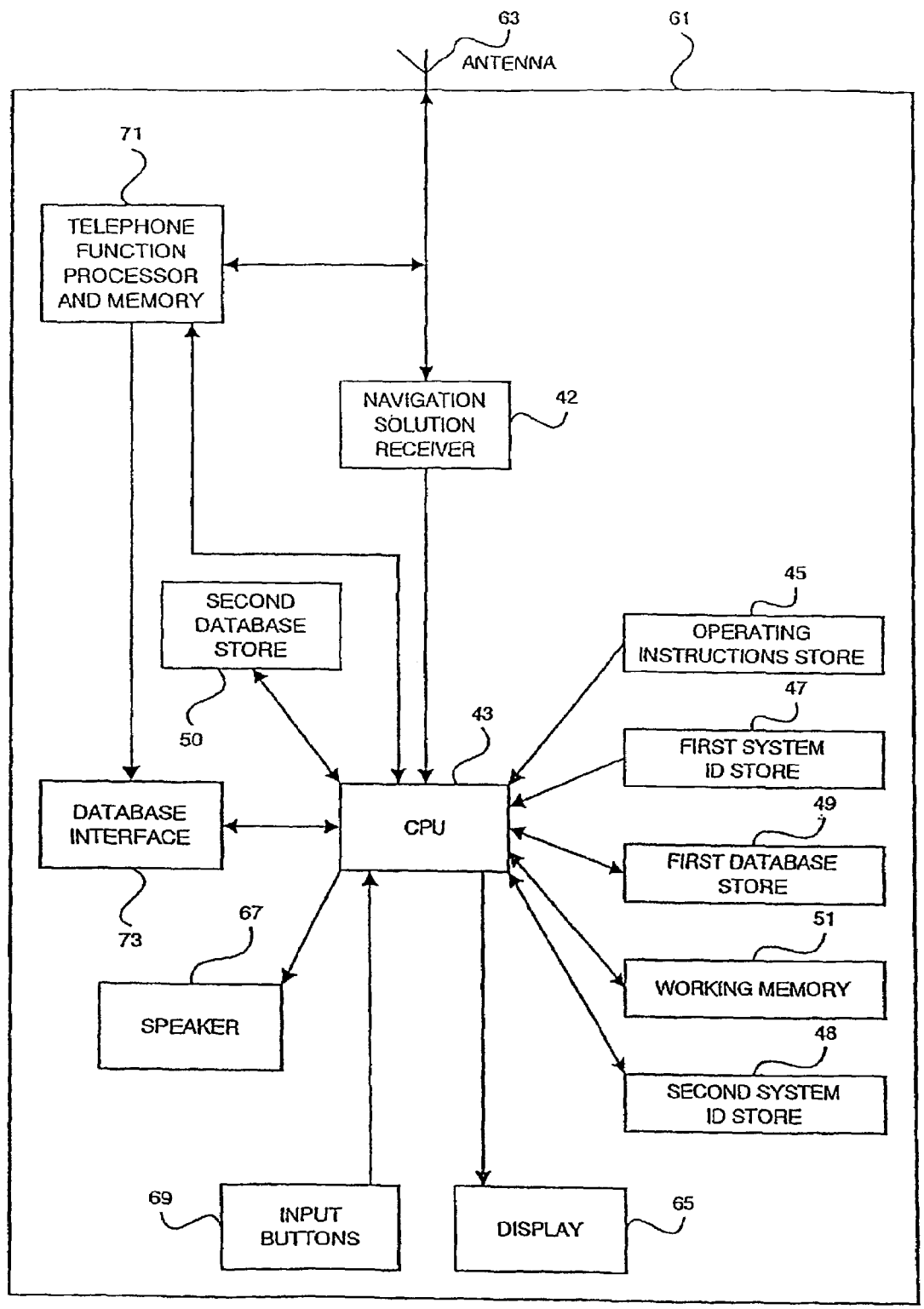
Figure 16A:
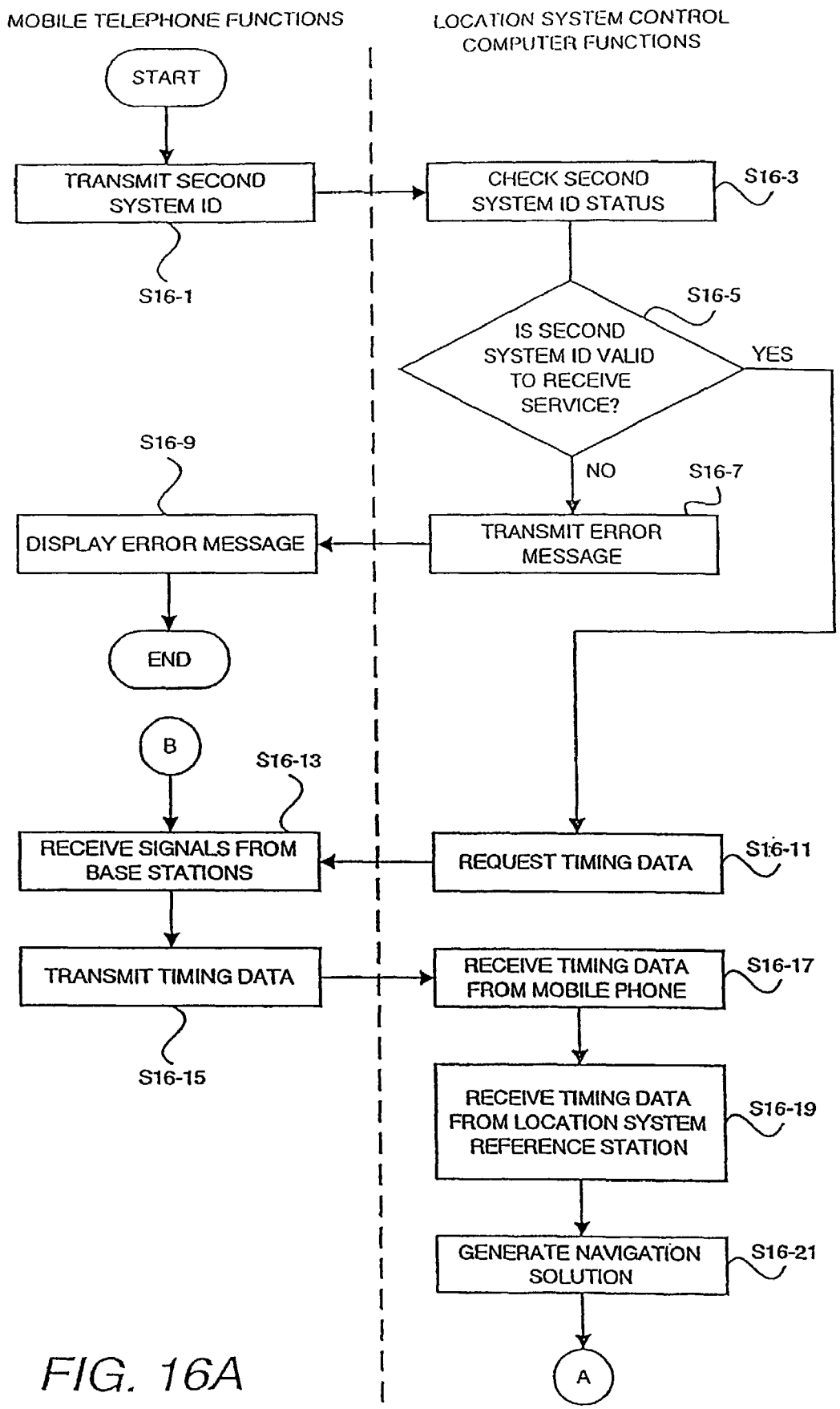
Figure 16B:
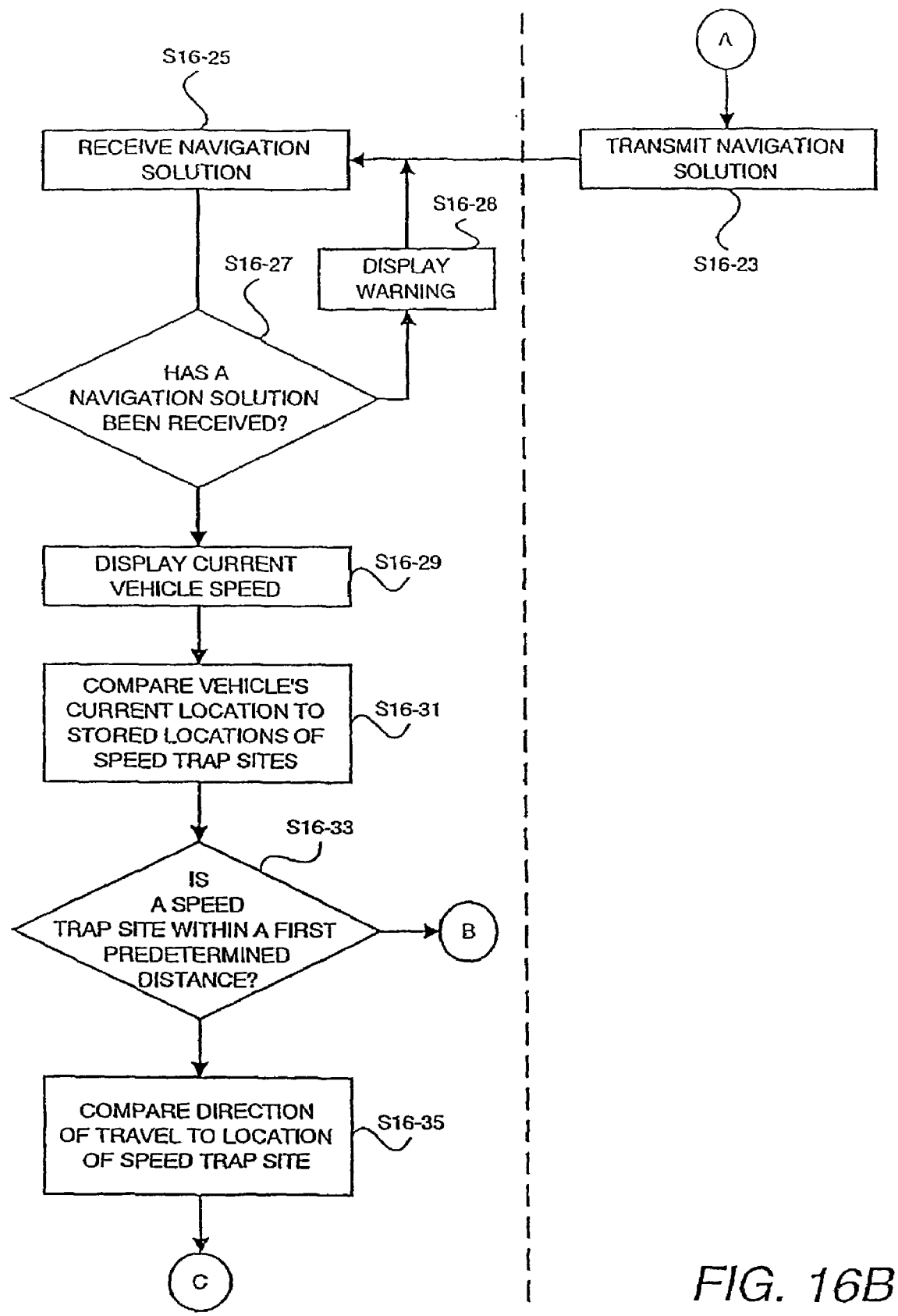
Figure 16C:
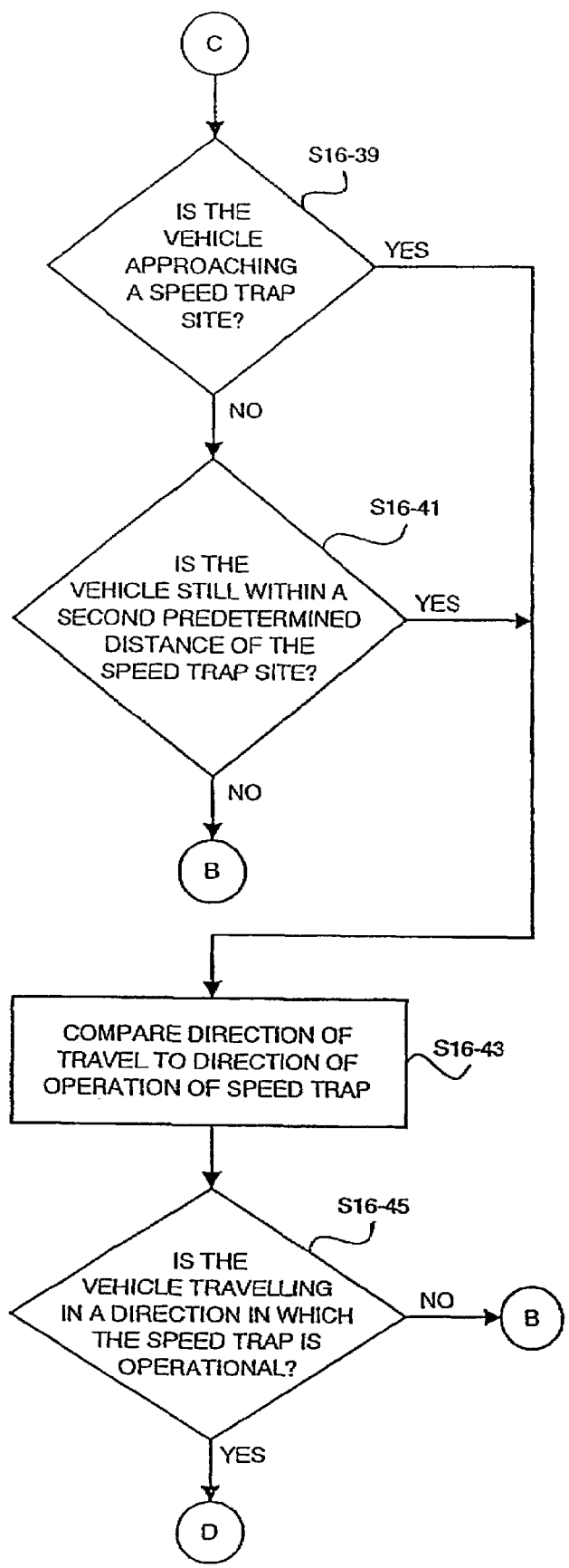
Figure 16D:
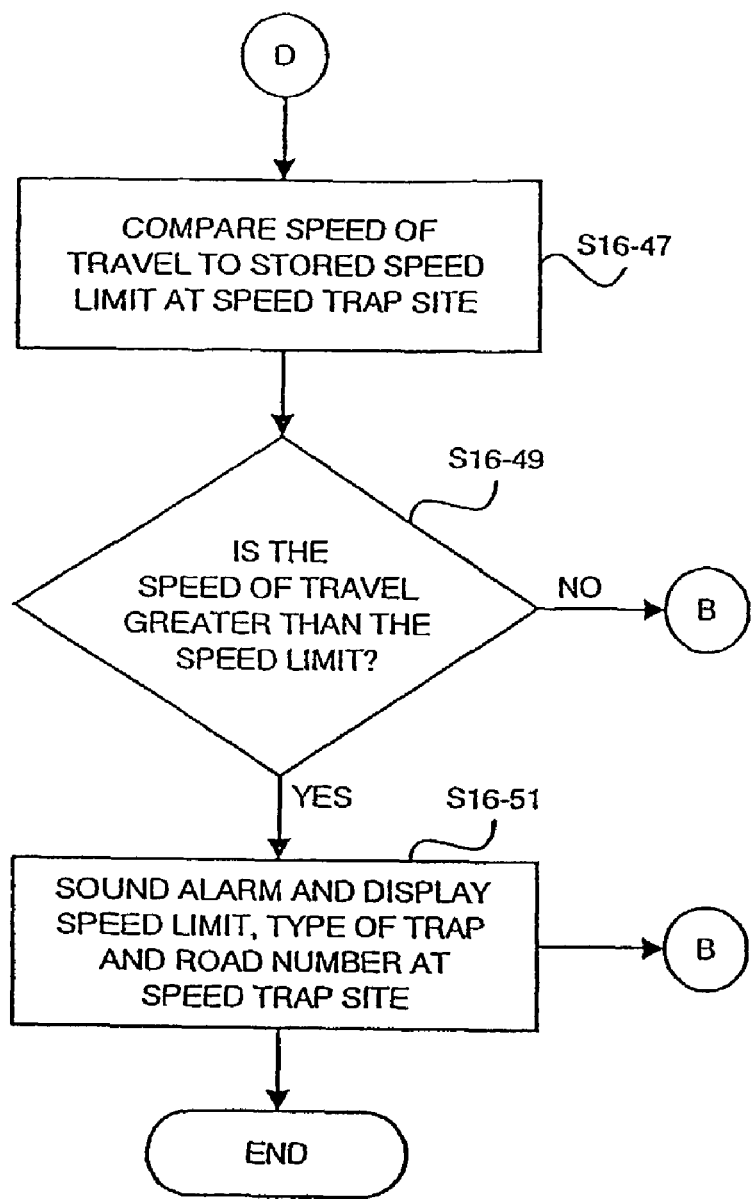
Figure 17A:
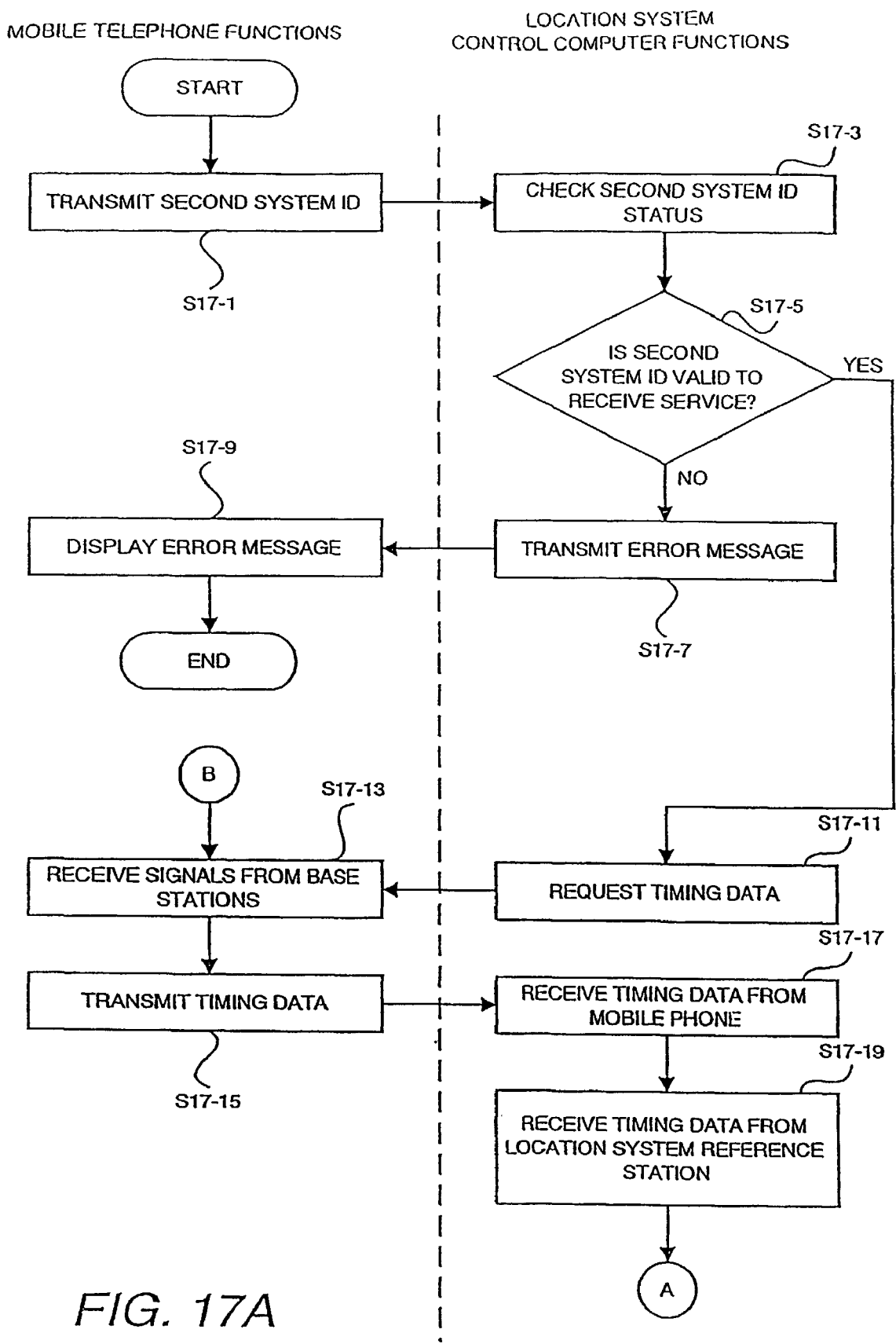
Figure 17B:
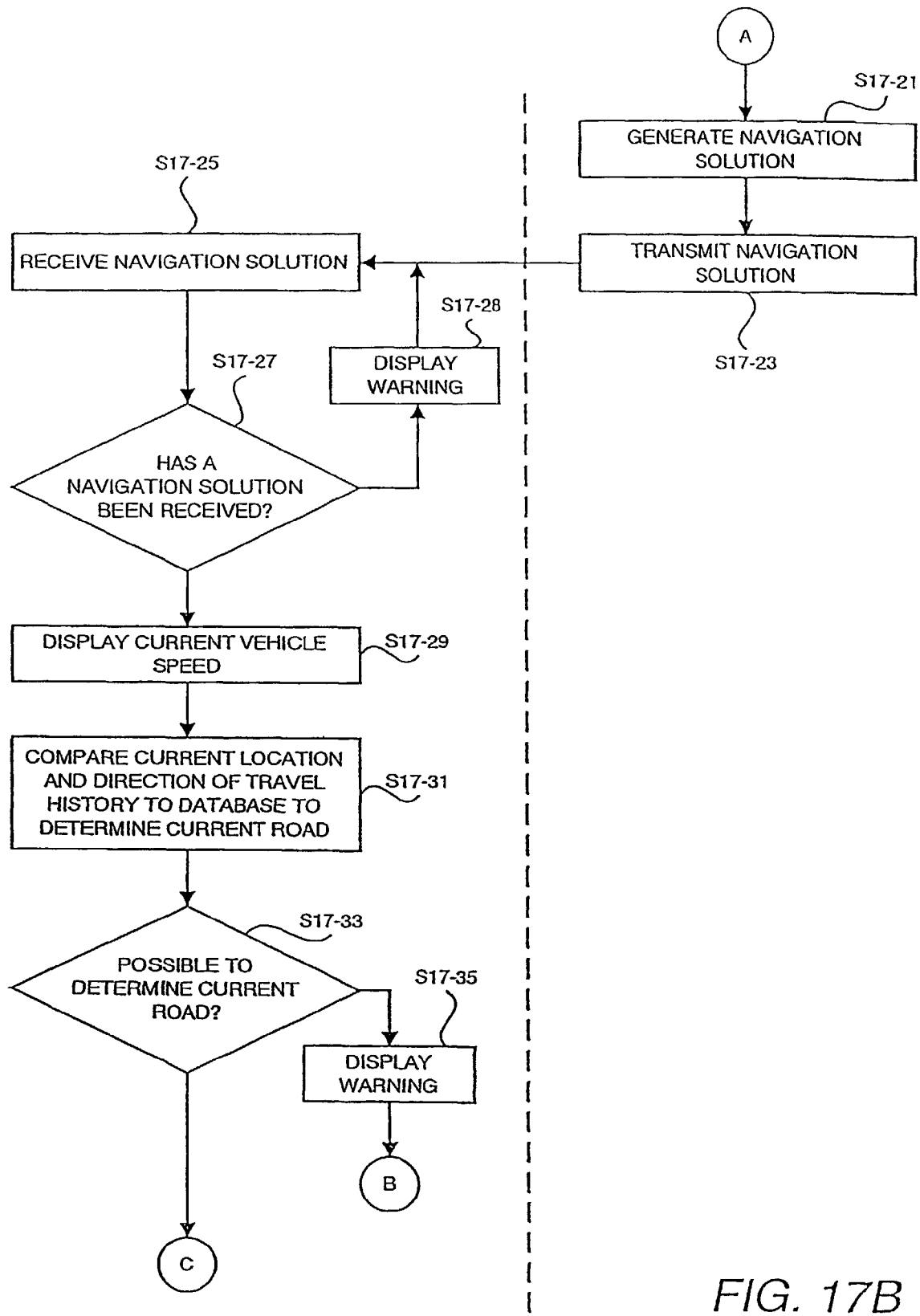
Figure 17C:
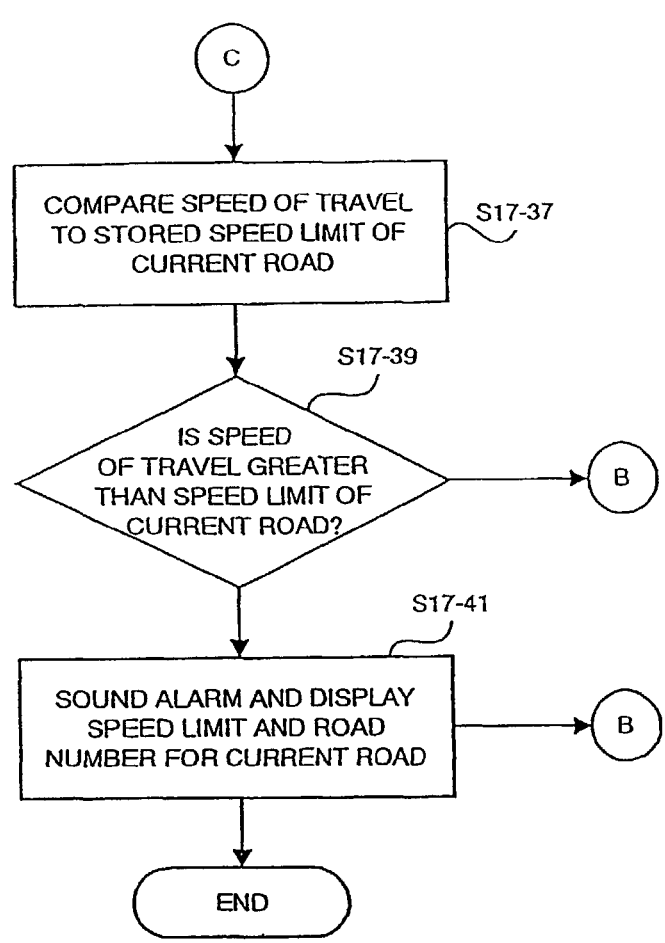
Figure 18:
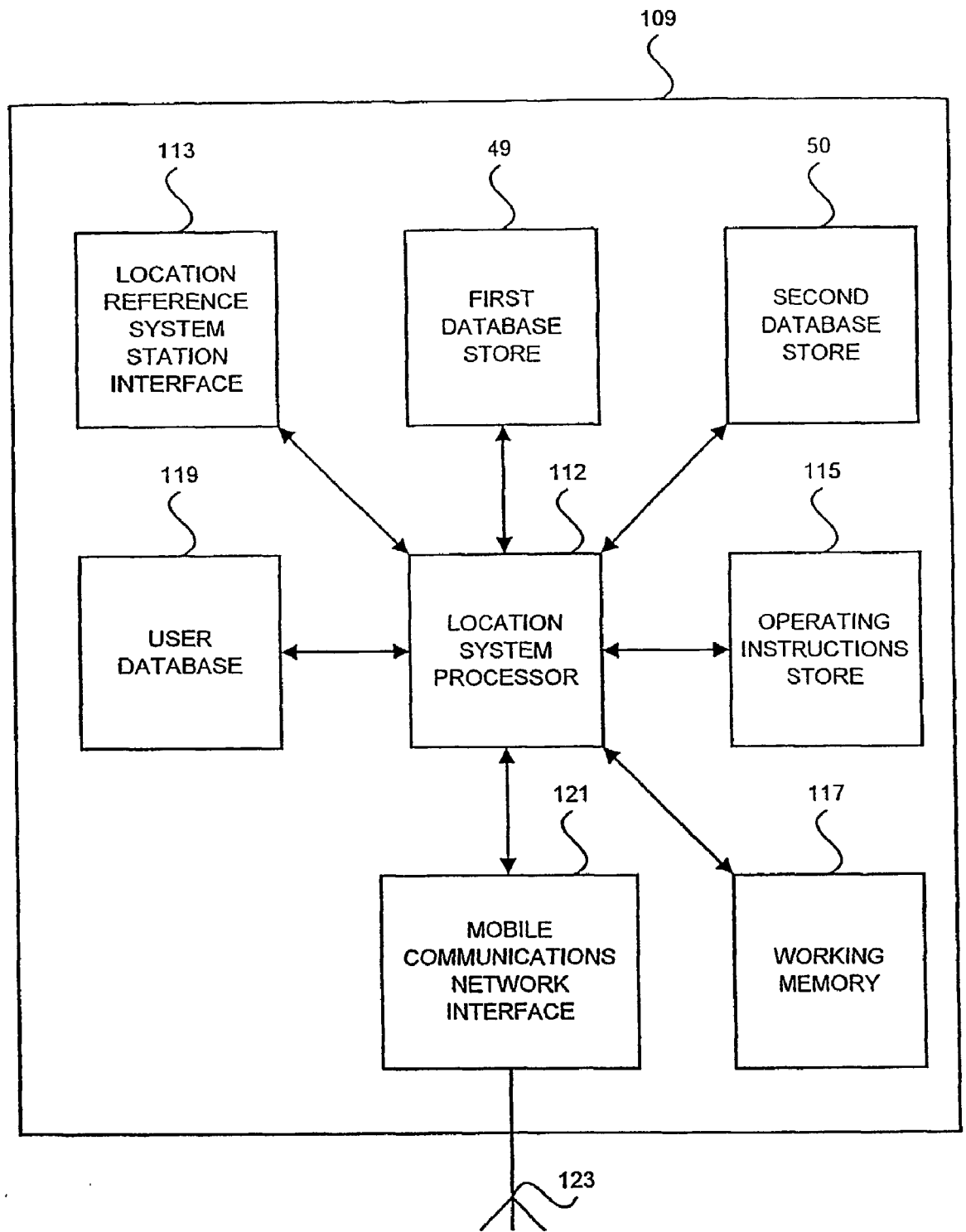
Figure 19:
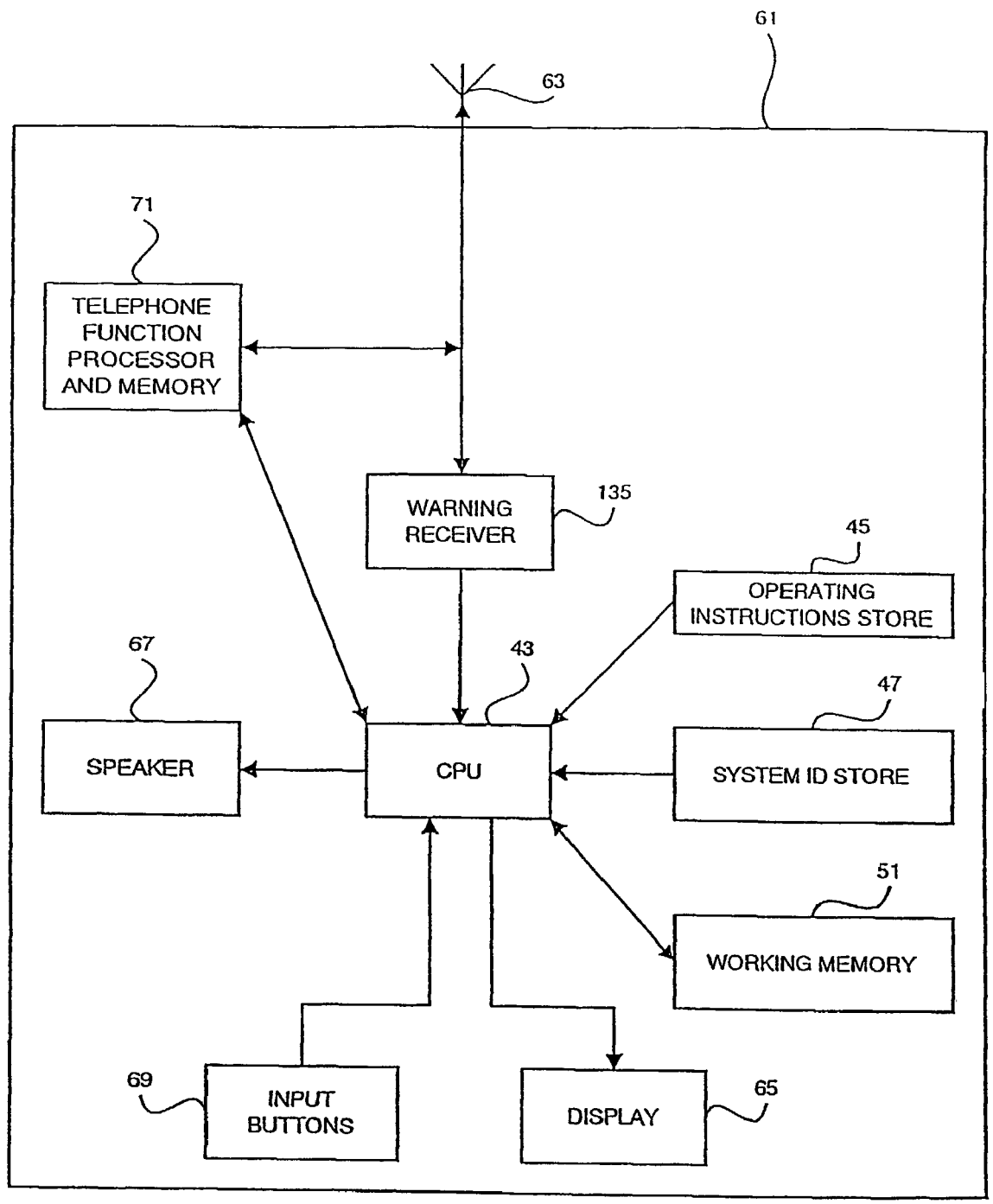
Figure 20A:
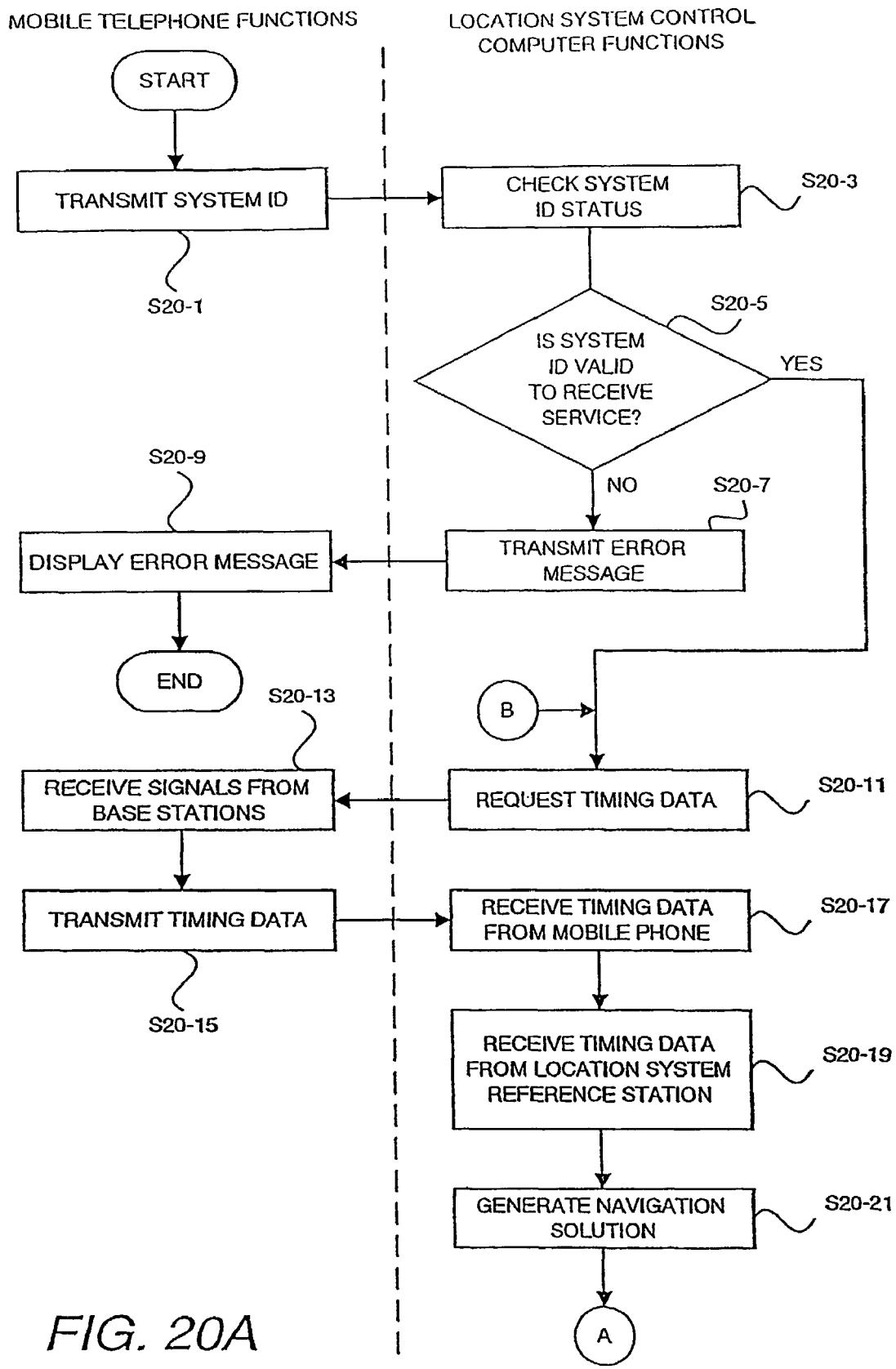
Figure 20B:
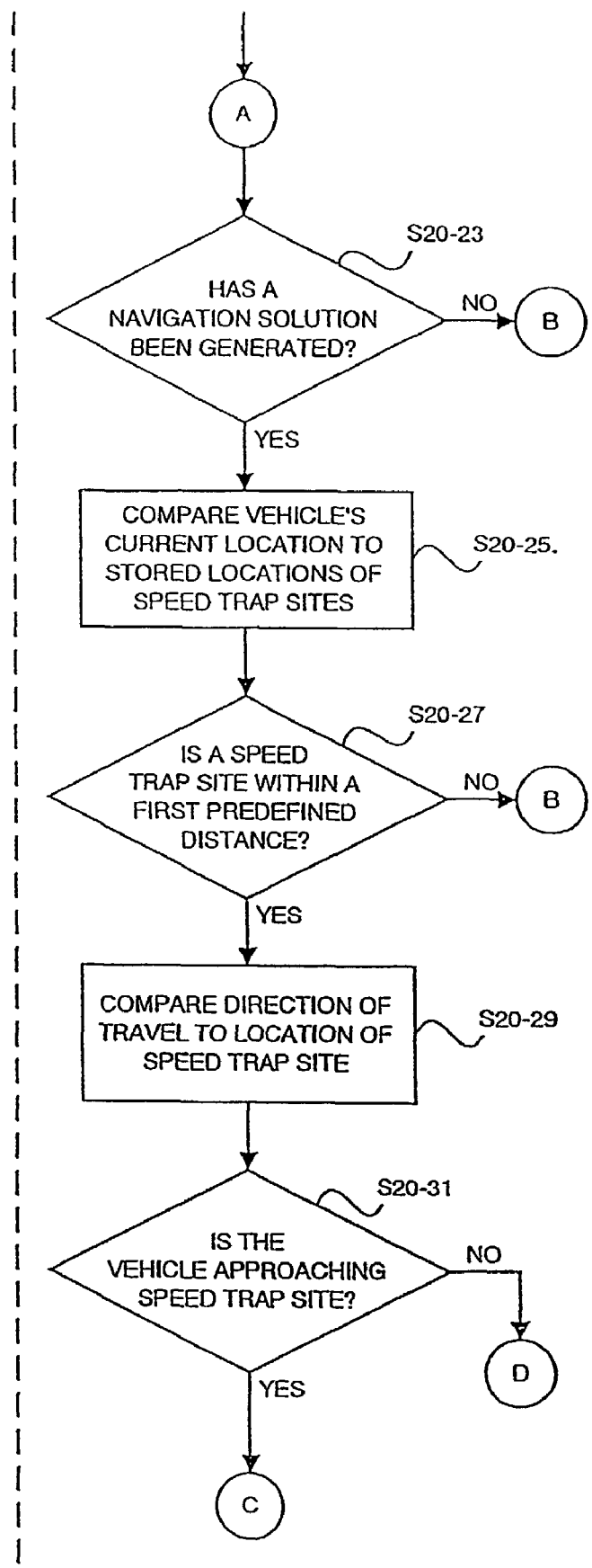
Figure 20C:
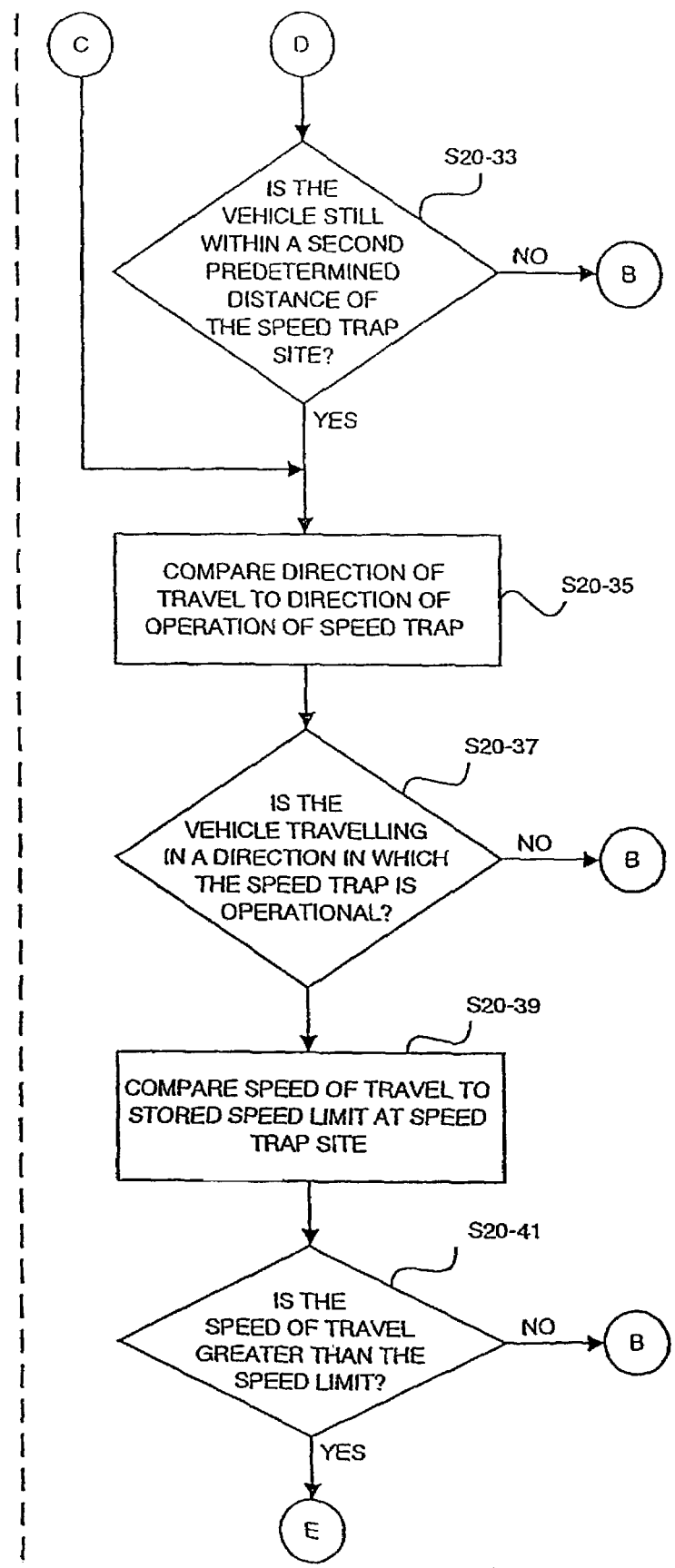
Figure 20D:
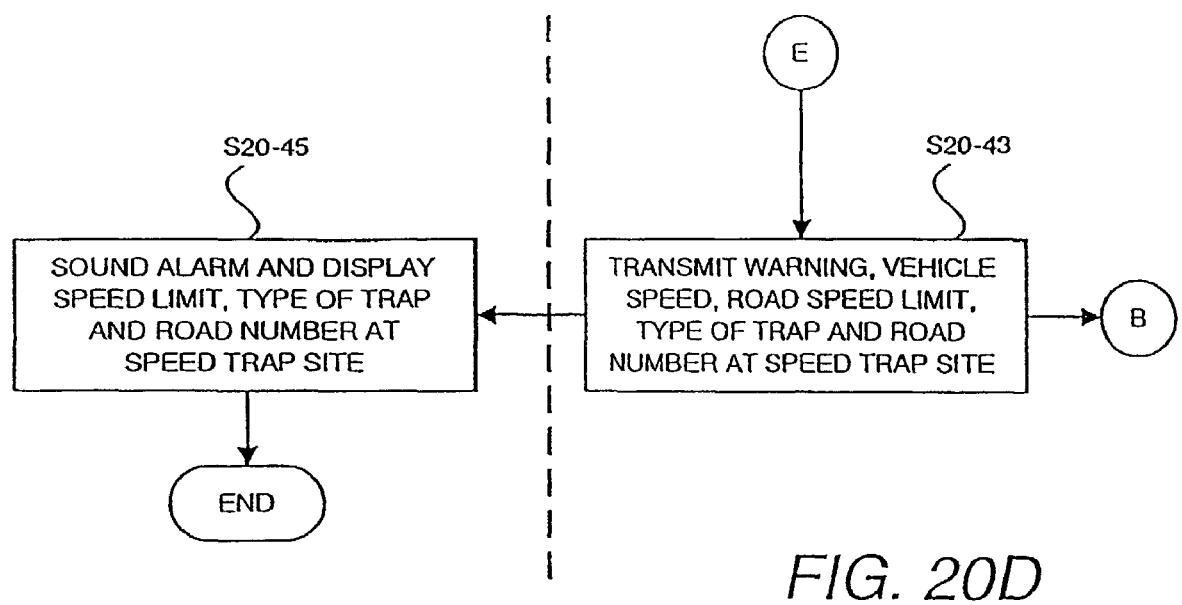
Figure 21A:
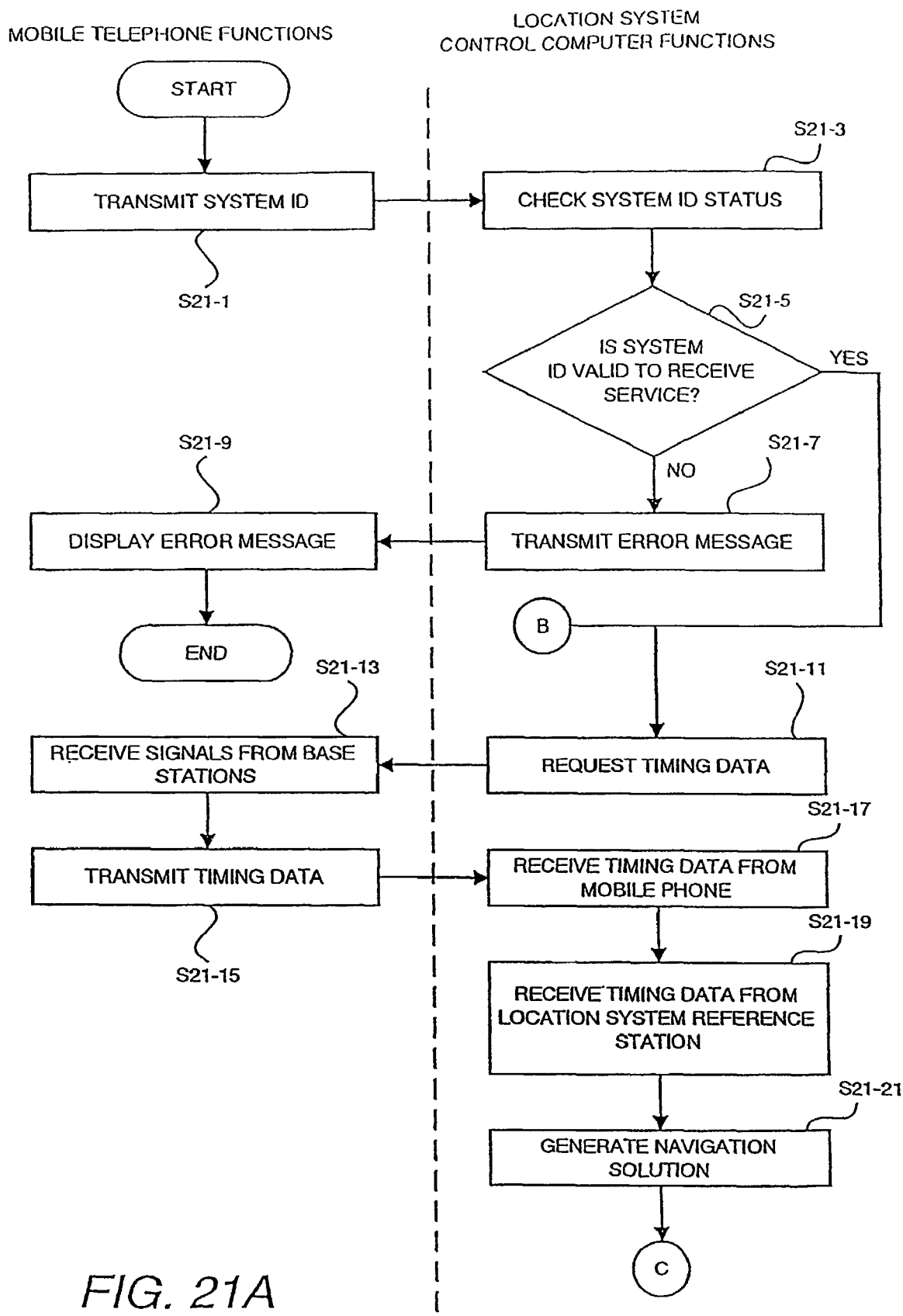
Figure 21B:
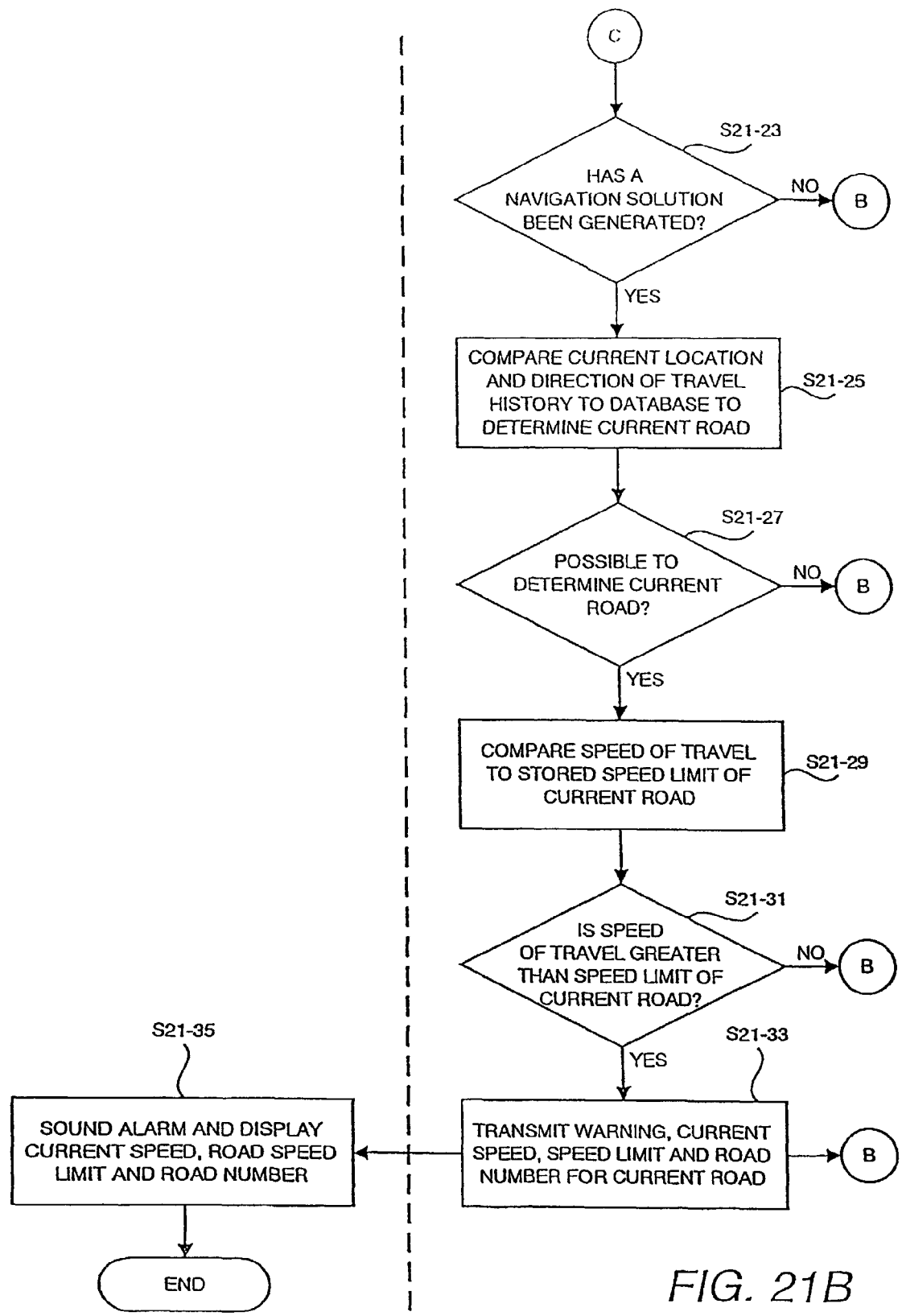
Figure 22:
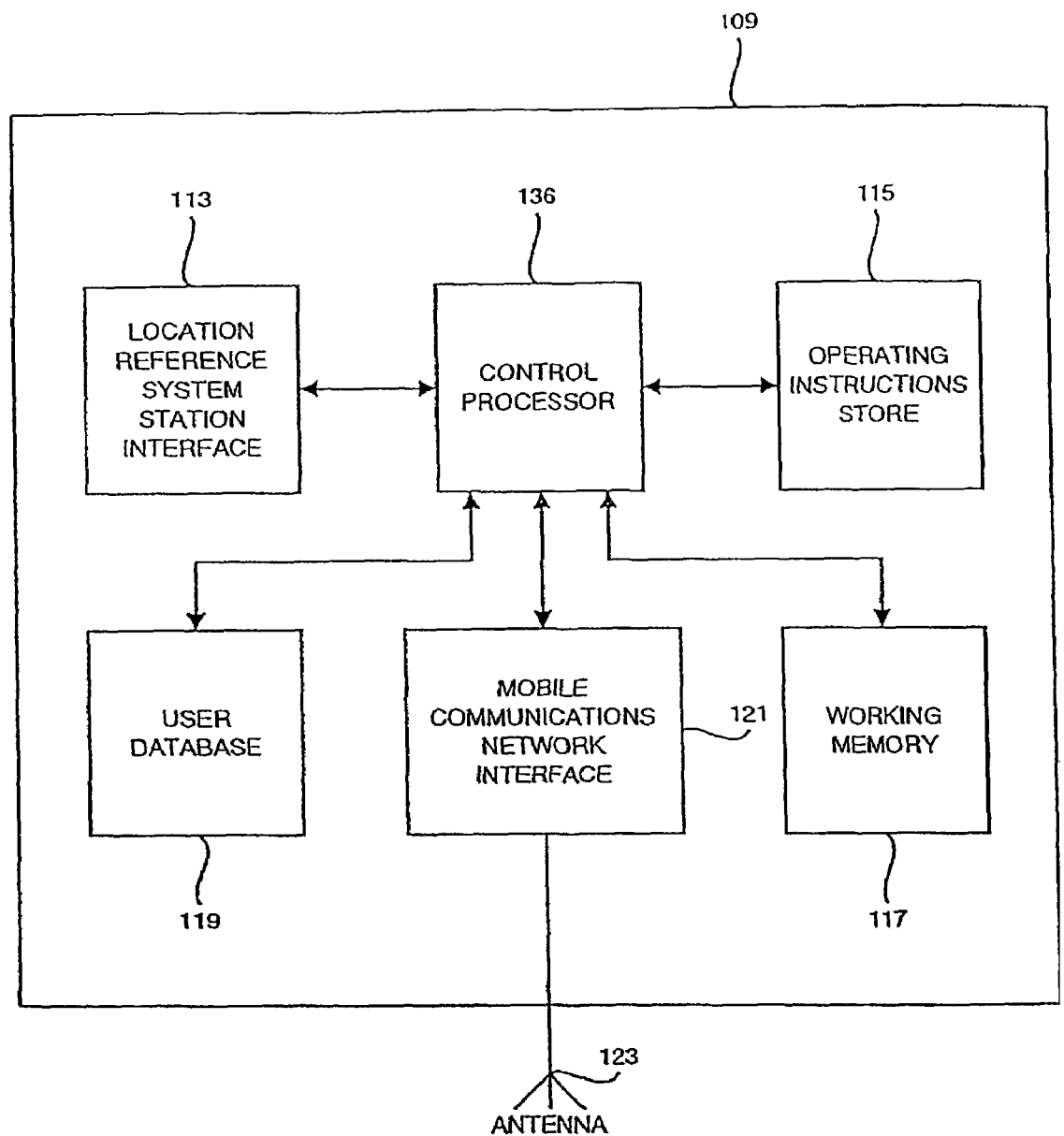
Figure 23:
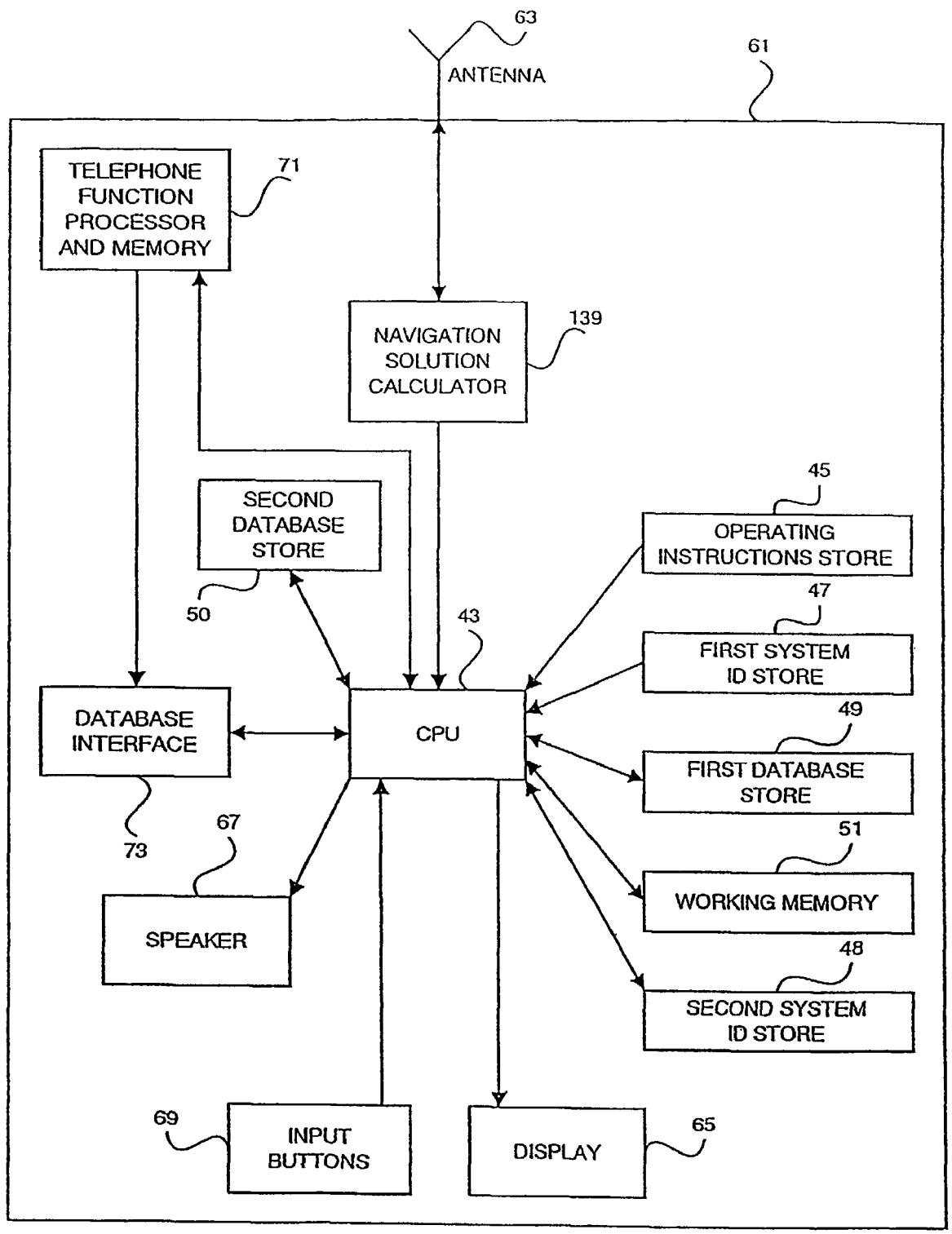
Figure 24A:
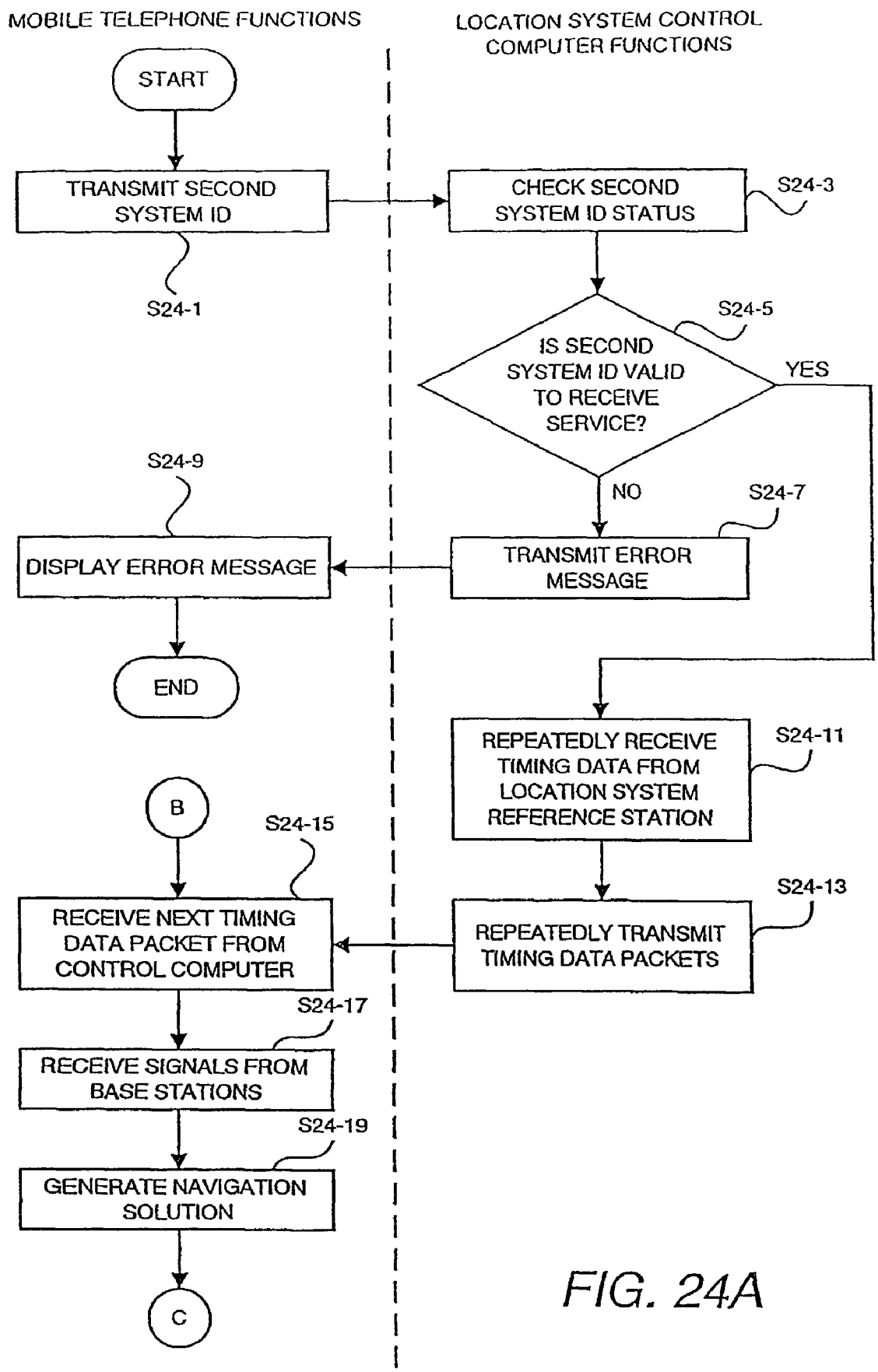
Figure 24B:
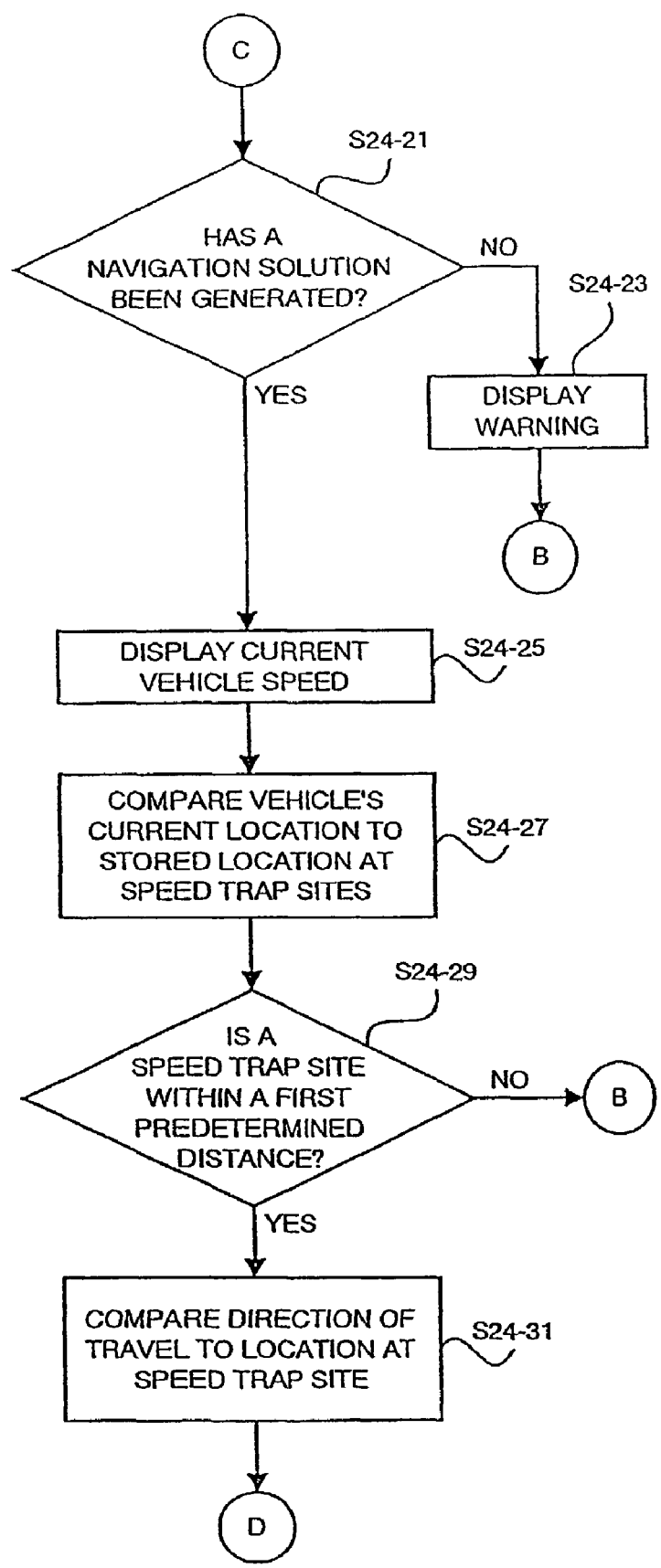
Figure 24C:
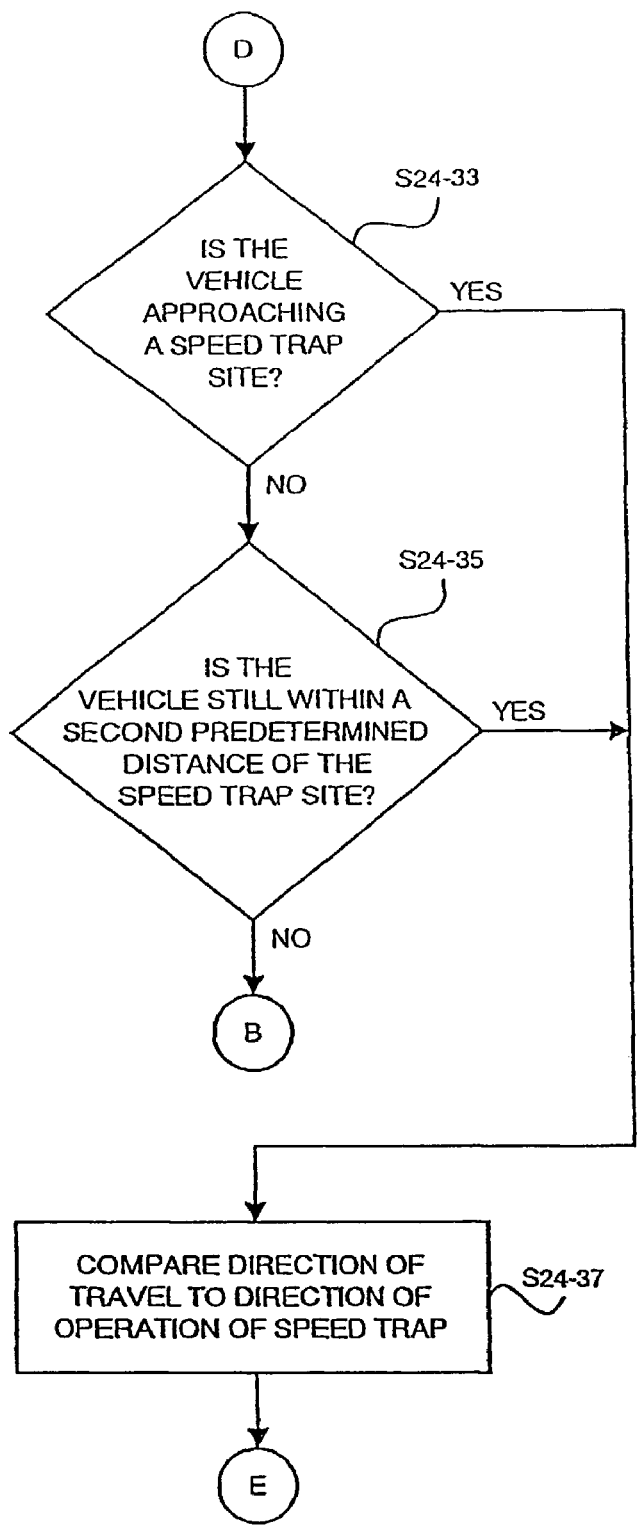
Figure 24D:
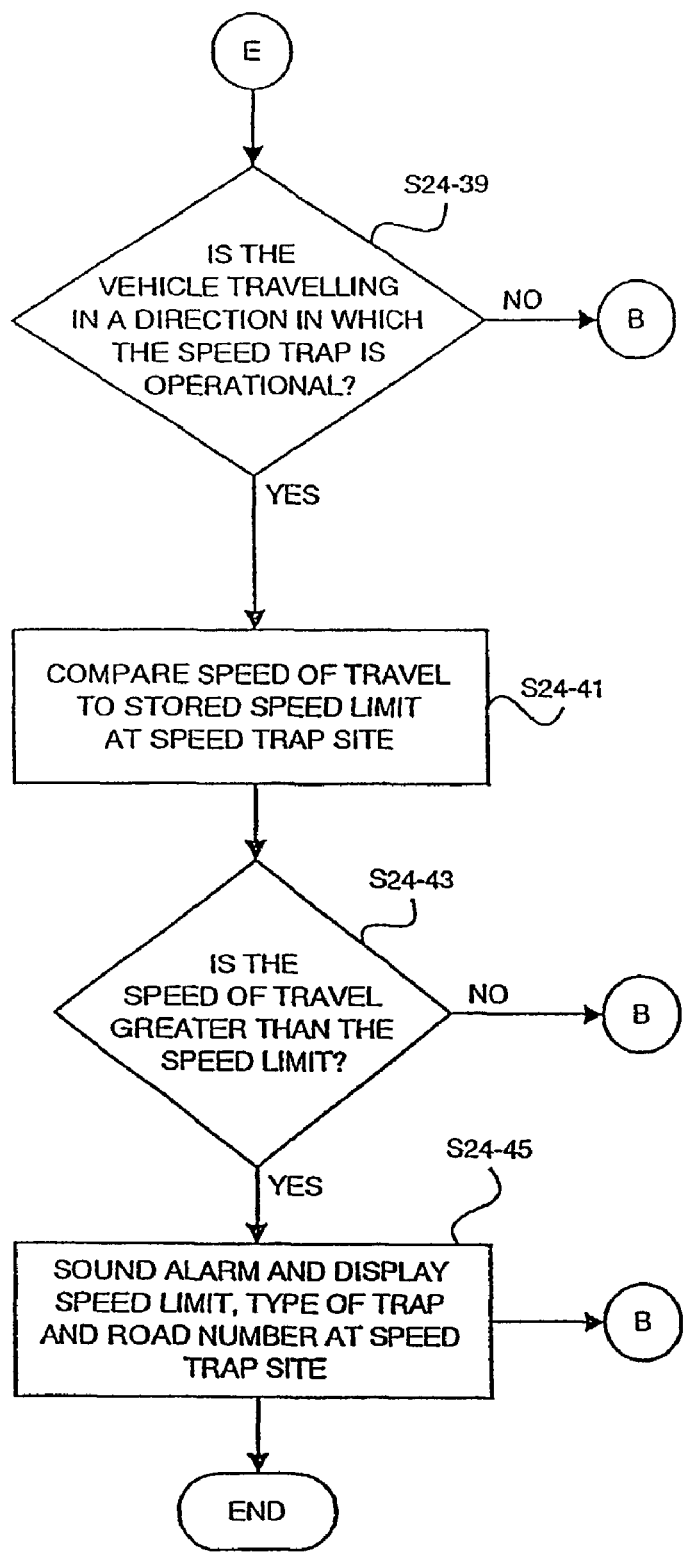
Figure 25A:
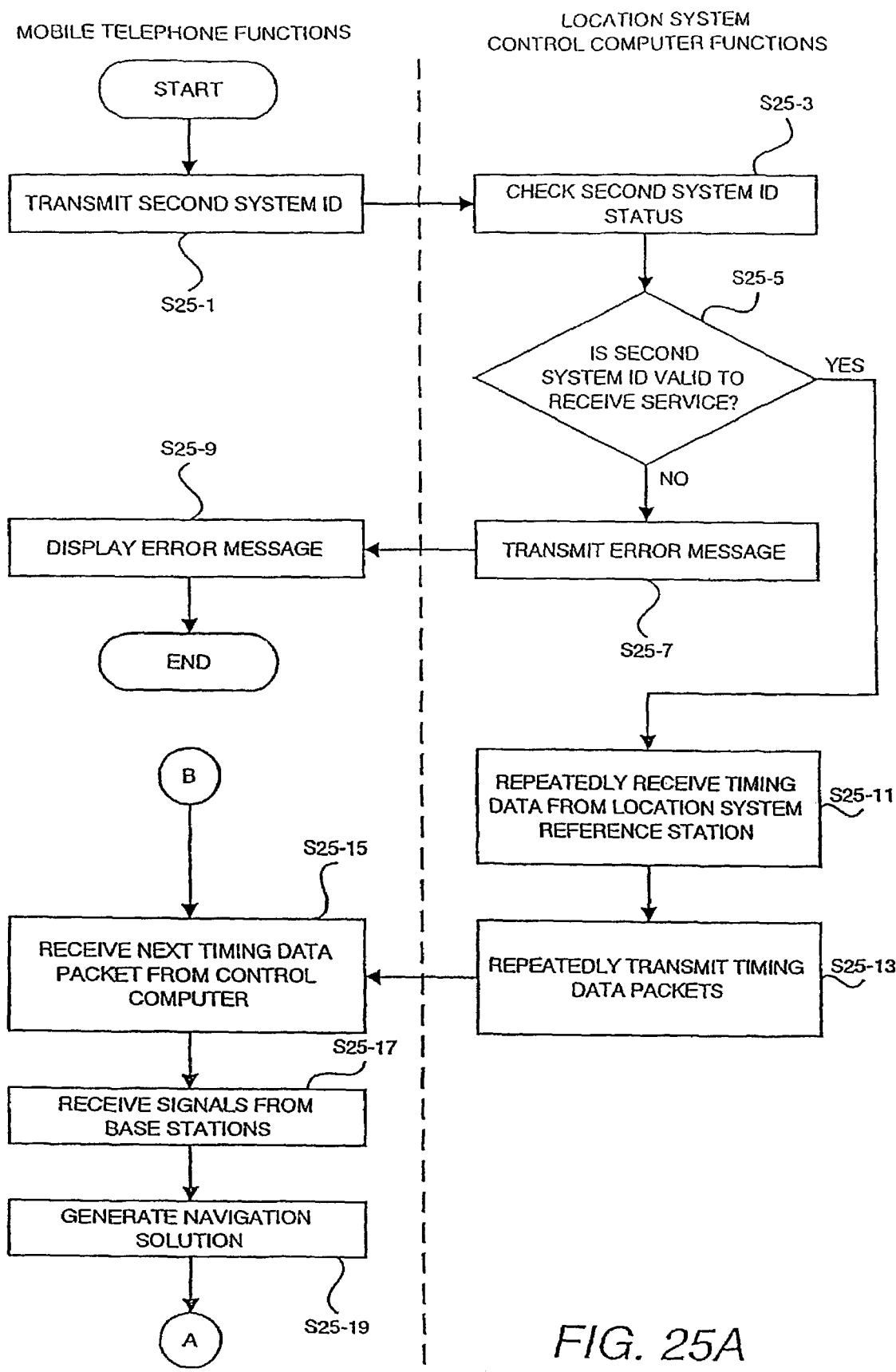
Figure 25B:
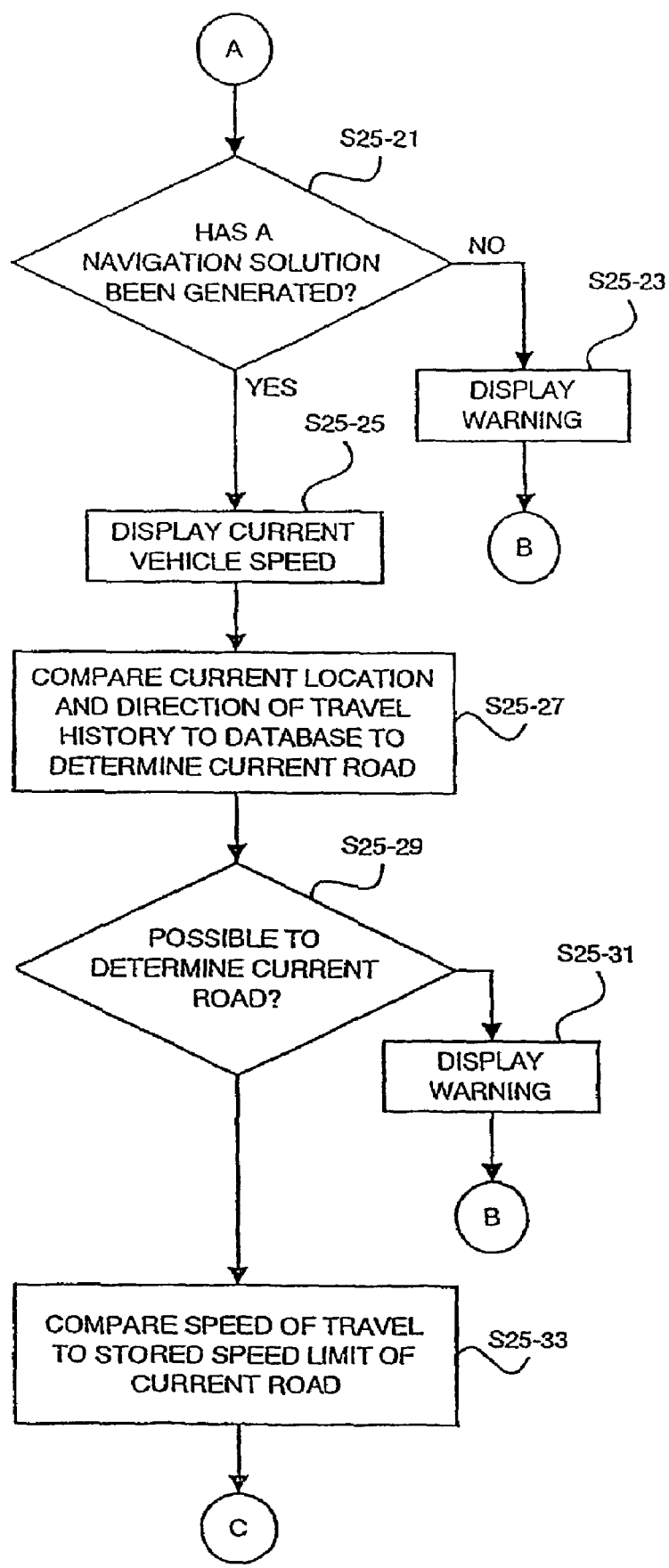
Figure 25C:
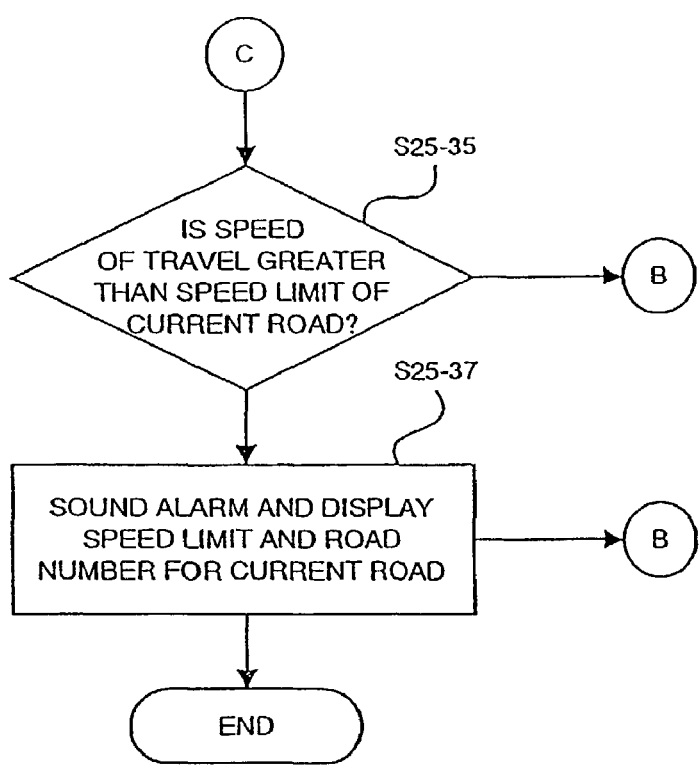
Figure 26:
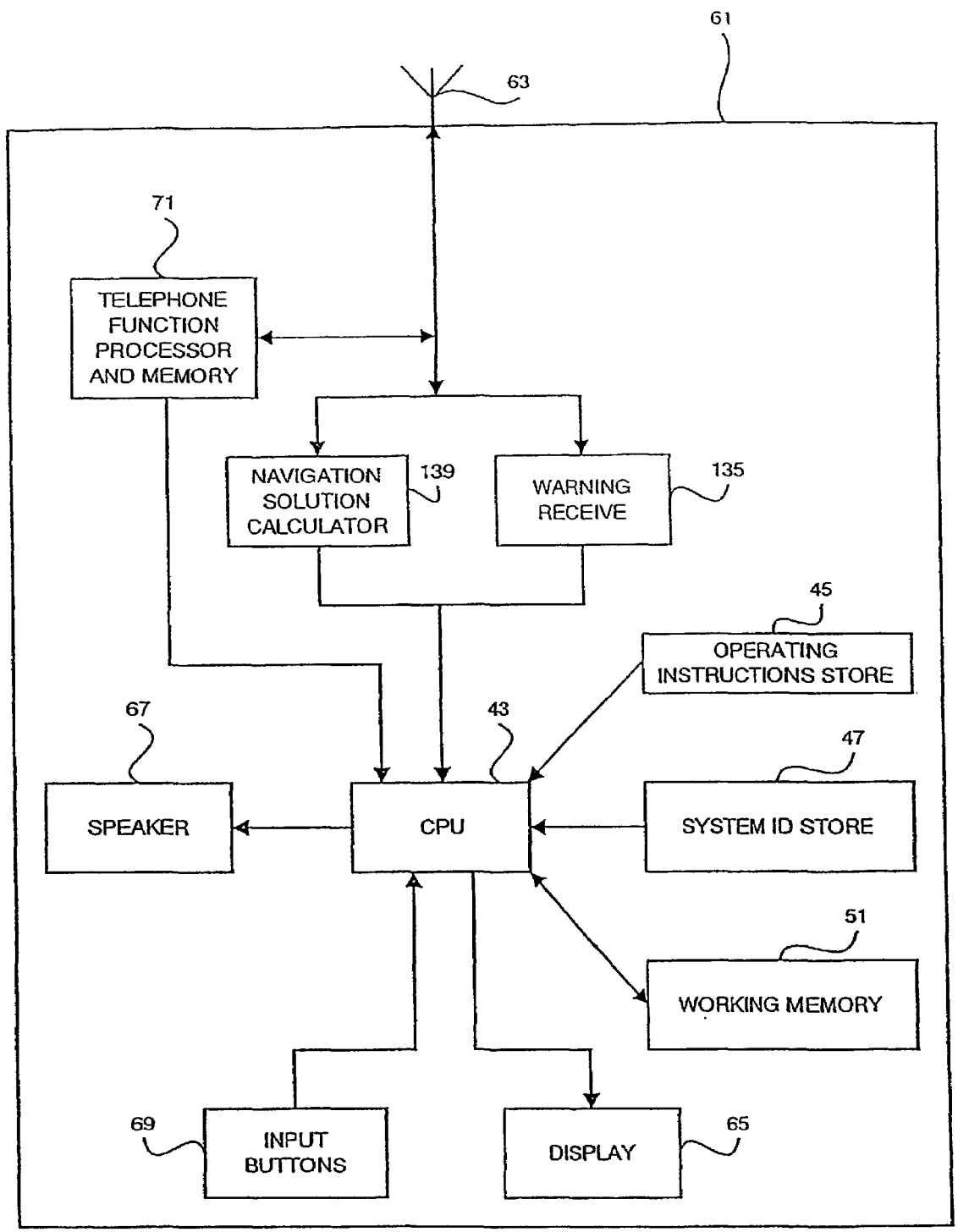
Figure 27:
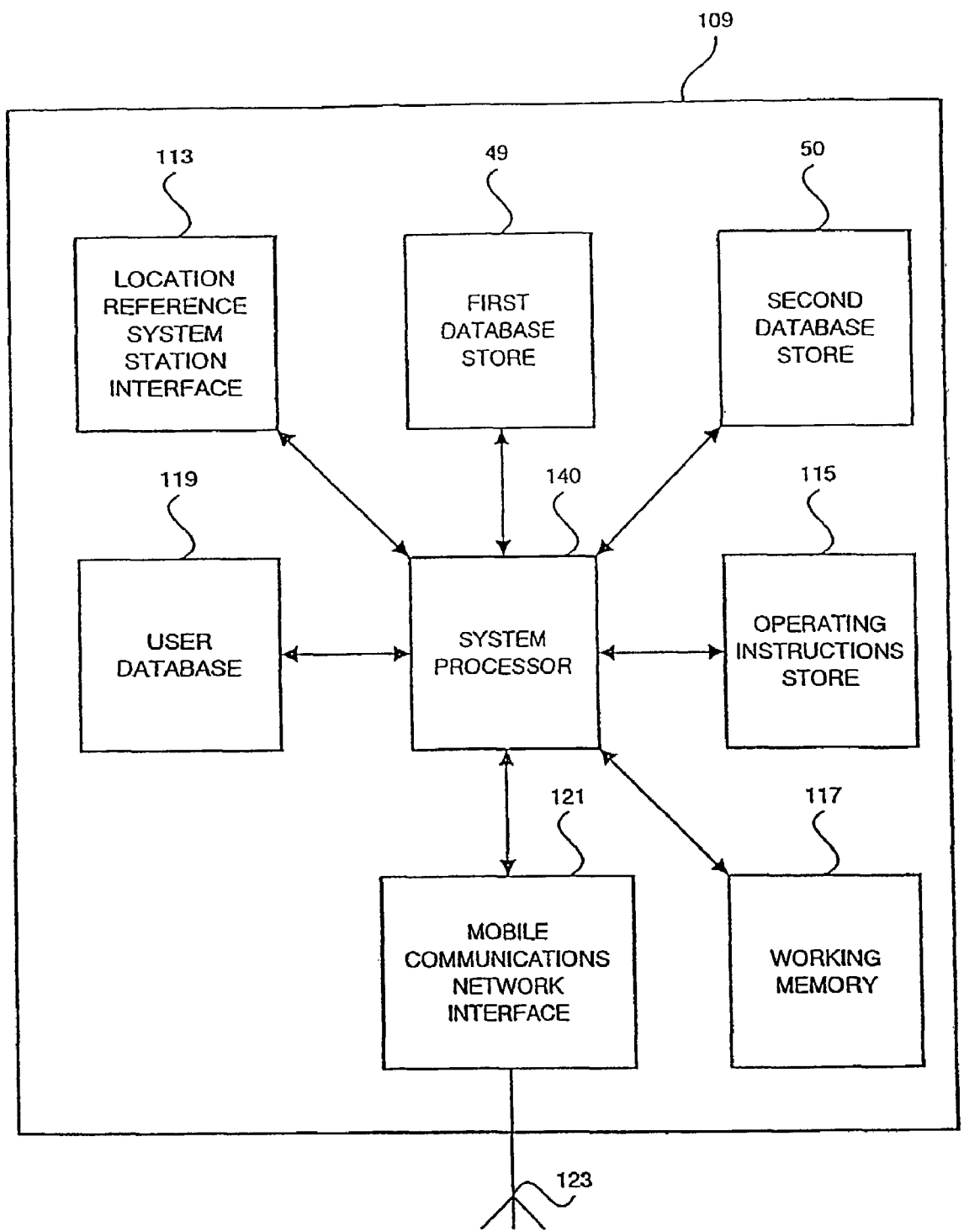
Figure 28A:
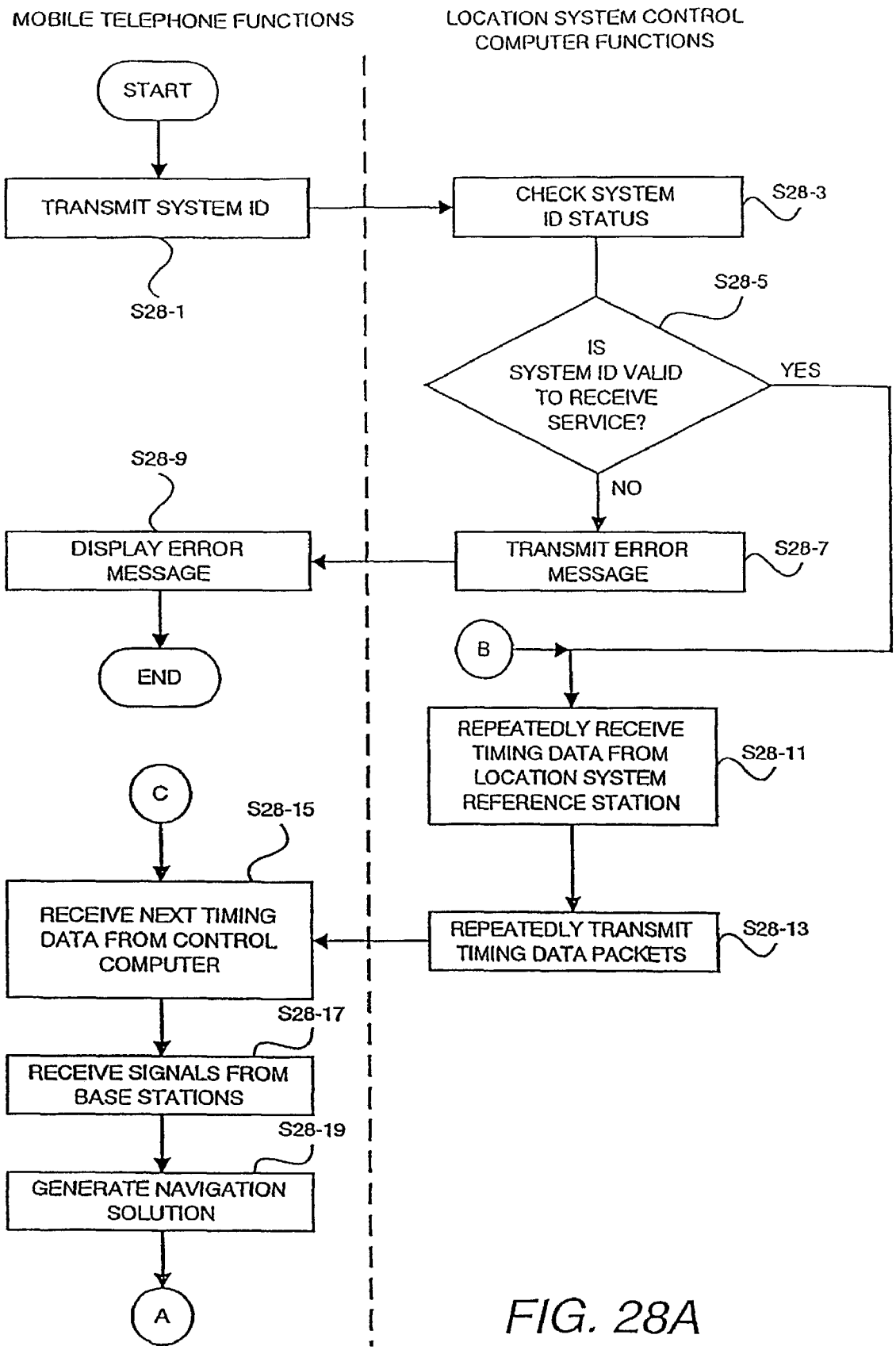
Figure 28B:
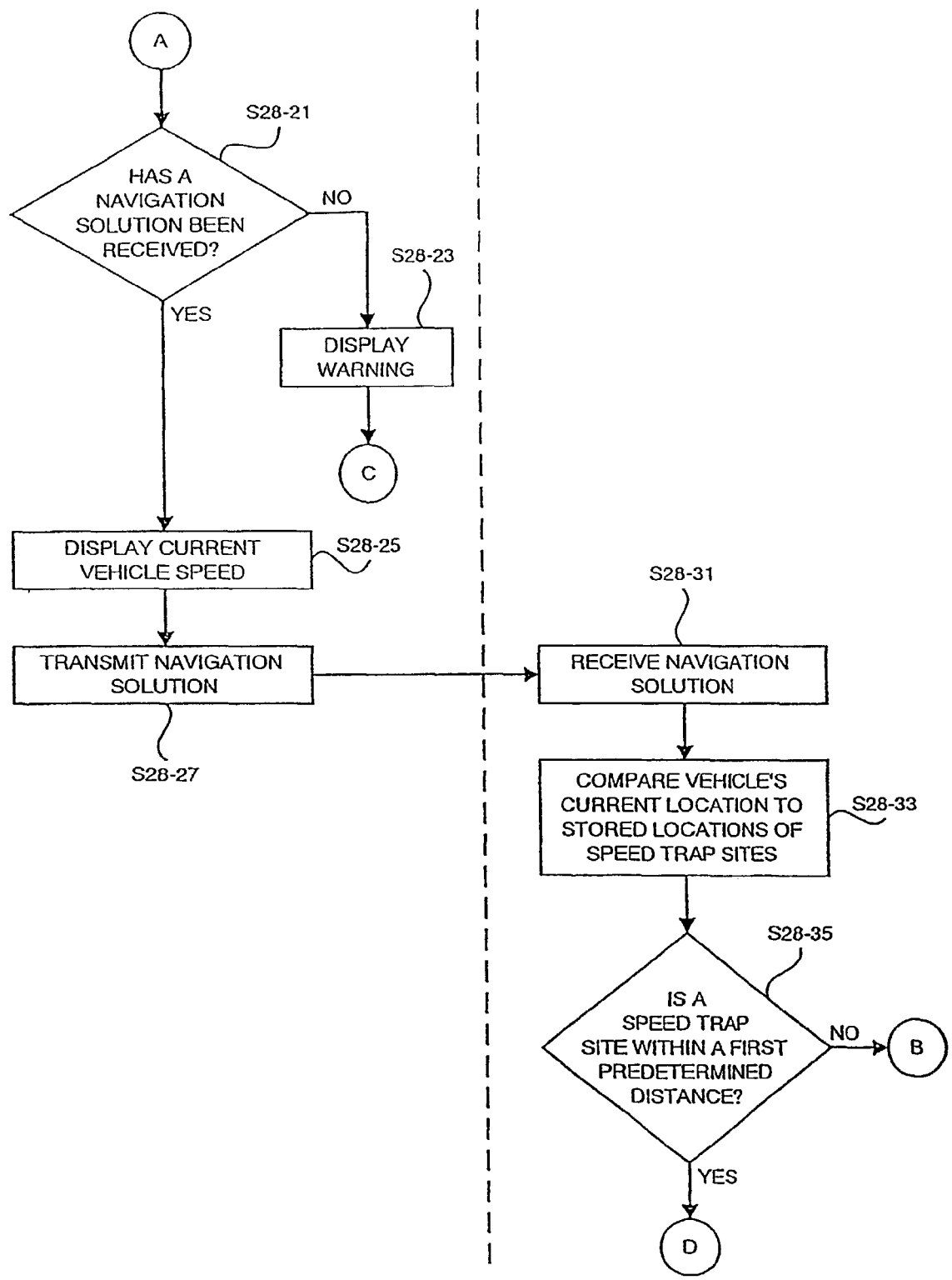
Figure 28C:
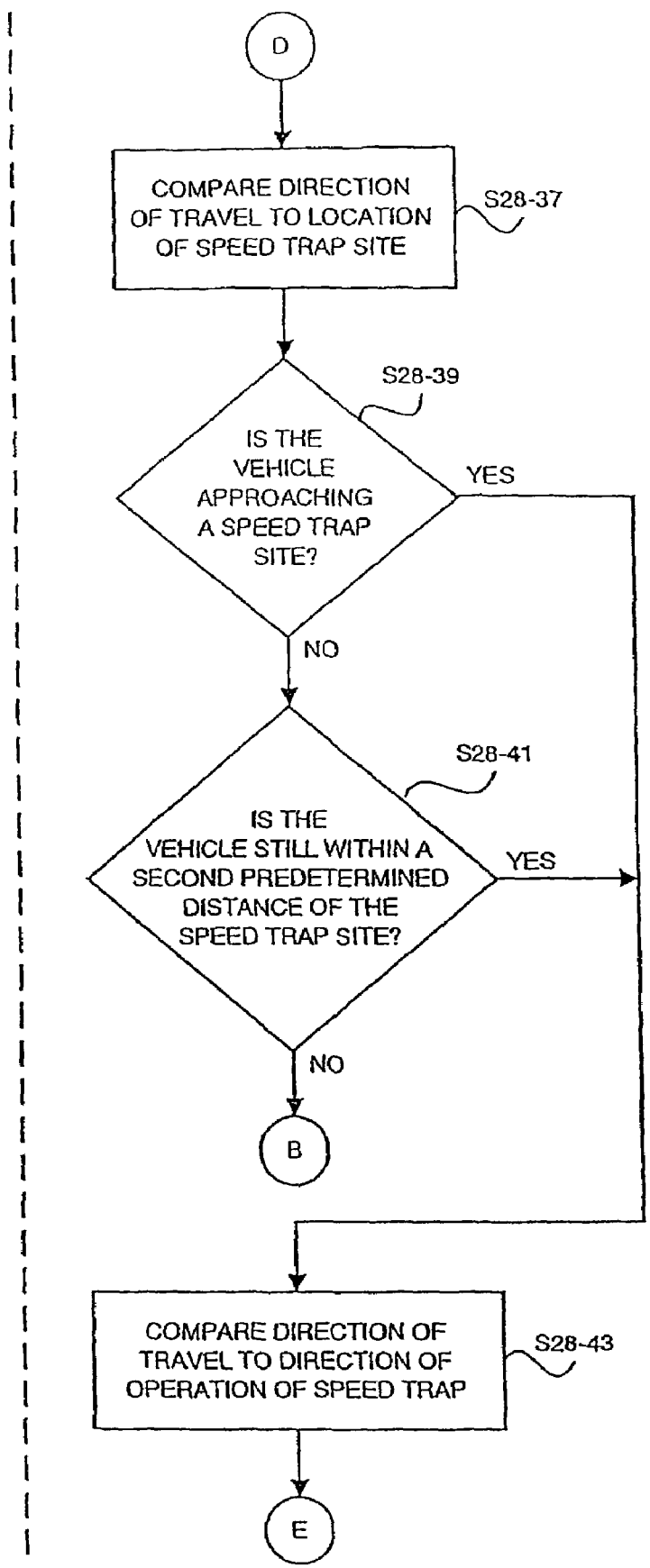
Figure 28D:
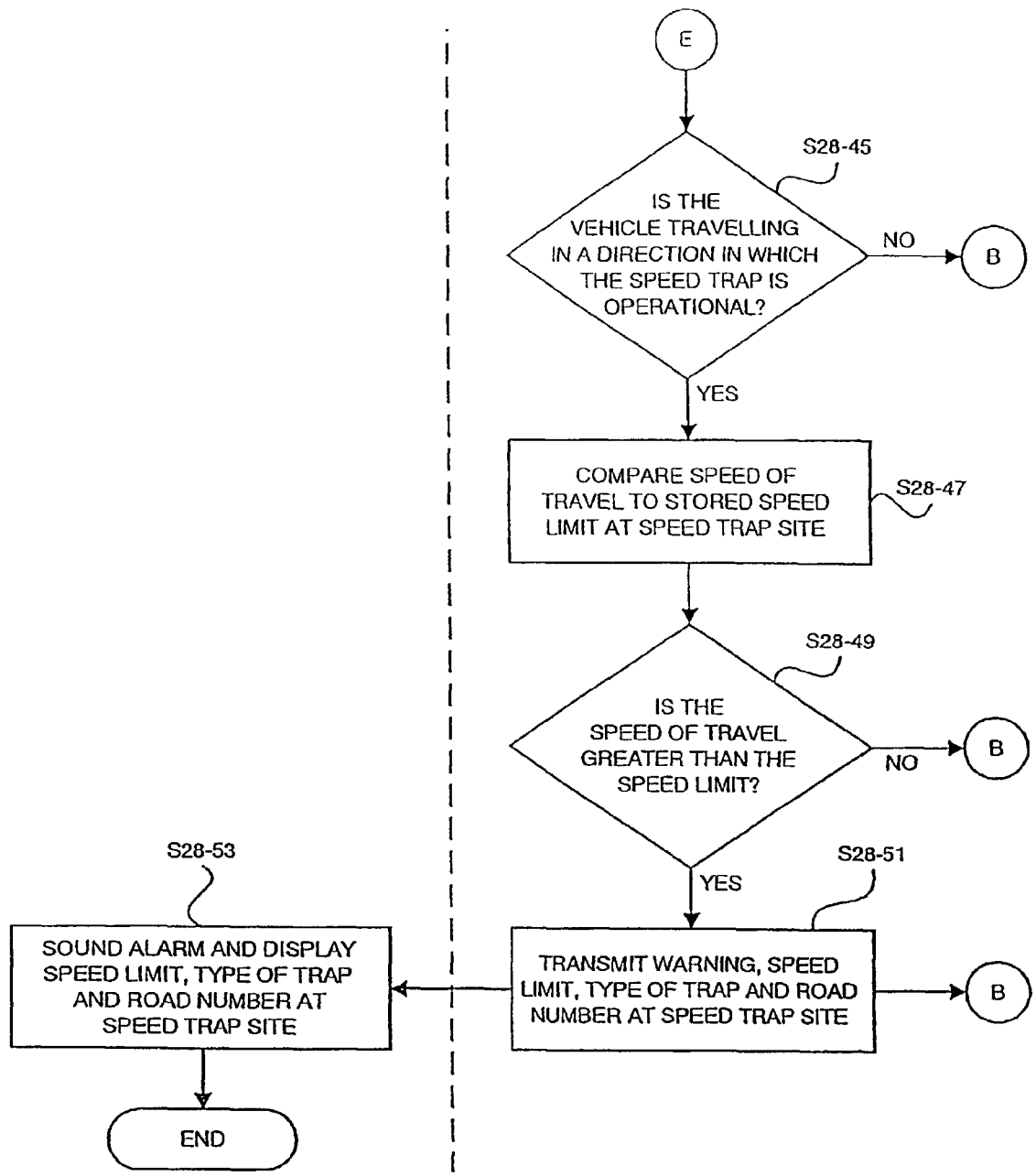
Figure 29A:
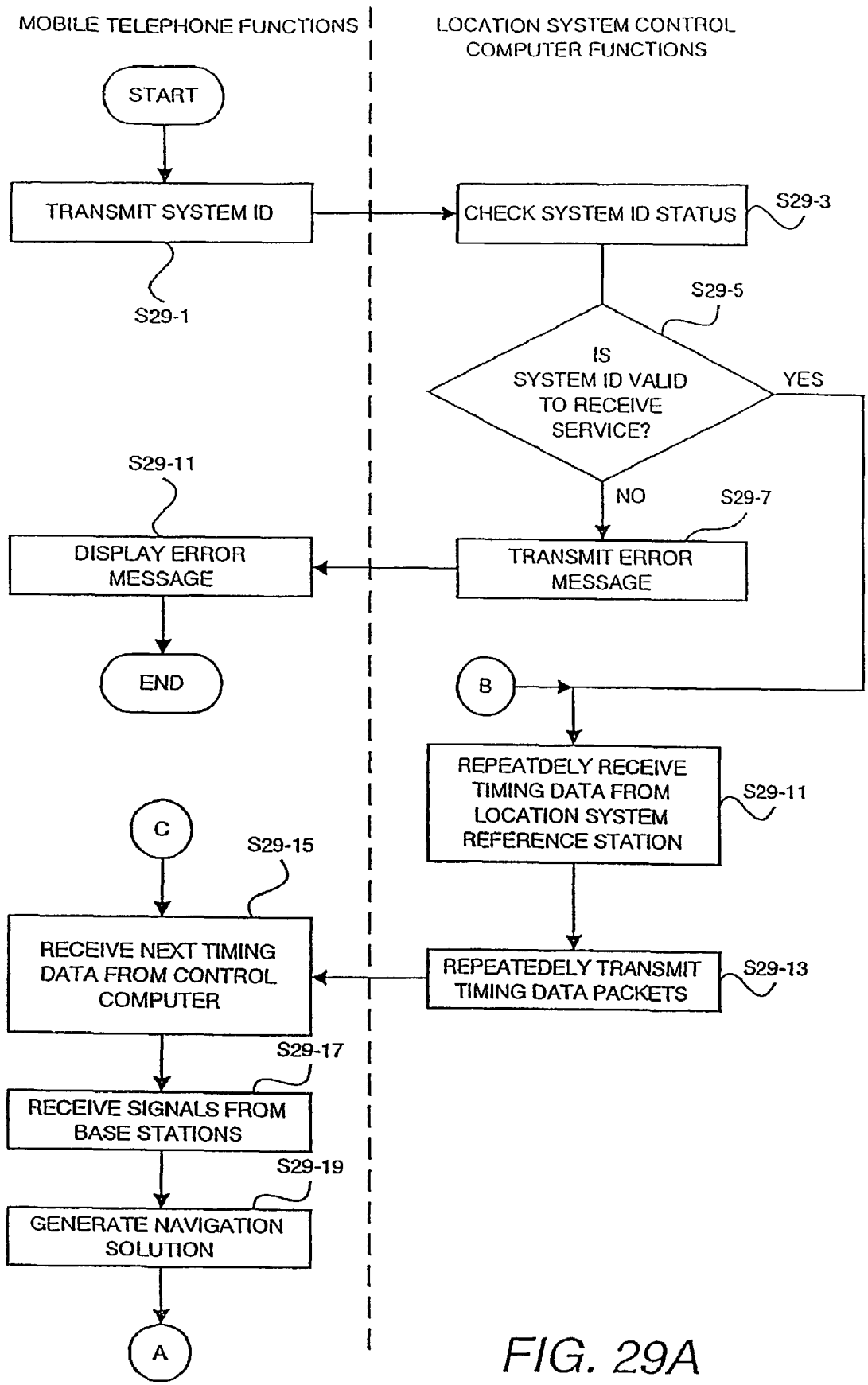
Figure 29B:
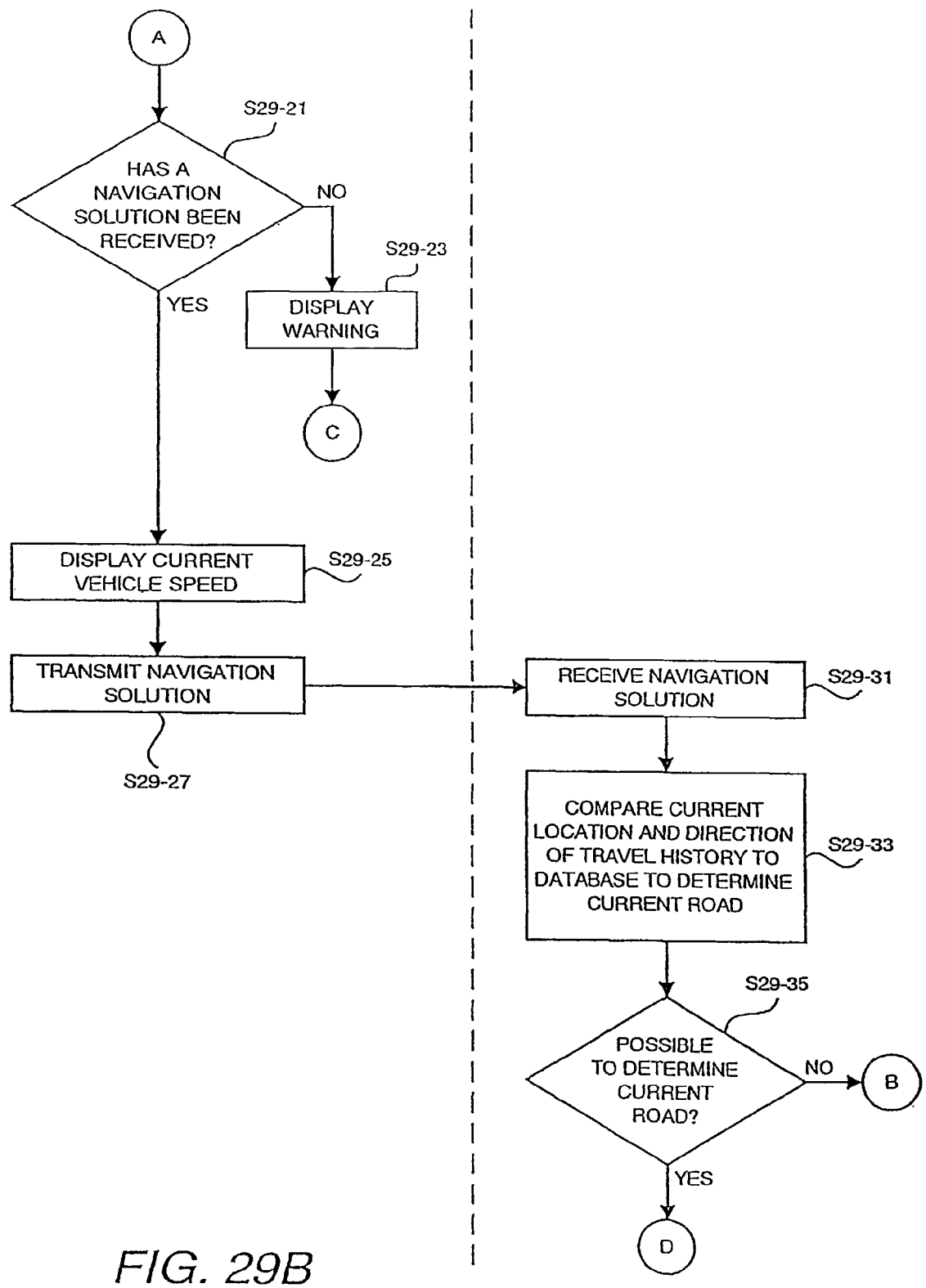
Figure 29C:
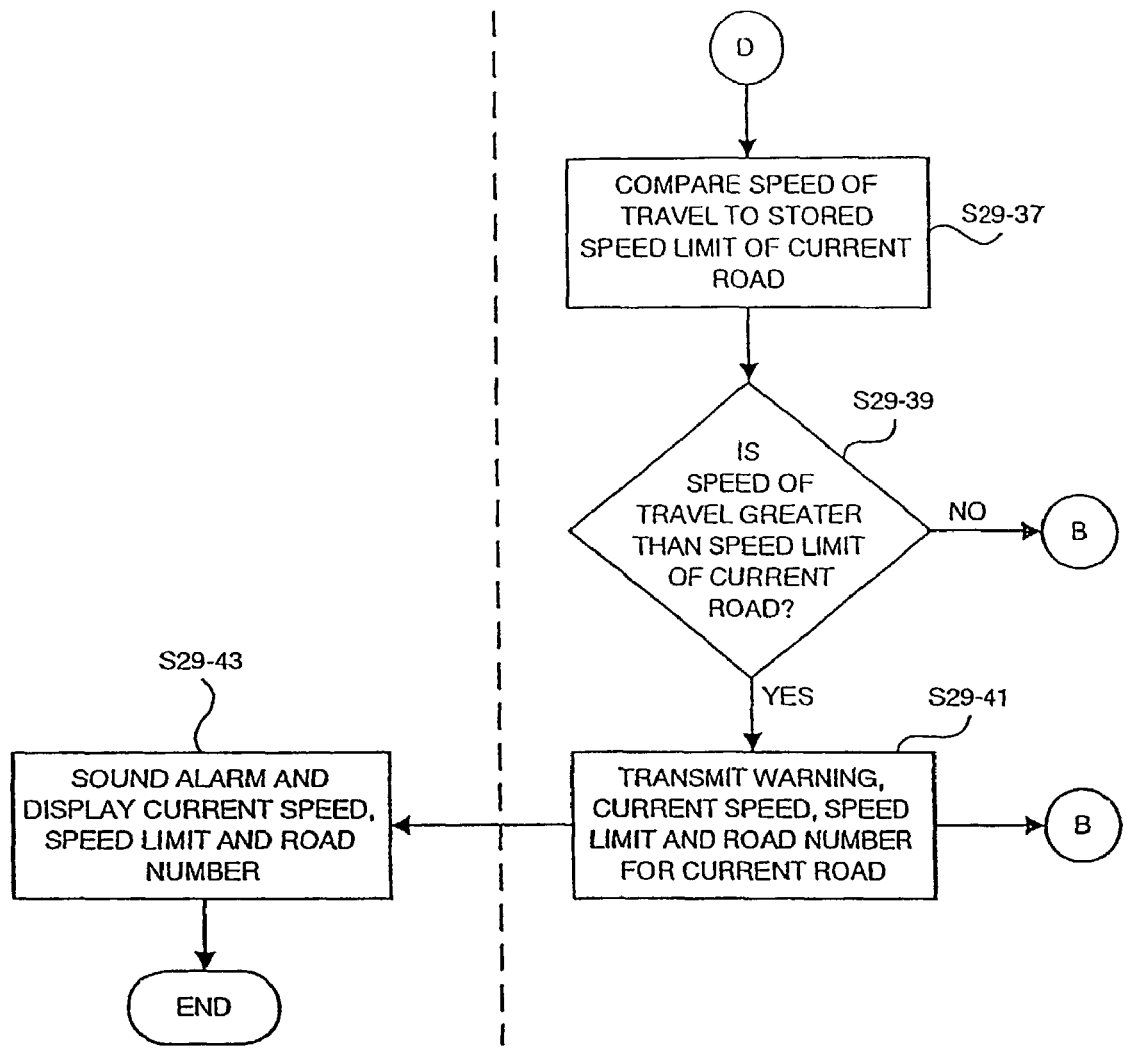
Figure 30A:
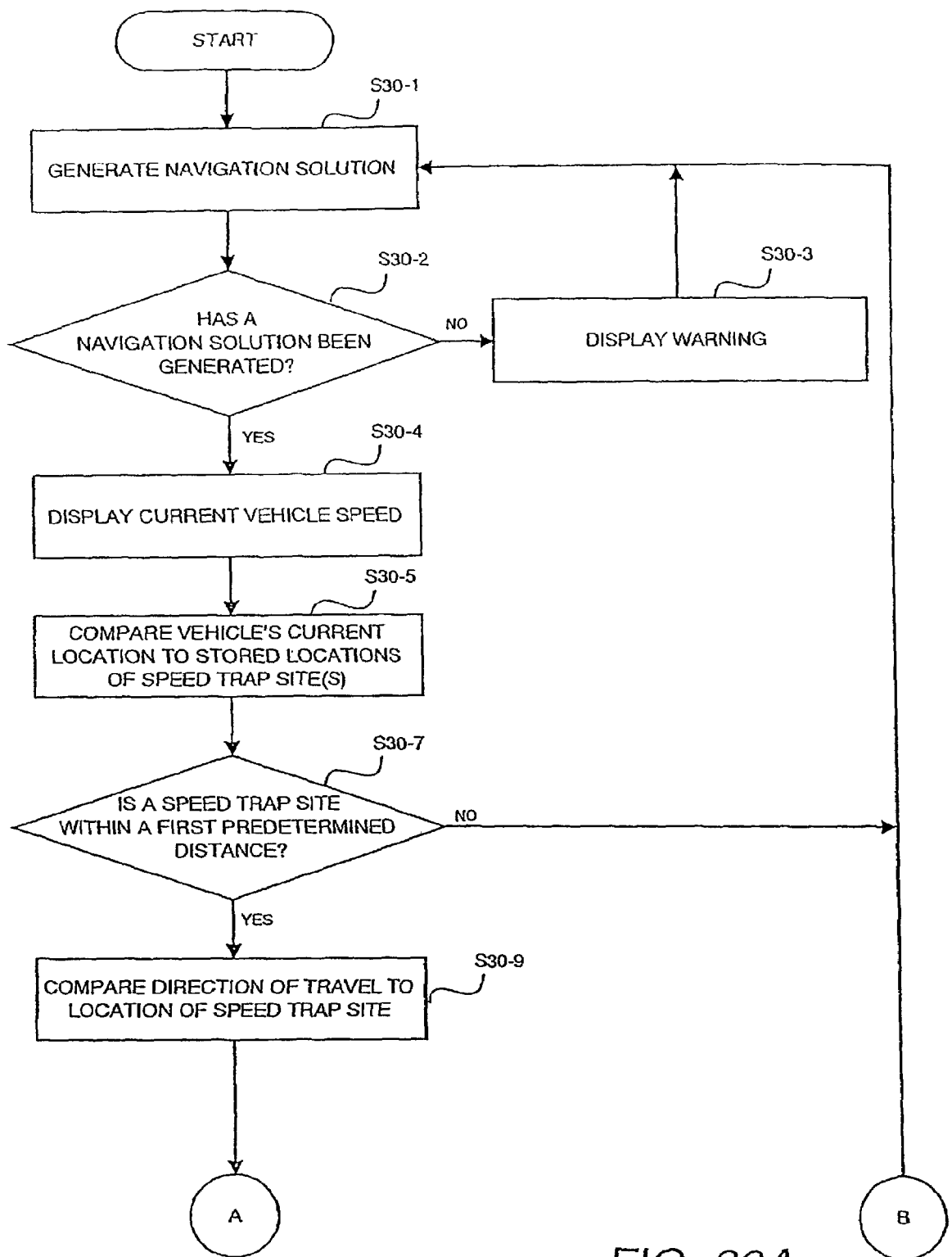
Figure 30B:
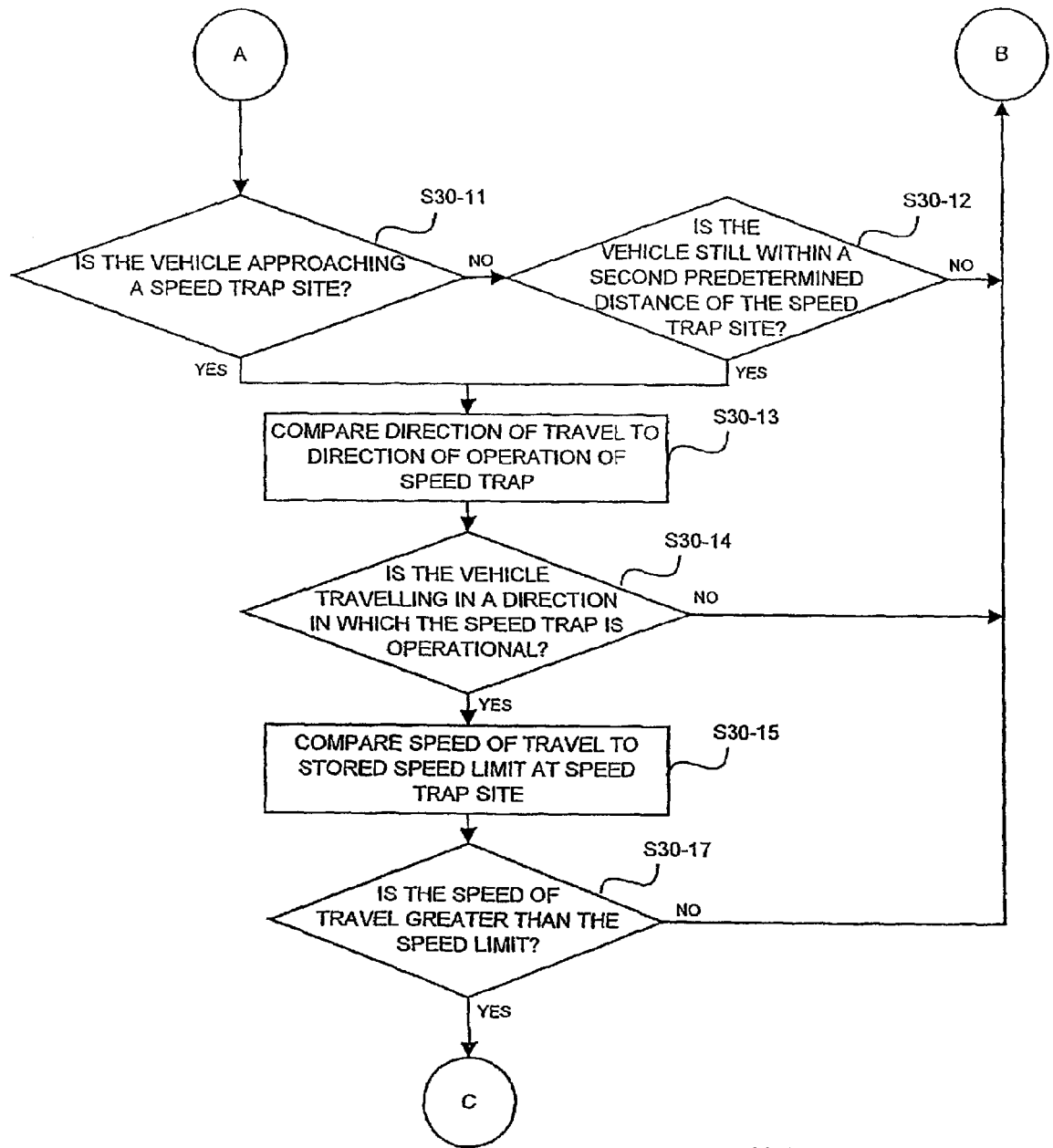
Figure 30C:
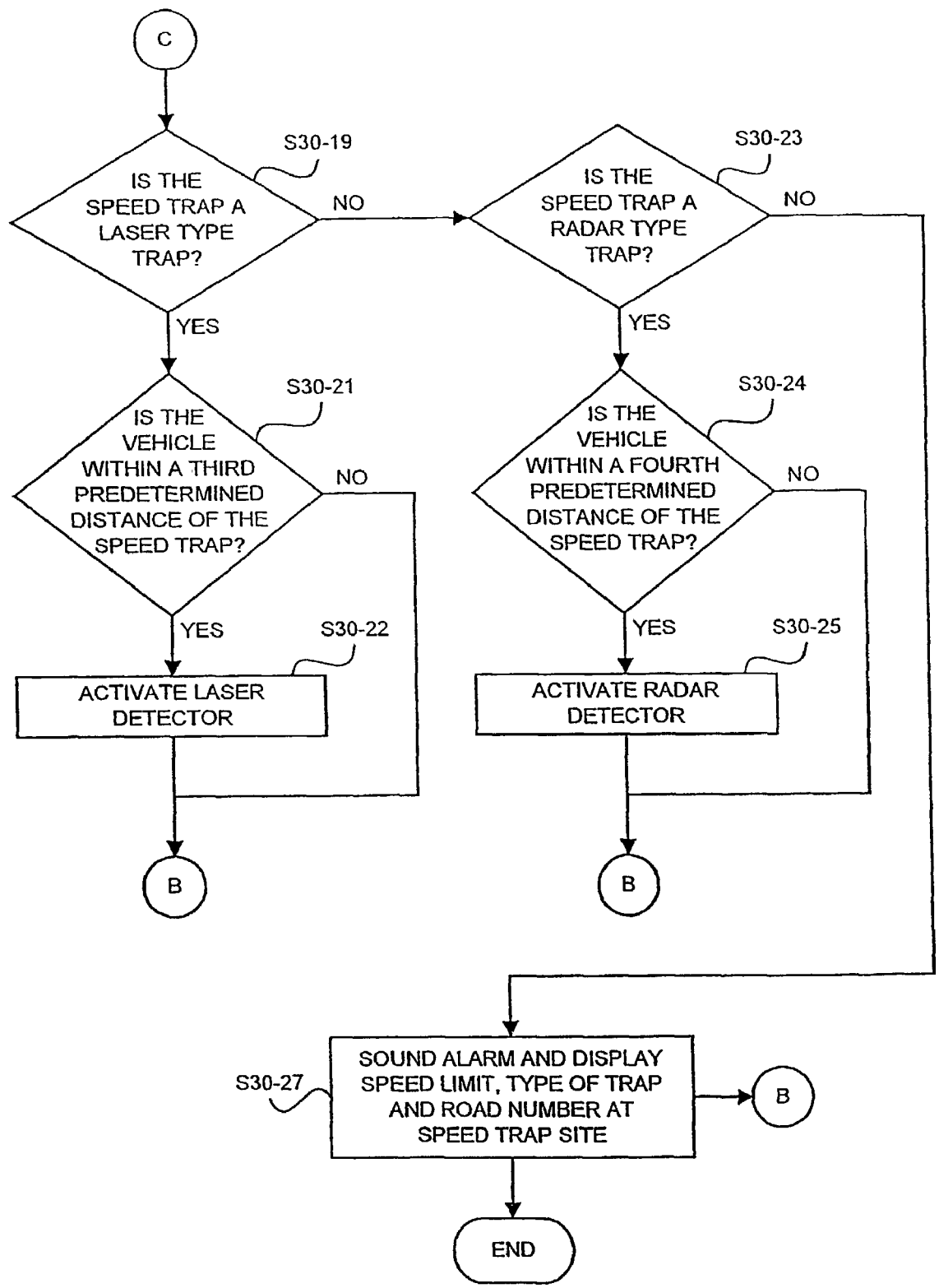
Figure 31:
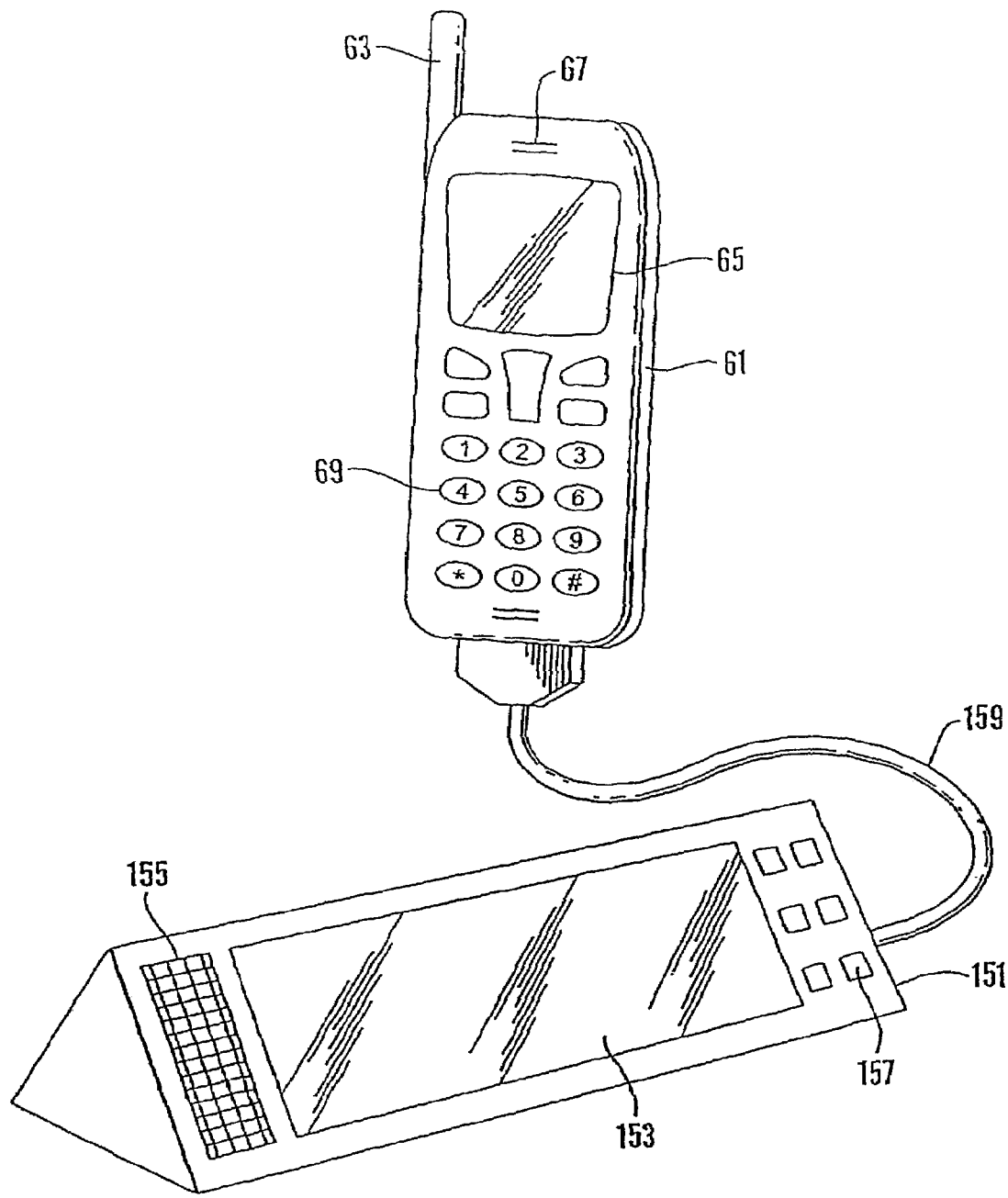
Figure 32A:
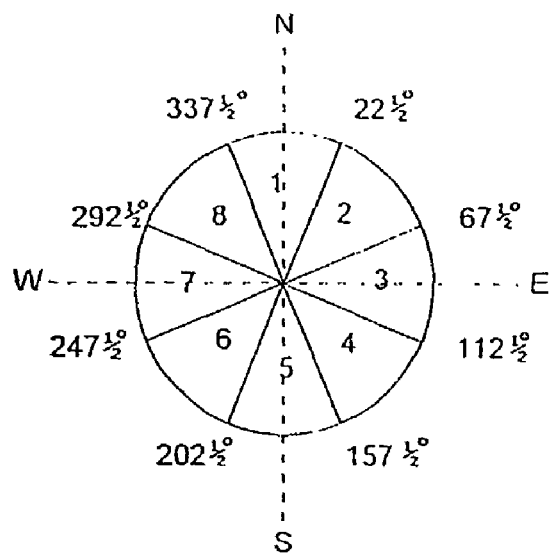
Figure 32B:
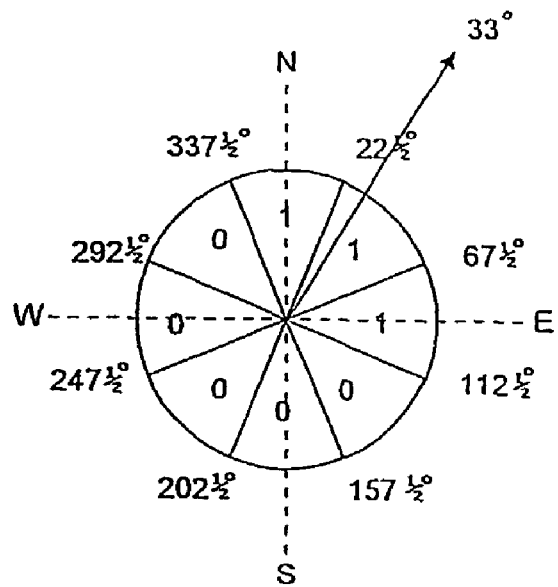
Figure 32C:
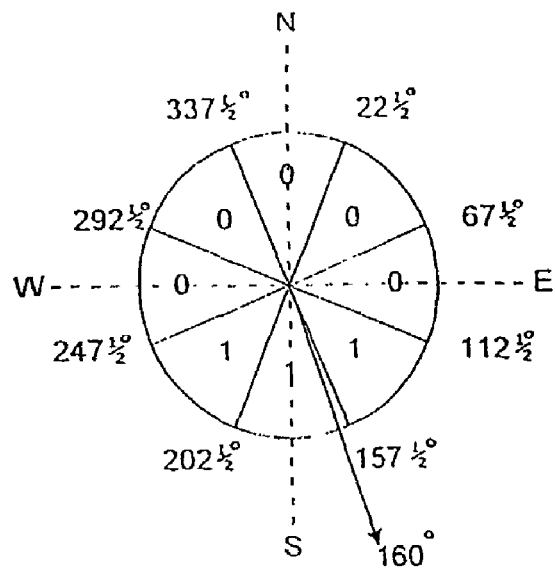
Figure 32D:
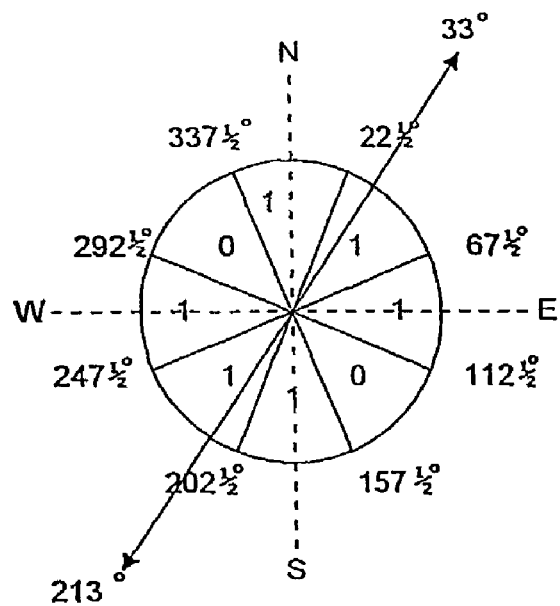
Figure 33:
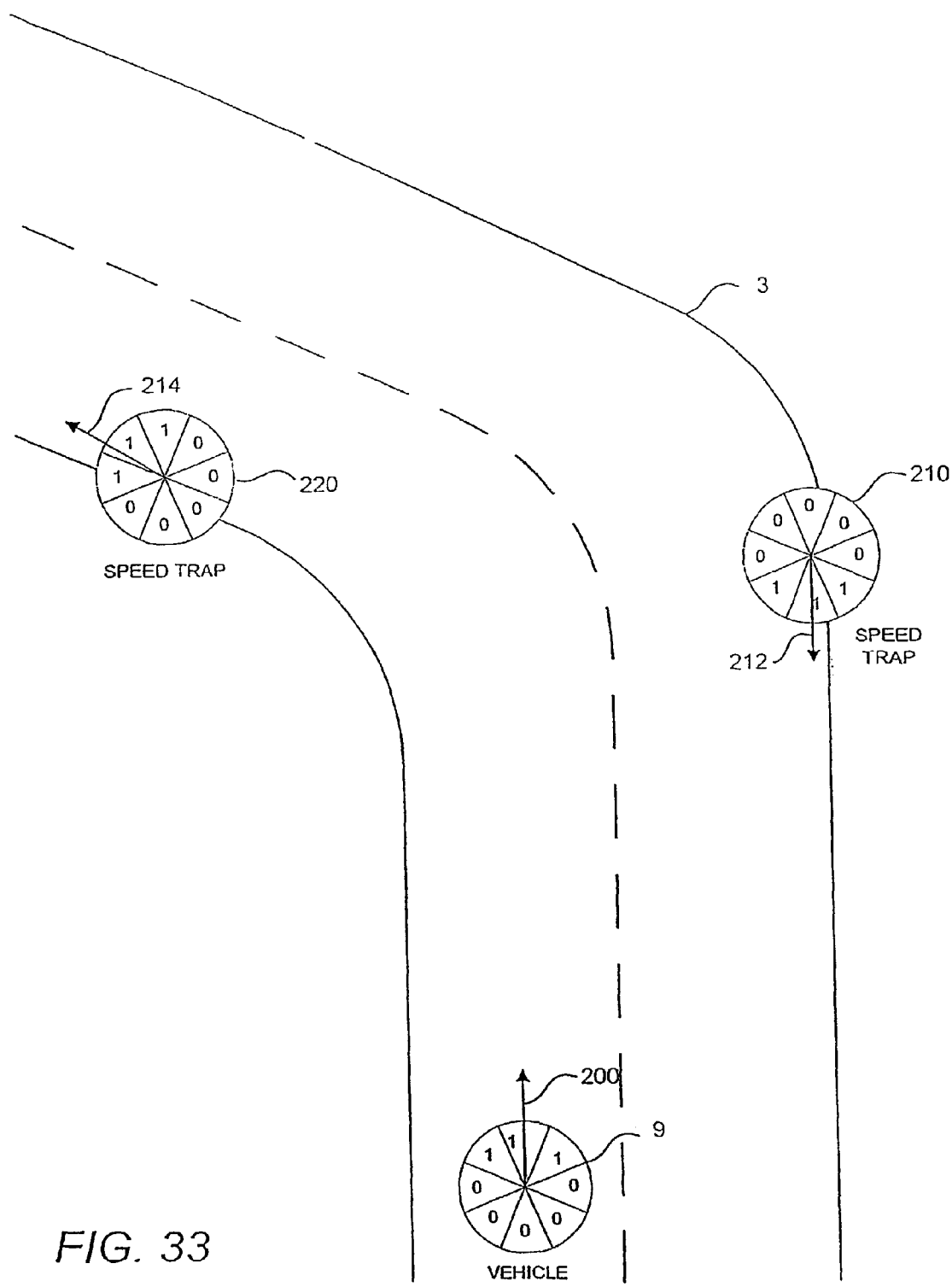

FIG. 5, which is composed of FIG. 5A and FIG. 5B, shows a flow diagram of the method of operation of the speed trap detection and warning system in a first operating mode in the first embodiment and the second embodiment;

FIG. 6 shows a flow diagram of the method of operation of the speed trap detection and warning system in a second operating mode in the first embodiment and the second embodiment;

FIG. 7 shows a mobile telephone adapted for use as a speed trap detection and warning system in a second embodiment (and subsequent embodiments);

FIG. 8 shows a block diagram of the functional components of the mobile telephone of FIG. 7 according to the second embodiment;

FIG. 9, which is composed of FIG. 9A and FIG. 9B is a block diagram of the functional components of the speed trap detection and warning system in a third embodiment, in which the system is split into two parts. FIG. 9A shows a block diagram of the functional components of the mobile telephone of FIG. 7 according to the third embodiment, and FIG. 9B shows a block diagram of the functional components of a database processor according to the third embodiment;

FIG. 10 which is composed of FIG. 10A, FIG. 10B and FIG. 10C shows a flow diagram of the method of operation of the speed trap detection and warning system of the third embodiment in a first operating mode;

FIG. 11 which is composed of FIG. 11A, FIG. 11B and FIG. 11C shows a flow diagram of the method of operation of the speed trap detection and warning system of the third embodiment in a second operating mode;

FIG. 12 is applicable to the fourth to seventh embodiments, and shows a road network in which speed traps are deployed and a vehicle, having a mobile telephone for use as a speed trap detection and warning unit, travelling through the road network. In these embodiments, the vehicle's position is calculated by processing signals transmitted between the mobile telephone in the vehicle and base stations in a telephone network;

FIG. 13 shows a block diagram of the functional components of the speed trap detection and warning system in the fourth to seventh embodiments;

FIG. 14 shows a block diagram of the functional components of the location system control computer of FIG. 13 according to the fourth embodiment;

FIG. 15 shows a block diagram of the functional components of the mobile telephone in the speed trap detection and warning system according to the fourth embodiment;

FIG. 16 which is composed of FIG. 16A, FIG. 16B, FIG. 16C and FIG. 16D, shows a flow diagram of the method of operation of the speed trap detection and warning system in a first operating mode in the fourth embodiment;

FIG. 17 which is composed of FIG. 17A, FIG. 17B and FIG. 17C shows a flow diagram of the method of operation of the speed trap detection and warning system in a second operating mode in the fourth embodiment;

FIG. 18 shows a block diagram of the functional components of the location system control computer according to a fifth embodiment;

FIG. 19 shows a block diagram of the functional components of the mobile telephone in the speed trap detection and warning system according to the fifth embodiments;

FIG. 20 which is composed of FIG. 20A, FIG. 20B, FIG. 20C and FIG. 20D shows a flow diagram of the method of operation of the speed trap detection and warning system in a first operating mode in the fifth embodiment;

FIG. 21 which is composed of FIG. 21A and FIG. 21B shows a flow diagram of the method of operation of the speed trap detection and warning system in a second operating mode in the fifth embodiment;

FIG. 22 shows a block diagram of the functional components of the location system control computer according to a sixth embodiment;

FIG. 23 shows a block diagram of the functional components of the mobile telephone in the speed trap detection and warning system according to the sixth embodiment;

FIG. 24 which is composed of FIG. 24A, FIG. 24B, FIG. 24C and FIG. 24D shows a flow diagram of the method of operation of the speed trap detection and warning system in a first operating mode in the sixth embodiment;

FIG. 25 which is composed of FIG. 25A, FIG. 25B and FIG. 25C shows a flow diagram of the method of operation of the speed trap detection and warning system in a second operating mode in the sixth embodiment;

FIG. 26 shows a block diagram of the functional components of a mobile telephone in the speed trap detection and warning system according to a seventh embodiment;

FIG. 27 shows a block diagram of the functional components of the location system control computer according to the seventh embodiment;

FIG. 28 which is composed of FIG. 28A, FIG. 28B, FIG. 28C and FIG. 28D shows a flow diagram of the method of operation of the speed trap detection and warning system in a first operating mode in the seventh embodiment;

FIG. 29 which is composed of FIG. 29A, FIG. 29B and FIG. 29C shows a flow diagram of the method of operation of the speed trap detection and warning system in a second operating mode in the seventh embodiment;

FIG. 30 which is composed of FIG. 30A, FIG. 30B and FIG. 30C shows a flow diagram of a method of operation of a speed trap detection and warning system in conjunction with a conventional laser detector and radar detector;

FIG. 31 shows a mobile telephone connected to a separate display unit for use in any of embodiments two to seven;

FIGS. 32A, 32B, 32C and 32D illustrate how an 8-bit word is generated in all of the embodiments defining a range of directions representing either operating directions of a speed trap or directions in which a vehicle may be travelling; and FIG. 33 is an example to illustrate the processing performed at steps S5-13 and S5-14 in the first embodiment and corresponding steps in the subsequent embodiments.

FIRST EMBODIMENT

Figure 1:
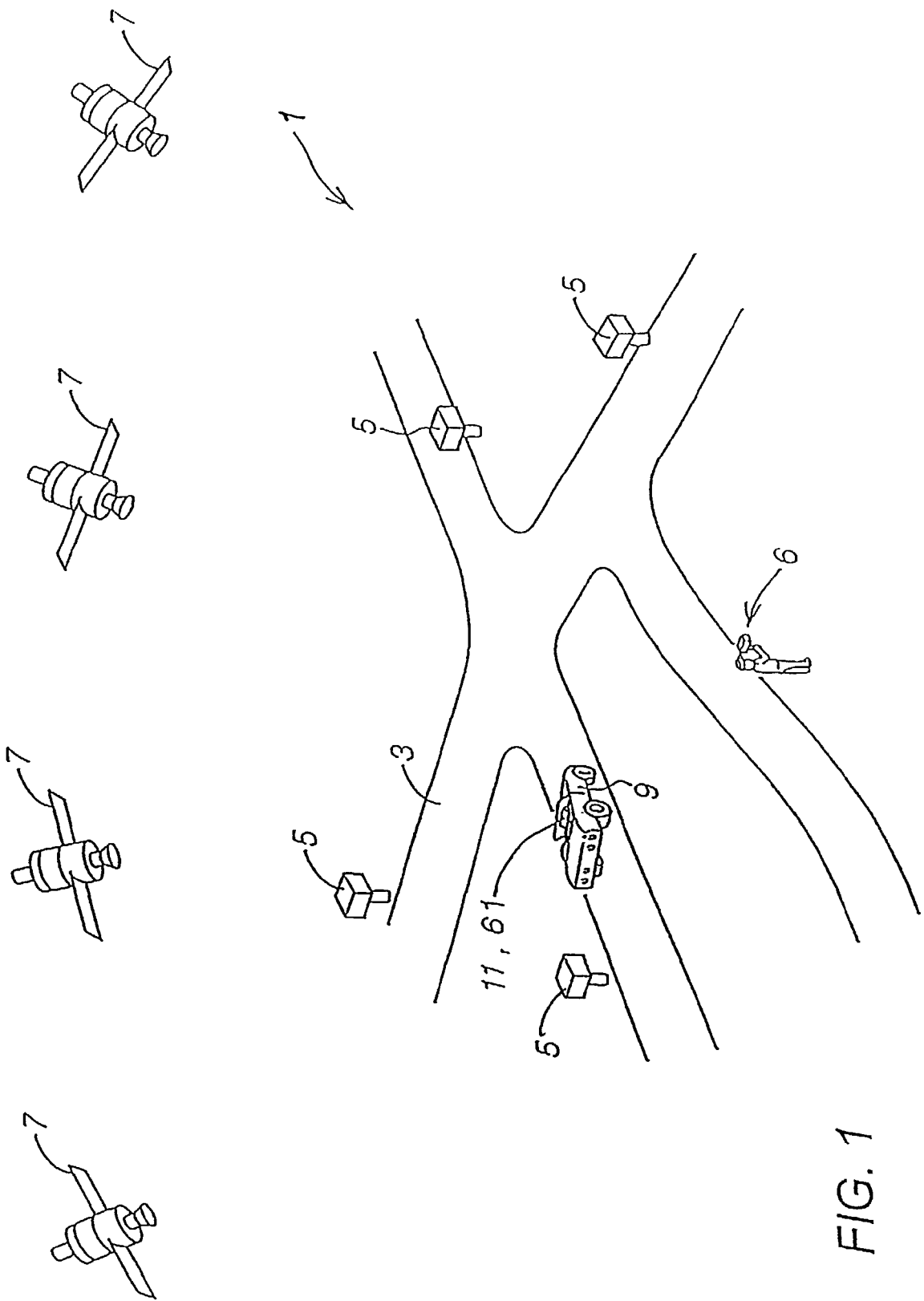
FIG. 1 is applicable to the first to third embodiments, and shows a road network in which speed traps are deployed and a vehicle having a speed trap detection and warning system travelling through the road network. In these embodiments, the speed trap detection and warning system calculates the vehicle's position by processing satellite signals.

Referring to FIG. 1, a road network 1 comprises a plurality of roads 3 along which a plurality of speed traps 5,6 are deployed. The speed traps take the form of fixed speed traps 5 and a mobile speed trap 6, such as a hand-held radar gun.

Driving along the roads 3 is a vehicle 9, which is equipped with a speed trap detection and warning unit 11. As will be explained in more detail below, the speed trap detection and warning unit 11 has stored within it, among other things, the satellite GPS (Global Positioning System) positions of the fixed speed traps 5 and known positions where it is common for mobile speed traps 6 to be situated, together with the respective speed limit for the part of the road 3 at which each speed trap 5, 6 is situated, and the direction of travel in which the speed trap is operational (that is, the direction in which each speed trap 5 is pointing to record speeding vehicles, or both directions in the case of a mobile speed trap site 6 since a radar or laser gun can be pointed to detect speeding vehicles in either road direction). In this embodiment, the speed trap detection and warning unit 11 uses signals from satellites 7 belonging to the NAVSTAR (NAVigation System with Time And Ranging) GPS system to determine its position, speed and direction of travel (and hence the position, speed and direction of travel of the vehicle 9), compares these parameters with the positions, operating directions and speed limits of the speed traps 5,6 stored in its internal database, and provides a warning to the driver of the vehicle 9 when a speed trap 5,6 which is operational in the direction of travel of the vehicle 9 is being approached and the speed of the vehicle 9 exceeds the speed limit at the speed trap 5,6. The speed trap detection and warning unit 11 is arranged to provide the warning well in advance of the speed trap 5,6 enabling the driver to reduce speed progressively, thereby increasing safety for the driver and other road users.

In addition, as will also be explained below, the speed trap detection and warning unit 11 has stored within it a map of the roads 3 within network 1 together with the respective speed limit for each part of each road. In a second operating mode, the speed trap detection and warning unit 11 uses signals from the satellites 7 to determine the position and speed of the vehicle 9, compares the position and speed with the road map and speed limits stored in its internal database, displays the speed limit to the driver for the road 3 on which he is travelling, and alerts the driver if the speed of vehicle 9 exceeds the speed limit for the road.

Figure 2:
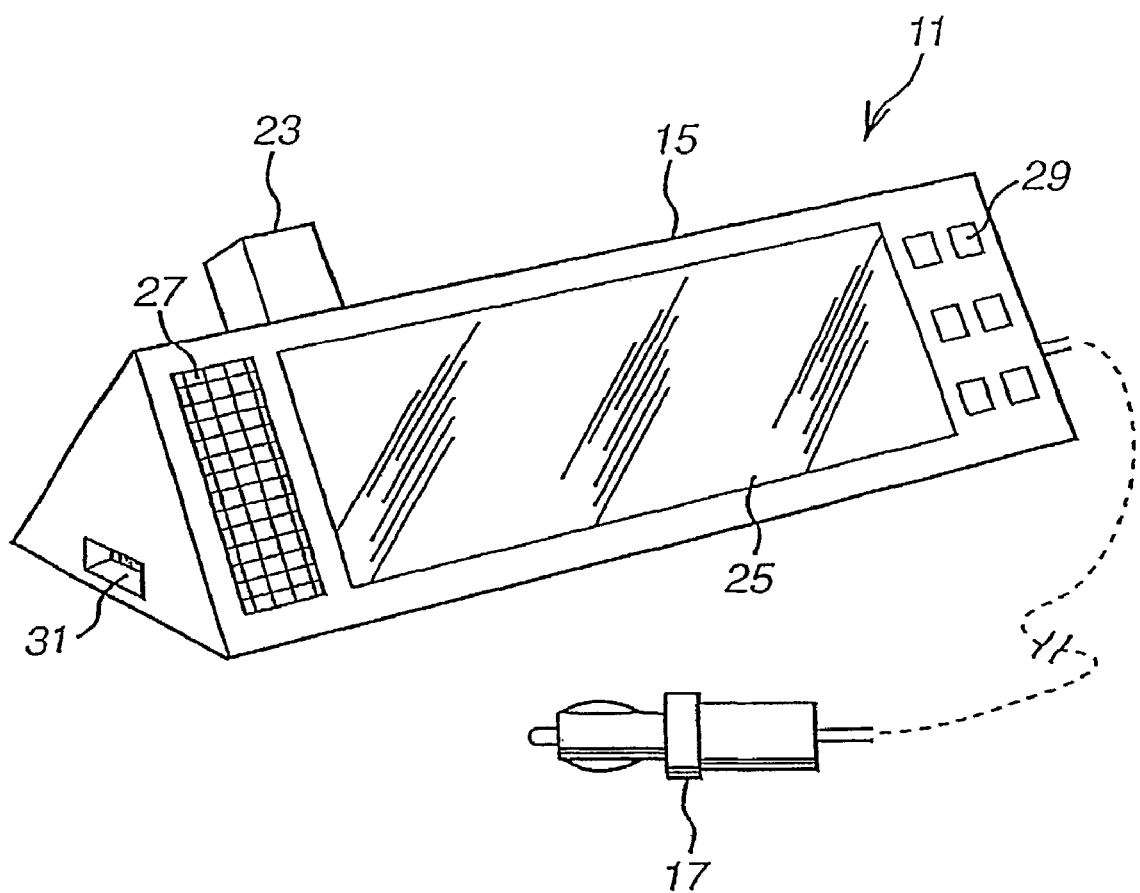
FIG. 2 shows a perspective view of the speed trap detection and warning system from the vehicle in FIG. 1 according to a first embodiment.

Referring now to FIG. 2, the speed trap detection and warning unit 11 in the first embodiment comprises a display and processing unit 15 and a power connector 17.

The display and processing unit 15 comprises an antenna 23 for receiving signals from the satellites 7, processing hardware and memory (not shown in FIG. 2, but described below) to process the received signals, a liquid crystal display 25 for displaying information to a user, a speaker 27 for providing audible signals to a user and input buttons 29 for the input of instructions by a user to control the speed trap detection and warning unit 11. In addition, a telephone lead socket 31 is provided for connecting the speed trap detection and warning unit 11 to a remote database for loading and updating information about, inter alia, the positions of speed traps 5,6, the speed limits there at and the operational directions thereof as further fixed speed traps 5 are added to the road network 1 and/or as mobile speed traps 6 are used in more locations, and for loading and updating information about the speed limit for each part of each road 3 in the road network 1 as roads are built and/or speed limits on the roads are changed.

The power connector 17 comprises an adapter for drawing power from a motor vehicle cigarette lighter socket (not shown).

Figure 3:
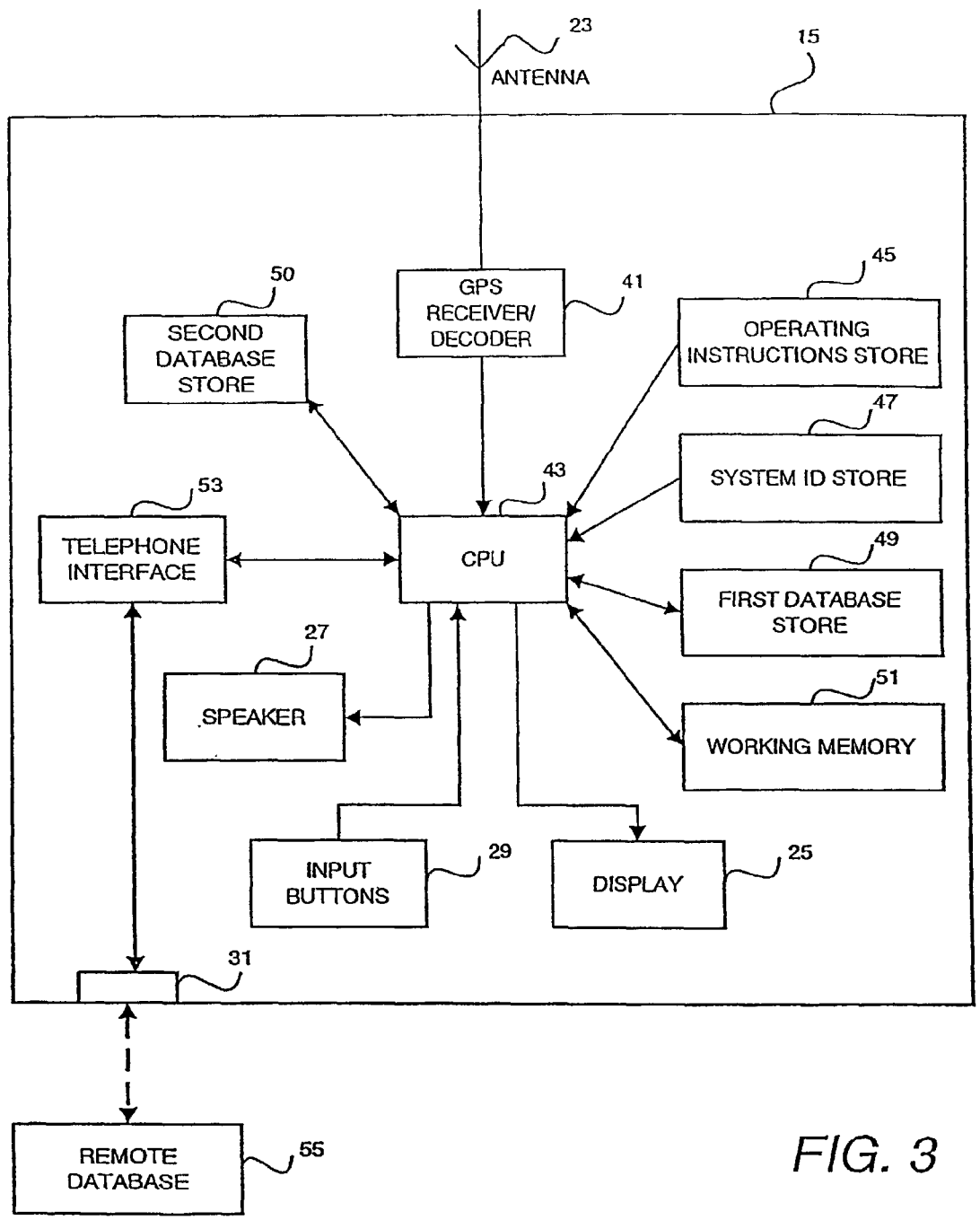
FIG. 3 shows a block diagram of the functional components of the speed trap detection and warning system in the first embodiment.

FIG. 3 is a block diagram showing the functional elements of the display and processing unit 15 in the first embodiment.

Referring to FIG. 3, the antenna 23 receives signals from the GPS satellites 7 and sends them to a GPS receiver/decoder 41. The GPS receiver/decoder 41 is a conventional component, such as the Trimble Navigation Lassen™—SK8 Embedded GPS Core Module, which processes the received GPS signals and outputs what is known in the art as a "navigation solution", which comprises a data stream defining the position, speed and direction of travel of vehicle 9.

The navigation solution from the GPS receiver/decoder 41 is passed to a central processing unit (CPU) 43 which operates according to instructions stored in an operating instruction store 45 to perform processing as will be described below. Working memory 51 is provided for the CPU 43 to use while performing processing.

The GPS positions of the fixed speed traps 5 and known positions at which it is common for a mobile speed trap 6 to be situated are stored in a first database store 49. Also stored in first database store 49 in this embodiment is data defining the respective road speed limit at each speed trap location, the type of each speed trap (that is, the detection method by which it operates and/or whether it is a fixed or a mobile site), the direction of travel in which each speed trap is operational and the number of the road on which each speed trap is located. In addition, data is stored in the first database 49 defining a telephone number to be used by the CPU 43 for updating the database contents (as described later).

In this embodiment, the data stored in the first database store 49 defining the direction in which each speed trap is operational comprises an 8-bit word for each speed trap defining a range of operating directions.

More particularly, referring to FIG. 32A, the 360° of the compass are divided into eight 45° segments and one bit of an 8-bit word is assigned to each segment. In this embodiment, bit 1 is assigned to the segment between 337½° to 22½°, bit 2 is assigned to the segment between 22½° to 67½°, bit 3 is assigned to the segment between 67½° to 112½°, bit 4 is assigned to the segment between 112½° to 157½°, bit 5 is assigned to the segment between 157½° to 202½°, bit 6 is assigned to the segment between 202½° to 247½°, bit 7 is assigned to the segment between 247½° to 292½°, and bit 8 is assigned to the segment between 292½ to 337. In the 8-bit word for a speed trap, the bit corresponding to the segment in which the measured operating direction of the speed trap lies is set to 1. In addition, to take account of errors in the measurement of this direction, the bits corresponding to the segments on either side of the segments in which the measured direction lies are also set to 1. The remaining bits are set to 0.

Thus, referring to FIG. 32B, if the operating direction of a speed trap is measured as 33°, then the 8-bit word stored in first database 49 for the speed trap is 11100000 (bit 2 being set to 1 because it corresponds to the segment in which the measured operating direction lies, and bits 1 and 3 being set to 1 because they correspond to the segments lying on either side of the segment in which the measured operating direction lies). Similarly, referring to FIG. 32C, if the measured operating direction of a speed trap is 160°, the 8-bit word stored in first database 49 is 00011100.

In some cases, a speed trap may be operable to detect vehicles travelling in more than one direction (for example if a fixed speed trap can be rotated on its mount, or if the speed trap is user-operated, such as a radar gun). In this case, the 8-bit word stored in first database 49 defines more than one range of operating directions. By way of example, referring to FIG. 32D, if a speed trap can be operated in a direction 33° and also in the opposite direction 213°, then the 8-bit word stored in first database 49 is 11101110.

As will be explained in more detail later, by defining speed trap operating directions in the manner described above, the direction of travel of the vehicle 9 can be compared with the stored speed trap operating directions easily and quickly.

A second database store 50 is provided for storing data for use in a second operating mode of the speed trap detection and warning unit 11. Stored in the second data base store 50 is data describing the GPS positions for every road 3 in a selected road network 1, and the data describing the respective road speed limit on each part of each road. Also stored in the second database store 50 in this embodiment is data defining the road number of each road in the network.

As will be described below, in use, CPU 43 compares the navigation solution in the data from the GPS receiver/decoder 41 with the data from the first database store 49 or the second database store 50, and displays information to the driver of the vehicle 9 via the display 25 and/or generates an audible alert through the speaker 27.

Input buttons 29 are provided for the user to select the operating mode of the speed trap detection and warning unit 11, and to change operating parameters such as the volume of audible alerts and the information to be displayed on the screen. In addition, a button is provided for initiating a function (described below) to update the data stored in the first database store 49 and the second database store 50. The update function makes use of a system ID which is unique for each speed trap detection and warning unit 11 and which is stored in a system ID store 47.

A telephone interface 53 is provided for connecting with a remote database 55, which is not a part of the speed trap detection and warning unit 11, via the telephone lead socket 31. That is, a cable (not shown) is used to connect between the telephone lead socket 31 and a telephone network (not shown) so as to connect the speed trap detection and warning unit 11 to a remote database 55 which is also connected to the telephone network. The remote database 55 stores data for storage in the first database store 49 defining the position of each speed trap 5,6 the road number of the road 3 on which each speed trap is located, the speed limit of the road 3 for the position at which the speed trap is located, the operating direction(s) of each speed trap and the type of speed trap. In addition, remote database 55 stored data for storage in the second database store 50 defining the positions of each road 3 in the road network 1, the road number of each road 3 and the speed limit for each part of each road 3. The data in database 55 is updated when an additional fixed speed trap 5 is added to the road network 1, when an additional site at which a mobile speed trap 6 is frequently used becomes known, when new roads are added to the road network 1 or when the speed limit for an existing road is changed. The telephone interface 53 allows the CPU 43 to execute the update database function to use information from the remote database 55 to replace the data stored in the first database store 49 and the second database store 50.

The processing operations of the speed trap detection and warning unit 11 will now be described.

The operation to load data into, or update data in, database store 49 and second database store 50 will be described first with reference to FIG. 4.

Figure 4:
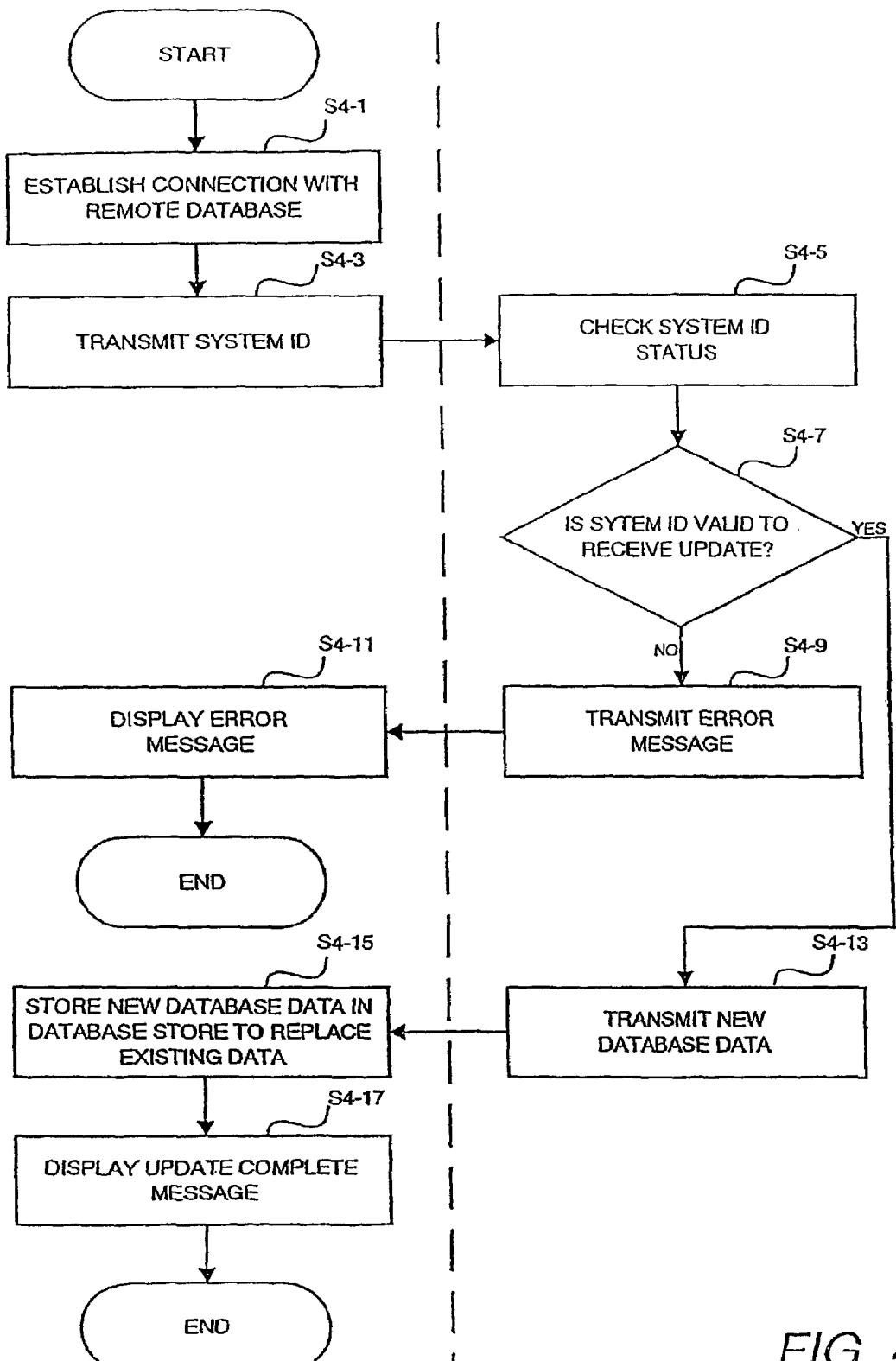
FIG. 4 shows a flow diagram of a process for preparing the speed trap detection and warning system for use in the first embodiment. The operations shown in FIG. 4 are also applicable to all of the other embodiments.

In FIG. 4, all functions on the left-hand side of the dotted line are functions performed by the speed trap detection and warning unit 11 and all functions on the right-hand side are functions performed by the remote database 55.

In step S4-1 the speed trap detection and warning unit 11 establishes connection with the remote database 55. In this step, the speed trap detection and warning unit 11 dials the telephone number of the remote database 55 which is stored in the first database store 49 within the speed trap detection and warning unit 11, and conventional "handshaking" techniques are used to establish connection.

In step S4-3, once connection between the speed trap detection and warning unit 11 and the remote database 55 has been established, the speed trap detection and warning unit 11 transmits the system ID stored in system ID store 47 to the remote database 55.

In steps S4-5 and S4-7 the remote database 55, upon receiving the system ID from the speed trap detection and warning unit 11, checks the status of the received system ID and determines whether the speed trap detection and warning unit 11 having that particular system ID is entitled to receive an update. In this embodiment, a particular speed trap detection and warning unit 11 is barred from receiving an update if that unit has been reported stolen or if the owner of the unit has not paid the subscription fee necessary for the owner to receive database data.

If it is determined at step S4-7 that the speed trap detection and warning unit 11 is not to receive an update, an error message is transmitted in step S4-9.

Upon receiving such an error message, at step S4-11 the speed trap detection and warning unit 11 displays an error message to the user on the display 25 so that the user is aware that he is not receiving an update. The user can then take appropriate action, such as contacting the provider of the remote database 55 to arrange for his entitlement to receive an update to be restored. Following display of the error message the update database function then ends.

On the other hand, if it is decided at Step S4-7 that the speed trap detection and warning unit 11 is entitled to receive an update, then the new database data is transmitted at step S4-13. The new database data transmitted comprises a complete set of up-to-date GPS positions of all known fixed speed traps 5 and positions where it is common for mobile speed trap 6 to be situated, together with the road speed limit at all the positions, the type of speed trap, the operational direction of each speed trap, and the road number on which each speed trap is located. The new database data further comprises the GPS positions of all roads and the speed limit on each part of each road. The new database data also comprises all telephone numbers on which the remote database 55 may be accessed such that in the event of any new telephone phone numbers being added or any numbers being for any reason unavailable, the speed trap detection and warning unit 11 will still be able to access the remote database 55 next time an update is required.

Upon receiving the new database data, in step S4-15 the speed trap detection and warning unit 11 stores the new database data in the first and second database stores 49 and 50 to replace the existing data.

Once all of the new database data has been stored in the first and second database stores 49 and 56, in step S4-17 the speed trap detection and warning unit 11 displays an update complete message to the user on the display 25. The update database function then ends and the speed trap detection and warning unit is ready for use.

Although the update database function has been described in the context of preparing the speed trap detection and warning unit 11 for first use, the function is also used to update the contents of the database 49 to 50 to ensure that up-to-date databases are being used.

The operation of the speed trap detection and warning unit 11 in warning the driver of vehicle 9 of one or more approaching speed traps 5,6 will now be described with reference to FIG. 5.

In step S5-1 the GPS receiver/decoder 41 generates a navigation solution and transmits it to the CPU 43. The CPU 43 then extracts from the navigation solution the current speed at which the speed trap detection and warning unit 11 (and hence the vehicle 9) is travelling, the position of the vehicle 9 and the direction of travel of the vehicle 9. In addition, in this embodiment, CPU 43 processes the extracted direction of travel to define a range of directions in which the vehicle may be travelling, thereby taking into account any errors in the measured direction of travel and also any changes in this direction which occur as a result of the vehicle 9 changing direction before the next navigation solution is generated. More particularly, in this embodiment, CPU 43 generates an 8-bit word defining the range of directions of travel in the same way that an 8-bit word is generated defining the range of operating directions for a speed trap. That is, dividing the 360° of the compass into the same eight 45° segments and assigning the same bit of the 8-bit word to each 45° segment as described previously with reference to FIG. 32A, CPU 43 sets the bit corresponding to the segment in which the measured vehicle direction of travel lies to 1, and sets the bits corresponding to the segments on either side of the segment in which the direction of travel lies also to 1, with the bits corresponding to the remaining segments being set to 0. Thus, referring to FIG. 32B again, by way of example, if the direction of travel of the vehicle 9 defined in the navigation solution is 33°, then CPU 43 generates the 8-bit word 11100000 to define a range of directions in which the vehicle may be travelling.

At step S5-2 the CPU 43 checks to determine whether a navigation solution has been generated. A navigation solution may not be generated for example whilst the vehicle 9 is within a road tunnel, or if landscape or architectural features prevent the GPS receiver/decoder 41 from receiving enough satellite signals to generate a navigation solution. In addition, when the speed trap detection and warning unit 11 is first switched on after a period of non-operation, the GPS receiver/decoder 41 may require up to a few minutes to generate a first navigation solution. If it is determined at step S5-2 that no navigation solution has been generated, then at step S5-3 the CPU 43 causes a warning to be displayed on display 25 and the process returns to step S5-1. On the other hand, if it is determined at step S5-2 that a navigation solution has been granted, then the process continues to step S5-4.

At step S5-4 the CPU 43 causes the current vehicle speed to be displayed on the display 25. The current vehicle speed continues to be displayed on the display 25 until, on a future cycle, the speed is determined to have changed, at which time the display 25 is updated to display the new current vehicle speed. Accordingly, the display of the current vehicle speed on the display 25 is updated continuously in accordance with the operational cycle rate, which in this embodiment, is once per second.

At step S5-5 the CPU 43 compares the current location of the vehicle 9 as determined from the navigation solution at step S5-1 to the stored locations of speed trap sites stored in the first database store 49.

At step S5-7 CPU 43 determines whether any speed traps sites are within a first predetermined distance of the vehicle 9, which, in this embodiment is set to 500 meters. If no speed trap sites are within the first predetermined distance of the vehicle 9, processing returns to step S5-1 and a new navigation solution is processed.

On the other hand, if it is determined at step S5-7 that one or more speed trap sites are within the first predetermined distance of the vehicle 9, then, at step S5-9, the direction of travel of the vehicle 9 (previously determined at step S5-1) is compared to the location of the speed trap site(s) identified at steps S5-5 and S5-7.

At step S5-11, CPU 43 determines whether or not the vehicle is travelling towards any of the speed trap sites within the first predetermined distance of the vehicle. More particularly, in this embodiment, CPU 43 determines whether the distance between the vehicle and a speed trap site is decreasing (in which case it is determined that the vehicle is travelling towards the speed trap) or increasing (in which case it is determined that the vehicle is travelling away from the speed trap).

If the vehicle 9 is not travelling towards a speed trap site, it is still necessary to monitor the speed of the vehicle 9 after the speed trap has been passed if the vehicle is still within the operating range of the trap, since the trap may still detect a speeding vehicle within this range. Therefore, to take account of this at step S5-12, CPU 43 determines whether the vehicle is still within a second predetermined distance of the speed trap site. The second predetermined distance represents the range over which the speed trap may operate, and, in this embodiment, is set to 100 meters, and this second distance test is performed as many speed trap devices actually detect speeding vehicles when the vehicle is at a position past the speed trap.

If it is determined at step S5-12 that the vehicle 9 is beyond the second predetermined distance of the speed trap site then the process returns to step S5-1 and a new navigation solution is processed.

On the other hand, if it is determined at step S5-11 that the vehicle is travelling towards the speed trap site or it is determined at step S5-11 that the vehicle is not travelling towards the speed trap site but it is determined at step S5-12 that the vehicle is still within the second predetermined distance of the speed trap site, then the process proceeds to step S5-13.

In step S5-13, the CPU 43 compares the direction of travel of the vehicle 9 to the direction in which the speed trap is operational. This comparison is to ensure that the driver of the vehicle 9 is not alerted when the vehicle 9 is approaching a speed trap which cannot trap the vehicle 9 because the trap is directed or positioned to trap vehicles which are approaching the speed trap from a direction different to the direction of travel of the vehicle 9.

More particularly, in this embodiment, CPU 43 performs a bit-wise AND operation on the 8-bit word stored in first database store 49 defining the range of directions over which the speed trap may be operational and the 8-bit word generated at step S5-1 defining the range of directions in which the vehicle 9 may be travelling.

In step S5-14, CPU 43 determines whether the vehicle 9 is travelling in a direction in which the speed trap is operational. More particularly, in this embodiment, CPU 43 reads the 8-bit word generated as a result of the AND operation performed at step S5-13 to determine whether there is an overlap in the range of directions in which the speed trap may be operational and the range of directions in which the vehicle 9 may be travelling.

That is, if one of the bits is 1, then there is an overlap and the vehicle 9 is determined to be travelling in a direction in which the speed trap is operational. On the other hand, if all of the bits are 0, then there is no overlap and the vehicle 9 is determined to be travelling in a direction in which the speed trap is not operational.

An example of the processing performed at steps S5-13 and S5-14 will now be described with reference to FIG. 33.

Referring to FIG. 33, a vehicle 9 is travelling due north (0°) on a road 3 as indicated by arrow 200. Two speed traps 210, 220 are located within the first predetermined distance of the vehicle 9 (tested at steps S5-5 and S5-7), and the vehicle 9 is travelling towards both of the speed traps 210, 220 (tested at steps S5-9 and S5-11) because the distance between the vehicle 9 and each of the speed traps 210, 220 is decreasing as the vehicle travels.

The 8-bit word generated at step S5-1 to define the range of directions in which vehicle 9 may be travelling is 11000001 because, in this example, the measured direction of travel (due north) lies in segment 1 so bit 1 of the word is set to 1 and bits 8 and 2 are set to 1 because these bits correspond to segments 8 and 2 which lie on each side of the segment in which the measured direction of travel lies.

Speed trap 210 faces due south, as indicated by arrow 212. Accordingly, the 8-bit word stored in first database 49 defining the range of operating directions of speed trap 210 is 00011100.

Speed trap 220 points in a direction having the bearing 300°, as indicated by arrow 214. Therefore, the 8-bit word stored in first database 49 defining the range of operating directions for speed trap 220 is 10000011.

Accordingly, when step S5-13 is performed for the example shown in FIG. 33, CPU 43 performs a bit-wise AND operation on the vehicle 8-bit number and the 8-bit number for speed trap 210 and also for the vehicle 8-bit number and the 8-bit number for speed trap 220. In the case of speed trap 210, the result of the AND operation is 00000000. Therefore, at step S5-14, CPU 43 determines that the vehicle 9 is not travelling in a direction in which speed trap 210 is operational. In the case of speed trap 220, on the other hand, the result of the AND operation is 10000001. Accordingly, at step S5-14, because the 8-bit word resulting from the AND operation contains at least one 1, CPU 43 determines that the vehicle 9 is travelling in a direction in which speed trap 220 is operational.

Referring again to FIG. 5, if it is determined at step S5-14 that the vehicle 9 is not travelling in the direction in which the speed trap is operational, the process returns to step S5-1 and a new navigation solution is processed. On the other hand, if it is determined at step S5-14 that the vehicle 9 is travelling in the direction in which the speed trap is operational, then the process proceeds to step S5-15.

In step S5-15 the speed of travel of the vehicle 9 (previously determined at step S5-1) is compared to the stored speed limit at the speed trap site stored in database store 49. It is then determined at step S5-17 whether than the speed of travel of the vehicle 9 is greater than the speed limit at the speed trap site.

If the speed of travel is determined to be less than the speed limit of the speed trap site then the process returns to step S5-1 and a new navigation solution is processed.

On the other hand, if it is determined at step S5-17 that the speed of travel of the vehicle 9 is greater than the speed limit at the speed trap site, then at step S5-19 CPU 43 causes an audible alarm to be emitted from the speaker 27 and causes the speed limit, type of speed trap and road number at the speed trap site to be displayed on display 25 so that the user can compare his current speed, as displayed on the display 25 in step S5-4, to the speed limit at the speed trap site and adjust the speed of the vehicle 9 accordingly. The process then returns to step S5-1 and a new navigation solution is processed.

Because speed trap detection and warning unit 11 tests at step S5-7 whether the vehicle is within a relatively large distance of a speed trap 5,6 (500 meters in this embodiment), the driver of vehicle 9 is given an early warning that it is approaching a speed trap and therefore has plenty of time to reduce the vehicle speed gradually and safely.

The speed trap detection and warning unit 11 may be utilised in areas where many mobile speed traps 6 are deployed at sites which change regularly. Thus the first database 49 of regular sites is of reduced utility. To address this, and also the case where the data in the first database store 49 has not been updated for a long time (and hence may be out-of-date), a second operating mode of the speed trap detection and warning unit 11, additional to the first operating node described above, is provided in this embodiment. The second operating mode is selected using one of the input buttons 29, and, as will be described below, in the second operating mode the user of the unit is warned whenever the vehicle in which the unit is installed exceeds the speed limit for the road along which the vehicle is travelling.

The second operation mode is described in detail in FIG. 6.

In steps S6-1 to S6-4, GPS receiver/decoder 41 generates a navigation solution and CPU 43 determines whether a navigation solution has been generated and if not displays a warning, or if so causes the current speed of the vehicle 9 to be displayed on display 25 as described for steps S5-1 to S5-4 of FIG. 5.

At step S6-5, the current location and the current direction of travel and recorded values for recent direction of travel generated in previous iterations of step S6-1 are compared to the data stored in second database store 50 defining the location of all roads within the relevant road network 1 and the speed limits which apply to each road, to determine the current road and part thereof on which vehicle 9 is travelling.

The current location and current direction of travel are used at step S6-5 together with recorded values (stored in working memory 51) for recent direction of travel because the navigation solution from the GPS receiver/decoder 41 may include errors in the data describing the current position of the vehicle 9, and thus where roads are very close together it may be difficult to determine the current road on which vehicle 9 is travelling on the basis of current position and current direction of travel information only.

At step S6-7, CPU 43 determines whether it is possible to identify the current road on which vehicle 9 is travelling. If it is not possible to determine the current road, then CPU 43 causes a warning to be displayed on display 25 at step S6-9 and the process returns to step S6-1 and a new navigation solution is processed.

On the other hand, if it is possible to determine the current road, then the current road is identified and the process continues to steps S6-11 and S6-13, in which, CPU 43 compares the speed of travel of the vehicle 9 to the speed limit of the current road stored in the second database store 50.

If it is determined at step S6-13 that the speed of travel is less than the speed limit of the current road, then the process returns to step S6-1 and a new navigation solution is processed.

On the other hand, if it is determined at step S6-13 that the current speed of travel is greater than the speed limit of the current road, then, at step S6-15, CPU 43 causes an audible alarm to be emitted from the speaker 27 and causes the speed limit and road number for the current road to be displayed on the display 25. Thus, the driver of vehicle 9 is then able to compare his current speed, as displayed in accordance with step S6-4, with the speed limit for the current road and adjust his speed accordingly. The process then returns to step S6-1 and a new navigation solution is processed.

Further embodiments of the speed trap detection and warning system will now be described. In the following embodiments, components identical to those described in the first embodiment have identical reference numerals and a full description thereof will be omitted.

SECOND EMBODIMENT

A second embodiment of the invention will now be described. In the second embodiment, the functionality of the speed trap detection and warning system is provided in a mobile telephone. The processing functions performed by the mobile telephone to act as a speed trap detection and warning system are the same as those in the first embodiment.

FIG. 7 shows a mobile telephone 61 configured for use as a speed trap detection and warning system in the second embodiment, and FIG. 8 shows the functional components of the mobile telephone 61.

The mobile telephone 61 includes an antenna 63 for receiving and transmitting signals associated with its functions as a telephone. Mobile telephone 61 also comprises a further antenna 23 for receiving signals from the satellites 7 (FIG. 1). Antenna 23 may be integral with the telephone antenna 63 or may be a separate internal or external antenna.

The mobile telephone 61 further includes a liquid crystal display 65 for displaying information to a user, a speaker 67 for providing audible signals to a user and input buttons 69 for the input of instructions by a user to control the mobile telephone 61.

The mobile telephone 61 is shown attached to the dashboard 59 of a vehicle 9 in such fashion that the driver of the vehicle is able to see the display 65 of the mobile telephone 61 whilst driving the vehicle.

Unlike the speed trap detection and warning unit 11 in the first embodiment, no separate telephone lead socket is provided for connecting to a remote database 55 as such a connection may be effected using the conventional telephone functionality of the mobile telephone 61. Thus, the mobile telephone 61 may connect to a remote database 55 for loading and updating information about, inter alia, positions of speed traps 5, 6, the speed limits there at and the operational directions thereof as further cameras 5 are added to the road network 1 and/or as mobile speed trap 6 are used in more locations, and for loading and updating information about the speed limit for each part of each road 3 in the road network 1 as roads are built and/or speed limits on the roads are changed.

Referring to FIG. 8, as in the first embodiment, signals from a GPS satellite 7 are received by the antenna 23 and sent to a GPS receiver/decoder 41 for processing to produce a navigation solution. The navigation solution is passed to the CPU 43 which operates according to instructions stored in operating instructions store 45 making use of working memory 51. The data stored in the first and second database stores 49, 50 are as described in the first embodiment.

In use, CPU 43 compares the navigation solution and the data from the GPS receiver/decoder 41 with data from the database store 49 or the data from the second database store 50, and displays information to the driver of the vehicle 9 via the display 65 and/or generates an audible alert through the speaker 27 in the same way as in the first embodiment. Input buttons 69 are provided for the user to select the operating mode of the mobile telephone 61, and to change operating parameters such as the volume of audible alerts and the information to be displayed on the screen. As before, a function is available to update the data stored in the first database store 49 and the second database store 50. The update function makes use of a system ID which is unique for each mobile telephone 61 and which is stored in system ID store 47.

For connecting with the remote database 55, which is not a part of the mobile telephone 61, the mobile telephone 61 makes use of the conventional data transfer capabilities of the mobile telephone 61. In particular, telephone function processor and memory 71 is able to receive instructions from CPU 43 to initiate the update function. The telephone function processor and memory 71 is connected to telephone antenna 63 which enables the mobile telephone 61 to communicate with remote database 55 via a conventional mobile telecommunications network 81. Database update data is received by telephone function processor and memory 71 and transferred to database interface 73 for use by the mobile telephone 61 in updating the first database store 49 and the second database store 50. Remote database 55 stores data for storage in first database store 49 and second database store 50 as described with reference to the first embodiment.

With reference to the processing operations of the mobile telephone 61, the operation to load data into, or update data in, first database store 49 and/or second database store 50 is the same as that described with reference to FIG. 4.

The operation of the mobile telephone 61 in warning the driver of vehicle 9 of one or more approaching speed traps 5, 6 is the same as the method described in the first embodiment with reference to FIG. 5.

The operation of the mobile telephone 61 in the second operating mode, in which the driver of the vehicle is warned whenever the speed limit along which he is travelling is exceeded, is the same as the method in the first embodiment described with reference to FIG. 6.

THIRD EMBODIMENT

A third embodiment of the invention will now be described.

In the third embodiment, the functionality of the speed trap detection and warning system of previous embodiments is split between a mobile telephone carried in vehicle 9 and one or more separate processing apparatus at a fixed location or locations. More particularly, as will be described below, the mobile telephone has GPS receiver functionality as before and processes the satellite signals to calculate the position, speed and direction of travel of vehicle 9 in which it is carried. The calculated information is then transmitted to a remote processor which compares it with stored information about the speed traps and speed limits. That is, in the third embodiment, the databases stored in first database store 49 and second database store 50 of previous embodiments are now stored at a remote processing station 83. If necessary, warning information is sent from the remote processor to the mobile telephone, which displays it to the driver and/or sounds an alarm.

Referring to FIG. 9A, there are shown the functional components of a mobile telephone 61 in the third embodiment which is enabled to communicate with a remote processing station 83 via mobile telecommunications network 81.

As before, the mobile telephone 61 comprises a GPS antenna 23 to receive signals from satellites 7 (FIG. 1) which are passed to GPS receiver/decoder 41. GPS receiver/decoder 41 in turn provides a navigation solution calculated by processing the satellite signals to CPU 43. CPU 43 operates under instructions stored in operating instructions store 45 making use of a working memory 51. Output to a user is provided by the liquid crystal display 65 and the speaker 67 and input from the user is received via input buttons 69.

In order to communicate with the remote processing station 83, the mobile telephone 61 uses telephone function processor and memory 71 which is accessible by the CPU 43 to communicate with the remote processing station 83 via the mobile telecommunications network 81 making use of the telephone antenna 63. A system ID store 47 stores a system ID to be used by the remote processing station 83 to establish whether the mobile telephone 61 is eligible to receive service from the remote processing station 83.

In this embodiment, there is no requirement for the mobile telephone 61 to be able to update any internal databases because the necessary databases are provided in remote processing station 83.

Referring to FIG. 9B, there are shown the functional components of the remote processing station 83.

The remote processing station 83 comprises first database store 49 and second database store 50 which contain the same data as in the first and second embodiments and which are accessible by a CPU 89. CPU 89 works under instructions stored in operating instructions store 93 making use of a working memory 91. Also available to the CPU 89 are a user database store 95 storing details of users eligible to use the service and a mobile telecommunications interface 92 which operates via a telephone antenna 99 to provide communication with the mobile telephone 61 via the mobile telecommunications network 81.

The data in the first database store 49 and the second database store 50 may be updated from remote database 55 as in the first and second embodiments, or may be updated locally, for example by typing in updates or by providing updates on a storage medium.

Referring to FIG. 10, the method of operation of the mobile phone 61 and remote processing station 83 in use as a speed trap detection and warning system according to the third embodiment will now be described.

In FIG. 10, all functions on the left-hand side of the dotted line are functions performed by the mobile telephone 61 and all functions on the right-hand side are functions performed by the remote processing station 83.

In step S10-1, CPU 43 instructs the telephone function processor and memory 71 to transmit the system ID stored in system ID store 47 to the remote processing station 83 via the mobile telecommunications network 81.

Upon receipt of the system ID by remote processing station 83, at step S10-3, CPU 89 check the system ID against the user database stored in user database store 95 to determine the details of the account for mobile telephone 61.

At step S10-5, CPU 89 determines whether the received system ID is valid to receive the speed trap warning service based on the status read at step S10-3. If the system ID is invalid, processing proceeds to step S10-7, at which an error message is transmitted from the remote processing station 83 via the mobile telecommunications network 81 to the mobile telephone 61. Subsequently, at step S10-7 an error message is caused to be displayed on the display 65 of the mobile telephone 61. The user is thus aware that the service has been denied and can then take appropriate action, such as contacting the service provider of the remote processing station 83 to arrange for his entitlement to receive the service to be initiated or to be restored. Following display of the error message, the operation of the mobile telephone 61 in use as a speed trap detection and warning unit then ends.

On the other hand, if it is determined at step S10-5 that the mobile telephone 61 is entitled to receive the service, then, at step S10-11 the remote processing station 83 transmits a request for a navigation solution to the mobile telephone 61.

Upon receipt of a request for a navigation solution from the remote processing station 83, mobile telephone 61 performs processing at steps S10-13 to S10-19 to generate a navigation solution and to display the current vehicle speed. The processing at steps S10-13 to S10-19 is the same as the processing performed in the first and second embodiments at steps S5-1 to S5-4, and accordingly will not be described again here.

At step S10-21 CPU 43 causes the telephone function processor and memory 71 to transmit the calculated navigation solution to the remote processing station 83 via mobile telecommunications network 81.

Upon receipt of the navigation solution, remote processing station 83 performs processing at steps S10-23 to S10-39 which is the same as the processing carried out at steps S5-5 to S5-17. Accordingly, this process will not be described again here. It should be noted however that any processing which results in a decision that in the first embodiment results in a return to step S5-1 (where a new navigation solution is generated), will in the third embodiment result in a return to step S10-11 where a new navigation solution is requested.

At step S10-41, the remote processing station CPU 89 causes a warning message to be transmitted to the mobile phone 61 via mobile telecommunications network 81 to provide the mobile telephone 61 with the speed limit, type of speed trap and road number at the speed trap site.

At step S10-43, upon receipt of a warning message from the remote processing station 83, the CPU 43 in mobile telephone 61 causes an audible alarm to be emitted from the speaker 67 and causes the speed limit, type of speed trap and road number at the speed trap site to be displayed on display 65 so that the driver can compare his current speed, as displayed on the display 65 in step S10-19, to the speed limit at the speed trap site and adjust the speed of the vehicle 9 accordingly.

At the same time as transmission of the warning message from the remote processing station to the mobile telephone 61, processing returns from step S10-41 to step S10-11 at which the remote processing station requests a further navigation solution from the mobile telephone 61 so that the processing described above is continually repeated.

Therefore, in summary, in the third embodiment, mobile telephone 61 calculates a GPS navigation solution for vehicle 9 and transmits this to remote processing station 83. Remote processing station 83 then performs processing to determine whether the vehicle 9 is within a first predetermined distance of a speed trap site, and if it is within a first predetermined distance of a speed trap site, to compare the direction of travel of the vehicle 9 to the location of the speed trap site, to determine whether the vehicle is approaching the speed trap site, and if not to determine whether the vehicle is still within a second predetermined distance as the speed trap site. If the vehicle 9 is approaching a speed trap site or is within the second predetermined distance of the speed trap site, remote processing station 83 compares the direction of travel of the vehicle 9 to the direction of operation of the speed trap at the speed trap site in question, and if the vehicle 9 is travelling in a direction in which the speed trap is operational, compares the speed of travel of vehicle 9 to the stored speed limit at the speed trap site and if it is determined that the speed of travel of the vehicle 9 is greater than the speed limit at the speed trap site then transmits a warning to mobile telephone 61 to alert the driver of vehicle 9.

Referring now to FIG. 11, the operation of mobile telephone 61 and remote processing station 83 in use in the third embodiment in a second operating mode (corresponding to the second operating mode of the first and second embodiments described above with reference to FIG. 6) will now be described. As before, in this second operating mode, which is selected using the input buttons 69, the driver of the vehicle in which mobile telephone 61 is carried is warned whenever the vehicle speed exceeds the speed limit for the road along which the vehicle is travelling.

The processes carried out at steps S11-1 to S11-21 are identical to the processes carried out with reference to the first operating mode of the third embodiment in steps S10-1 to steps S10-21 and therefore will not be described again here.

Processing then continues in a manner substantially the same as the processing in the first embodiment described above with reference to FIG. 6. More particularly, steps S11-23 to S11-37 correspond to step S6-5 to S6-15. However, if remote processing station 83 determines at step S11-25 that it is not possible to determine the current road on which vehicle 9 is travelling, then, at step S11-27, a warning is transmitted to mobile telephone 61 and, upon receipt of the warning, at step S11-29, mobile telephone 61 displays the warning to the driver on display 65. Similarly, if remote processing station 83 determines at step S11-33 that the speed of travel of mobile telephone 61 (and hence vehicle 9) is greater than the speed limit of the road on which the vehicle 9 is travelling, then, at step S11-35, a warning message is transmitted to mobile telephone 61 together with the speed limit and road number for the road on which the vehicle 9 is travelling. At step S11-37, mobile telephone 61 sounds an alarm and displays the speed limit and road number on display 65 to the driver.

Therefore, in summary, mobile telephone 61 calculates a GPS navigation solution for vehicle 9 and transmits this to the remote processing station 83. Remote processing station 83 then compares the vehicle's current location and direction of travel history to the data stored in second database store 50 to determine the current road. Then, if the current road has been determined, remote processing station 83 compares the current speed of travel of the vehicle 9 to the stored speed limit of the current road. If the speed of travel is greater than the speed limit of the current road the remote processing station 83 transmits a warning message to the mobile telephone 61 for display comprising the speed limit and road number of the current road. Thus, the driver of vehicle 9 is able to compare his current speed with the speed limit for the current road and adjust his speed accordingly.

FOURTH TO SEVENTH EMBODIMENTS

Fourth to seventh embodiments of the present invention will now be described. However, before describing each embodiment separately in detail, an overview of all of these embodiments will be given.

In the fourth to seventh embodiments, the speed trap detection and warning system does not use satellite signals to calculate the position, speed and direction of travel of vehicle 9. Instead, it uses signals transmitted between a mobile telephone in the vehicle 9 and a plurality of fixed locations.

Referring to FIG. 12, a road network 1 comprises a plurality of roads 3 along which a plurality of speed traps 5, 6 are deployed. Driving along the roads 3 is a vehicle 9 carrying a mobile telephone 61.

A mobile telecommunications network 81 includes a plurality of base stations 101. Each base station comprises an antenna or array of antennae 103 and a base station processor 105. In order to be able to determine the position of the mobile telephone 61 in this embodiment, one or more location system reference stations 107 are provided at known locations and a location system control computer 109 is provided, as will be described below. Each location system reference station may be mobile or fixed, provided its location is known.

Referring to FIG. 13, mobile telephone 61 and each location system reference station 107 receives signals broadcast by each of at least three base stations 101 in mobile communications network 81. Mobile telephone 61 and each location system reference station 107 then records each of the signals broadcast by the at least three base stations in such a way that the relative time of arrival of these signals is defined, and transmits the recorded signals to a processor for calculating the position, speed and direction of travel of the mobile telephone 61. This processor may be located within mobile telephone 61 itself or at a different location, for example in a location system control computer 109 remote from mobile telephone 61 and each of the location system reference stations 107. Correlation processing is then performed to determine the time offsets between the signals from the three base stations as received by mobile telephone 61 and as received by one (or more) of the location system reference stations 107. Since the geographic locations of each base station 101 and each location system reference station 107 are known, the recorded time of flight differences are used to determine the location of the mobile telephone 61 in a conventional manner. For example, such a positioning technique is utilised in the CURSOR system operated by Cambridge Positioning Systems Limited and is described in EP 0303371, WO97/11384, WO99/11086 and WO99/21028. Further, European Telecommunications Standards Institute document ETSI TS 101 528 sets out the standard for GSM Enhanced Observed Time Difference (EOTD) location services as used in the Cambridge Positioning Systems CURSOR system and other similar systems. In order to determine speed and direction of travel, the location data determined using the above technique is then stored and processed to determine the direction of changes in position and the time interval over which changes in position occur.

Once calculated, the parameters of vehicle location, speed and direction of travel are compared to stored data in the same way as in the first to third embodiments to alert the driver of vehicle 9 to any speed trap which is a threat or, in the second operating mode, to alert the driver whenever the speed of the vehicle 9 exceeds the speed limit for the road on which it is travelling. The comparisons with the stored data may be carried out within the mobile telephone 61 itself or at a separate location, as will become clear in the fourth to seventh embodiments when described individually below.

Referring again to FIG. 13, also shown is remote database 55 which is also connectable to the mobile communications network 81 to facilitate transfer of data defining the locations of speed traps, the type, road number and speed limit of each speed trap, and the speed limit for each part of each road 3 in the databases as in previous embodiments.

FOURTH EMBODIMENT

The fourth embodiment of the present invention will now be described.

In the fourth embodiment, the processing to calculate the parameters of the location, speed and direction of travel of vehicle 9 is carried out in location system control computer 109, while the processing to compare these parameters with stored database data is carried out in mobile telephone 61.

FIG. 14 is a block diagram showing the functional elements of the location system control computer 109 in the fourth embodiment.

Referring to FIG. 14, a location reference system station interface 113 receives signals from the location system reference stations 107 defining the relative time of arrival of signals from at least three base stations 101. The received signals are sent to location system processor 111. In this embodiment, the signals are transmitted from the location system reference stations 107 to the location system control computer 109 by a fixed land line (not shown). However, the signals could be transmitted in other ways, for example via mobile communications network 81.

Antenna 123 receives signals from, and transmits signals to, mobile telephone 61 via the mobile telecommunications network 81, and sends them to and receives them from the mobile communications network interface 121.

A user database 119 contains a database of authorised users for the system.

The location system processor 111 operates under instructions stored in operating instructions store 115 using working memory 117. As will be explained in more detail below location system processor 111 performs processing to determine whether a mobile telephone 61 is authorised to receive service, and to calculate the location, speed and direction of travel of mobile telephone 61 (referred to hereinafter as a navigation solution for consistency with previous embodiments). As in previous embodiments, the direction of travel is defined by an 8-bit word defining a range of directions in which the mobile telephone 61 may be travelling.

FIG. 15 is a block diagram showing the functional elements of the mobile telephone 61 in the fourth embodiment.

Referring to FIG. 15, many of the functional elements are the same as in previous embodiments, and accordingly will not be described again here. Elements which are different to previous embodiments are a navigation solution receiver 42 and a second system ID store 48. In addition, CPU 43 is arranged to provide additional functionality. These differences will now be described.

Navigation solution receiver 42 receives data sent from location system control computer 109 via mobile communications network 81 defining the calculated position, speed and direction of travel of mobile telephone 61.

Second system ID store 48 stores a second system ID which, as will be explained in more detail below, is used by mobile telephone 61 to request service from location system control computer 109 (the first system ID stored in first system ID store 47 being used when the contents of the first database store 49 and/or second database store 50 are updated from remote database 55 as in previous embodiments).

In addition to performing processing as described with reference to previous embodiments, CPU 43 is further arranged in this embodiment to record signals received from at least three base stations 101 in such a way that the relative time of arrival of these signals is defined, and to transmit the recorded signals to location system control computer 109.

The initial storage and updating of data in the first database store 49 and second database store 50 is carried out in the same way as that described above with reference to FIG. 4 for the first embodiment.

The operation of the mobile telephone 61 and location system control computer 109 in use as a speed trap detection and warning system in the fourth embodiment will now be described with reference to FIG. 16.

In FIG. 16, processing operations on the left-hand side of the dotted line are performed by mobile telephone 61 and processing operations on the right-hand side of the dotted line are performed by the location system control computer 109.

Steps S16-1 to S16-9 are the same as steps S10-1 to S10-9 described above with reference to the third embodiment, except that in the present embodiment, at step S16-1 the second system ID as stored in second system ID store 48 is transmitted from mobile phone 61 to location system control computer 109. Accordingly, these steps will not be described again here.

If it is determined by location system control computer 109 at step S16-5 that mobile telephone 61 is to receive service, then, at step S16-11, location system control computer 109 transmits a request for timing data to mobile telephone 61. At step S16-13, mobile telephone 61 receives signals from at least three base stations 101 and records them to define timing data for transmission to the location system control computer at step S16-15.

Using timing data received from mobile telephone 61 at step S16-17 and timing data received from one or more location system reference stations 107 at step S16-19 (defining the relative time of arrival at the location system reference station 107 of signals from at least three base stations), location system control computer 109 generates a navigation solution at step S16-21. At step S16-23, the navigation solution so generated is transmitted to mobile telephone 61 and is received thereby at step S16-25.

Processing steps S16-27 to S16-51 are the same as steps S5-2 to S5-19 as described above with reference to FIG. 5, and accordingly will not be described again here.

In summary, therefore, location system control computer 109 processes signals from mobile telephone 61 and at least one location system reference station 107 defining the relative time of receipt of signals from at least three base stations 101 to calculate a navigation solution for mobile telephone 61. The calculated navigation solution is then transmitted to mobile telephone 61, which compares it with stored data and warns the driver of a speed trap which is a threat.

The operation of mobile telephone 61 and location system control computer 109 in use in the fourth embodiment in a second operating mode (corresponding to the second operating mode in the first embodiment described previously with reference to FIG. 6) will now be described with reference to FIG. 17. As before, in this second operating mode, which is selected using the input buttons 69, the driver is warned whenever the vehicle in which the mobile telephone 61 is carried exceeds the speed limit for the road along which the vehicle is travelling.

Referring to FIG. 17, steps S17-1 to S17-29 are the same as steps S16-1 to S16-29 described above, and will therefore not be described again here.

Steps S17-31 to S17-41 are the same as steps S6-5 to S6-15 in the first embodiment described above, and therefore these steps, too, will not be described again here.

FIFTH EMBODIMENT

A fifth embodiment of the present invention will now be described.

In the fifth embodiment, location system control computer 109 calculates a navigation solution for the mobile telephone 61, and further compares the parameters of the navigation solution with stored data to determine whether a speed trap is a threat to the vehicle in which the mobile telephone 61 is carried or, in a second operating mode, whether the speed of the vehicle is exceeding the speed limit of the road on which it is travelling. Warning signals are transmitted from the location system control computer 109 to mobile telephone 61, which then alerts the driver of the vehicle.

FIG. 18 is a block diagram showing the functional elements of the location system control computer 109 in the fifth embodiment.

Referring to FIG. 18, the location reference system station interface 113, mobile communication network interface 121 and user database 119 are the same as in the fourth embodiment, and accordingly will not be described again here. First database store 49 and second database store 50 are the same as in the first embodiment, and accordingly, these, too, will not be described again here.

Location system processor 112 operates under instructions stored in the operating instructions store 115 using working memory 117. The location system processor 112 is operable to perform processing, as will be described below, to determine whether a mobile telephone 61 is authorised to receive service, to calculate a navigation solution (using data received from at least one location system reference station 107 and data from mobile telephone 61), and to compare the parameters of the calculated navigation solution with stored data to identify any speed trap which is a threat to vehicle 9 and/or to determine whether the speed of vehicle 9 exceeds the speed limit for the road on which it is travelling.

The storage/updating of data in first database store 49 and second database store 50 is performed in the same way as in previous embodiments, and accordingly will not be described again here.

FIG. 19 is a block diagram showing the functional elements of the mobile telephone 61 in the fifth embodiment.

Referring to FIG. 19, with the exception of warning receiver 135, all of the other functional elements have been described with reference to previous embodiments, and accordingly will not be described again here.

Warning receiver 135 receives warning data transmitted to mobile telephone 61 from location system control computer 109 via mobile communications network 81.

The operation of the mobile telephone 61 and location system control computer 109 in use as a speed trap detection and warning system in the fifth embodiment will now be described with reference to FIG. 20.

Steps S20-1 to S20-21 are the same as steps S16-1 to S16-21 in the fourth embodiment, and accordingly will not be described again here.

Step S20-23 is the same as step S16-27 in the fourth embodiment, and replaces steps S16-27 and also steps S16-28 and S16-29 in the fourth embodiment.

Steps S20-25 to S20-41 are the same as steps S16-31 to S16-49 in the fourth embodiment, and accordingly will not be described again here.

If it is determined at step S20-41 that the speed of travel of vehicle 9 is greater than the stored speed limit then, at step S20-43, location system control computer 109 transmits, via mobile communications network 81, a warning signal to mobile telephone 61 together with the calculated vehicle speed, type of speed trap which is a threat, the road speed limit at the speed trap site and the road number on which the speed trap is located.

At step S20-45, mobile telephone 61 displays on display 65 the speed limit, type of trap and road number defined in the warning data sent from location system control computer 109.

In summary, therefore, the difference from the fourth embodiment is that, in the fifth embodiment, the location system control computer undertakes both the generation of the navigation solution and the processing to determine whether an alarm is necessary (with data being transmitted to mobile telephone 61 if an alarm is necessary).

The operation of mobile telephone 61 and location system control computer 109 in use in a second operating mode (corresponding to the second operating mode in the first embodiment described previously with reference to FIG. 6) will now be described with reference to FIG. 21.

Steps S21-1 to S21-21 are the same as steps S16-1 to S16-21 described above, and will therefore not be described again here.

Steps S21-23 to S21-31 are the same as steps S6-2 to S6-13 in the first embodiment (with the exception that steps equivalent to steps S6-3, S6-4 and S6-9 are not performed in the fifth embodiment), and accordingly these steps, too, will not be described again here.

If it is determined at step S21-31 that the calculated speed of travel of vehicle 9 is greater than the stored speed limit for the road on which vehicle 9 is travelling, then, at step S21-33, location system control computer 109 transmits warning data to mobile telephone 61 via mobile communication network 81 defining the speed limit of the road on which vehicle 9 is travelling, the road number and the calculated speed of vehicle 9.

Upon receipt of this data, at step S21-35, mobile telephone 61 displays on display 65 the current speed of vehicle 9 and the road speed limit and road number defined in the data received from the location system control computer 109.

SIXTH EMBODIMENT

A sixth embodiment of the present invention will now be described.

In the sixth embodiment, processing operations to calculate a navigation solution for mobile telephone 61 and processing operations to compare the calculated data with stored database data are all performed within the mobile telephone 61 itself.

FIG. 22 is a block diagram showing the functional elements of the location system control computer 109 in the sixth embodiment.

Referring to FIG. 22, with the exception of control processor 136, all of the other functional elements are the same as elements described before with reference to one or more previous embodiments, and accordingly will not be described again here.

Control processor 136 operates under instructions stored in operating instruction store 115 using working memory 117. Control processor 136 performs processing to check the status of mobile telephone 61 to determine whether it is valid to receive service, and to forward data received from location reference system stations 107 (defining the relative time of arrival of signals from at least three base stations 101) via location reference system station interface 113 to mobile telephone 61.

FIG. 23 is a block diagram showing the functional elements of the mobile telephone 61 in the fourth embodiment.

Referring to FIG. 23, with the exception of navigation solution calculator 139, all of the other functional elements have been described before with reference to one or more previous embodiments, and accordingly will not be described again here.

Navigation solution calculator 139 is operable to process data received from location system control computer 109 defining the relative time of arrival of signals from base stations 101 received at a location system reference station 107 and signals received by mobile telephone 61 defining the relative time of arrival of the same signals from base stations 101 to calculate a navigation solution for mobile telephone 61.

The initial storage of and/or updating of data in first database store 49 and second database store 50 is carried out in the same way as that described above with reference to FIG. 4 for the first embodiment.

The operation of the mobile telephone 61 and location system control computer 109 in use as a speed trap detection and warning unit in the sixth embodiment will now be described with reference to FIG. 24.

Steps S24-1 to S24-9 are the same as steps S16-1 to S16-9 described above with reference to the third embodiment, and accordingly will not be described again here.

If it is determined by location system control computer 109 at step S24-5 that mobile telephone 61 is to receive service, then, at step S24-11, location system control computer 109 repeatedly receives timing data from at least one location system reference station 107, and at step S24-13 repeatedly transmits the received data to mobile telephone 61.

At step S24-15, mobile telephone 61 receives the timing data from location system control computer 109, and at step S24-17, receives signals from the base stations 101 and processes them to store relative timing data as described previously.

Using timing data from a location system reference station 107 (received via location system control computer 109 at step S24-15) and timing data generated at step S24-17, mobile telephone 61 generates a navigation solution at step S24-19.

Processing steps S24-21 to S24-45 are the same as steps step S5-2 to S5-19 as described above with reference to FIG. 5 in the first embodiment, and accordingly will not be described again here.

The operation of mobile telephone 61 and location system control computer 109 in use in the sixth embodiment in a second operating mode (corresponding to the second operating mode in the first embodiment described with reference to FIG. 6) will now be described with reference to FIG. 25.

Steps S25-1 to S25-25 are the same as steps S24-1 to S24-25 described above and will therefore not be described again here.

Steps S25-27 to S25-37 are the same as steps S6-5 to S6-15 as already described above, with the only difference being that if it is not possible to determine the current road (S25-29) or the calculated speed of travel is not greater than the stored speed limit of the current road (S25-35) then processing returns to step S25-15 to enable a new navigation solution to be generated.

SEVENTH EMBODIMENT

A seventh embodiment of the present invention will now be described.

In the seventh embodiment, processing operations to calculate a navigation solution for mobile telephone 61 are performed within the mobile telephone 61 itself, the calculated navigation solution is transmitted from the mobile telephone 61 to the location system control computer 109, comparison of the navigation solution with stored data to determine whether a speed trap is a threat to vehicle 9 and/or to determine whether the speed of vehicle 9 exceeds the speed limit for the road on which it is travelling is carried out by location system control computer 109, and any necessary warning data is transmitted from location system control computer 109 to mobile telephone 61 for display to the driver.

FIG. 26 is a block diagram showing the functional elements of the mobile telephone 61 in the seventh embodiment. As each of these functional elements has been described before with reference to one or more previous embodiments, they will not be described again here.

FIG. 27 is a block diagram showing the functional elements of the location system control computer 109 in the seventh embodiment. Referring to FIG. 27, with the exception of system processor 140, each of the other functional elements has been described before for one or more previous embodiments, and accordingly will now be described again here.

System processor 140 operates under instructions stored in operating instruction store 115 using working memory 117. System processor 140 performs processing to determine whether mobile telephone 61 is authorised to receive service, and to forward data to mobile telephone 61 comprising data received from one or more location reference system stations 107 by location reference system station interface 113. System processor 140 further performs processing to process navigation solutions received from mobile telephone 61 to compare the parameters thereof with data stored in the first database store 49 and the second database store 50, and to transmit warning data to mobile telephone 61, if necessary.

The operation of the mobile telephone 61 and location system control computer 109 in use as a speed trap detection and warning unit in the seventh embodiment will now be described with reference to FIG. 28.

Steps S28-1 to S28-25 are the same as steps S24-1 to S24-25 described above in the sixth embodiment, and accordingly will not be described again here.

At step S28-27, mobile telephone 61 transmits the navigation solution calculated at step S28-19 to the location system control computer 109, which receives the navigation solution at step S28-31.

Steps S28-33 to S28-53 are the same as steps S20-25 to S20-45 in the fifth embodiment described above, and accordingly will not be described again here.

The operation of mobile telephone 61 and location system control computer 109 in use in the seventh embodiment in a second operating mode (corresponding to the second operating mode of the first embodiment described above with reference to FIG. 6) will now be described with reference to FIG. 29.

Steps S29-1 to S29-31 are the same as steps S28-1 to S28-31 described above and will therefore not be described again here.

Steps S29-33 to S29-43 are the same as steps S21-25 to S21-35 as already described above in the fifth embodiment, and therefore will not be described again.

Modifications

Many modifications are possible to the embodiments described above.

For example, in order to provide information to the user about mobile sites utilising radar traps or laser light traps and fixed sites using radar traps and laser light traps which are not included in the database, it is possible to combine the speed trap detection and warning unit described above with conventional radar and laser light detectors. However, the addition of such detector would re-introduce the problems of last minute warnings for speed traps not included in the database, and the possibility of false alarms from the radar detector.

FIG. 30 shows a process by which a conventional laser light detector and/or radar detector (or any other electromagnetic wave detector) may be integrated into the speed trap detection and warning system of the present invention whilst minimising the possibility of false alarms. In the processing shown in FIG. 30, both a laser light detector and a radar detector are used in conjunction with a speed trap detection and warning system of a previous embodiment. However, either a laser light detector alone or a radar detector alone may be combined with the speed trap detection and warning system with appropriate modification of the processing. In addition, the processing shown in FIG. 30 is based on the unit within vehicle 9 carrying out processing to calculate a navigation solution and to compare the parameters thereof with stored data in first database store 49. However, processing may equally be applied to the third to seventh embodiments, where one or more of these processing operations is performed at a remote location.

Referring to FIG. 30, steps S30-1 to S30-17 are the same as steps S5-1 to S5-17 as described above with reference to the first embodiment, and therefore they will not be described again-here.

If it is determined at step S30-17 that the calculated speed of travel of vehicle 9 is greater than the stored speed limit, then, at step S30-19 CPU 43 performs a check against the stored data describing the type of speed trap which is currently a threat to determine whether or not the speed trap is a laser-type trap. If the speed trap is a laser-type trap, then, at step S30-21, CPU 43 performs a check to determine whether the vehicle is within a third predetermined distance of the speed trap, the third predetermined distance being representative of the range of operation of a laser-type speed trap, and being set to a distance greater than the operating range so that the driver can reduce speed slowly in response to any subsequent alarm.

If it is determined at step S30-21 that the vehicle is within the third predetermined distance of the speed trap, then a laser detector connected with the speed trap detection and warning system is activated at step S30-22. The laser detector then operates in a conventional manner, sounding an alarm and/or displaying a warning if the laser speed trap is switched on and illuminates the vehicle 9. On the other hand, if the laser speed trap is not switched on, no laser light will be detected and hence no alarm will be sounded and/or displayed to the driver of vehicle 9. Following activation of the laser detector, processing returns to step S30-1, so that the processing described above is repeatedly performed.

On the other hand, if it is determined at step S30-19 that the speed trap is not a laser-type trap, then CPU 43 performs a further check at step S30-23 to determine whether the speed trap is a radar-type trap.

If it is determined at step S30-23 that the speed trap is a radar-type trap, then, at step S30-24, a check is performed to determine whether the vehicle is within a fourth predetermined distance of the speed trap, the fourth predetermined distance being representative of the range of operation of radar-type speed traps, and being set to a distance greater than the operating range so that the driver can reduce speed slowly in response to any subsequent alarm.

If it is determined at step S30-24 that the vehicle is within the fourth predetermined distance of the speed trap, then, at step S30-25, a radar detector connected with the speed trap detection warning and system is activated. The radar detector then operates in a conventional manner, sounding an alarm and/or displaying a warning if the radar speed trap is switched on and illuminates the vehicle 9 with radar beams. On the other hand, if the radar speed trap is not switched on, no radar signals will be detected and hence no alarm will be sounded and/or displayed to the driver of vehicle 9. Following activation of the laser detector, processing returns to step S30-1, so that the processing described above is repeatedly performed.

On the other hand, if it is determined at step S30-23 that the speed trap is not a radar-type detector (and hence is neither a laser-type detector nor a radar-type detector), the processing proceeds to step S30-27, at which the speed trap detection and warning system sounds an alarm and displays the road speed limit, the type of speed trap and the road number of the speed trap to the driver. Processing then returns to step S30-1, so that the processing described above is repeatedly performed.

In summary, therefore, in the processing described above with reference to FIG. 30, the laser detector or radar detector is only activated after it has been determined that the vehicle is within the predetermined distance of a speed trap site, that the speed trap is operational in the direction of travel of the vehicle, that the speed of the vehicle is greater than the road speed limit at the speed trap site, that the speed trap is of a type which can be detected by the laser/radar detector, and that the vehicle is within a further predetermined distance of the speed trap (based on the operating distance of the speed trap). However, as a modification, it is possible to omit one or more of these tests before activating the laser detector and/or radar detector. For example, it is possible to omit steps S30-15, S30-17, S30-19, S30-21, S30-23 and S30-24, and therefore activate either or both the laser detector or radar detector whenever it is determined that the vehicle is within the first predetermined distance of a speed trap which is operational in the direction of travel of the vehicle. In addition, as a further modification, it is possible to perform step S30-27 after each of steps S30-22 and S30-25, so that a warning is given to the driver independently of any warning by the laser or radar detectors.

The speed trap processing and detection unit 11 according to embodiments 1, 2 and 3 is not limited to utilising GPS for obtaining navigation solutions. Any radio-navigation system providing sufficient accuracy in determining position may be utilised. For example, GLONASS (the Russian equivalent to GPS) or GNSS (a proposed new satellite new navigation system) could both be used instead of GPS to provide a navigation solution.

In the above embodiments, the display 25, 65 is described as a liquid crystal display. Alternatively, the display 25, 65 may take the form of a light emitting diode (LED) dot matrix, an array of figure-of-eight LED displays or any other type of display device.

In the embodiments above, the data in the first database store 49 and the second database store 50 is updated form a remote database via a communications network. However, instead, the data in first database store 49 and/or second database store 50 may be updated by providing a storage device (such as a cartridge, disk, etc) storing the data to the unit containing these databases. In addition, or instead, data could be entered manually to the databases, for example by typing with a keyboard.

In the above embodiments, it is described with reference to FIG. 4 to issue an update to a speed trap detection and warning unit 11 or mobile telephone 61 if a system ID is determined to belong to a set of system IDs for which a subscription fee has been paid. As an alternative, the remote database 55 may operate to receive a credit card number from the speed trap detection and warning unit 11 or mobile telephone 61 or a user. The remote database would then contact an appropriate clearing authority to establish whether the given credit card number is valid and chargeable. If it is determined that the credit card number is valid, an update will be issued as described in steps S4-13 to S4-17, and if not, an error message will be transmitted as described in steps S4-9 and S4-11.

In the above embodiments, it is described with reference to FIG. 4 that the data in both the first and second database stores 49,50 are updated during an update function by connection to a remote database 55. It is also possible to update the data in only one database at a time, for example if only one database requires updating, as would likely occur because the positions of speed traps 5,6 are likely to change more often then the layout and speed limits of roads in a road network 1.

For the above embodiments, it is described with reference to FIG. 5 that the first predetermined distance is set to 500 meters. However, this distance may be set to any value which provides adequate notice that the vehicle 9 is approaching a speed trap. A facility may be provided to enable the user to set the first predetermined distance to a desired value, and to change it if he wishes.

In the above embodiments, it is described with reference to FIG. 5 that the second predetermined distance is set 100 meters. However, this distance may be set to any value which exceeds the typical operating range of a speed trap.

In the above embodiments, it is described with reference to FIGS. 5, 10, 16, 20, 24 and 28 to perform a check on a second predetermined distance (for example step S5-12 in FIG. 5). However, this step may be omitted as the driver of the vehicle 9 will likely be aware that a typical speed trap 5,6 detects speeding vehicles at a position past the speed trap.

In the above embodiments it is described with reference to FIGS. 5, 10, 16, 20, 24 and 28 that when a vehicle 9 is approaching a speed trap 5,6 that the current speed of the vehicle and the speed limit of the speed trap are output to the display 25, 65 by the CPU 43. It is additionally possible for the CPU 43 to calculate the distance to the speed trap site 5,6 and display the calculated distance on the display 25, 65 at step S5-19 (or equivalent step) so that the driver of the vehicle 9 can judge how swiftly he needs to slow the vehicle 9.

Although it is described with reference to FIGS. 5, 10, 16, 20, 24 and 28 that the driver is only alerted if the speed of travel of the vehicle 9 is greater than the speed limit at the speed trap site, it is possible to omit this function (for example, a facility may be provided for the user to switch it ON/OFF) and alert the driver every time a speed trap is being approached which is operational in the direction of travel of the vehicle irrespective of the speed of vehicle 9.

Similarly, it is described with reference to FIGS. 5, 10, 16, 20, 24 and 28 that the driver is only alerted if the speed trap which is within the predetermined distance of the vehicle is operational in the direction of travel of the vehicle. However, it is possible to omit this function (for example a facility may be provided for the user to switch it ON/OFF) and alert the user every time a speed trap is within the predetermined distance of the vehicle and the speed of the vehicle is exceeding the speed limit at the speed trap site.

In the embodiments above, in the second operating mode (described with reference to FIGS. 6, 11, 17, 21, 25 and 29) the second database store 50 stores data defining the position of each road 3. However, the second database store 50 may store data for only some of the roads.

In the above embodiments, it is described with reference to FIGS. 6, 11, 17, 21, 25 and 29 that the current location and current direction of travel are used together with recorded values for recent direction of travel in the comparison with the data from the second database store 50 to determine the current road. However, if it is found that the current location and current direction of travel provide sufficiently accurate data to determine the current road, then the recorded values for recent direction of travel may be omitted.

Although it has been described in the embodiments above with reference to FIGS. 6, 11, 17, 21, 25 and 29 that a warning is only displayed when the speed of the vehicle exceeds the speed limit for the road on which it is travelling, it is possible instead to continuously monitor the position of the vehicle 9 and to continuously display the speed limit of the road on which the vehicle is travelling. For example steps S6-11 and S6-13 (and equivalent steps) may be omitted and at step S6-15, the road number and speed limit may be displayed without a warning.

Although, it has been described in the above embodiments to provide a speed trap detection and warning system having two operating modes, the second operating mode (as described with reference to FIGS. 6, 11, 17, 21, 25 and 29) may be omitted. In the case that the second operating mode is omitted, the second database store 50 is also omitted.

Although it has been described in the above embodiments with reference to FIGS. 5, 10, 16, 20, 24 and 28 to display the road number of the road 3 on which the vehicle 9 is travelling at step S5-19 (and equivalent steps), this is not essential to the operation of the invention and may be omitted.

In the above embodiments, it has been described to store the telephone number for the remote database 55 in the first database store 49. However, this number may alternatively be stored in the second database store 50 or in a further separate store.

In the above embodiments, it has been described to store the type of each speed trap for display to the user as the vehicle 9 approaches a trap. However, this function is not essential to the operation of the invention and may therefore be omitted.

In the above embodiments, it is described to use the input buttons 29, 69 to adjust the volume of audible alerts to be emitted from speaker 27. It is further possible to provide a mute function such that audible alerts can be switched OFF completely. It is also possible to provide a function such that, the first time that an audible alert is emitted with respect to a given speed trap 5,6, the alert is emitted at a first volume, and all further audible alerts with respect to the given speed trap 5,6 are emitted at a second volume.

In the above embodiments, it has been described with reference to FIGS. 5 and 6 (and equivalent Figures) to display the current calculated vehicle speed at steps S5-4 and S6-4 (or equivalent steps). It is additionally possible to display the current direction of travel of the vehicle 9 at either or both of those steps in addition to or instead of the current speed.

It is also possible to provide a function for adding a speed trap to the database contained in the speed trap detection and warning system manually. The user would be required to press a button on the speed trap detection and warning system (or part thereof) which is in the vehicle 9 as the vehicle 9 is driven past a speed trap site which is not already stored in the first database store 49. The user would also enter the speed limit at the speed trap, the direction of operation of the speed trap and the number of the road on which the speed trap is located. These data would be stored both for use by the speed trap detection and warning system and for uploading to the remote database 55 as part of the update function.

In the fourth to seventh embodiments described above, location system control computer 109 could be part of a base station 101 or part of a location system reference station 107.

In the fourth to seventh embodiments described above, the location, speed and direction of travel of the vehicle 9 are calculated within the same unit (that is, within mobile telephone 61 or location system control computer 109). However, it is possible for these parameters to be calculated in different units. For example, the position of the vehicle 9 may be calculated in one unit (for example mobile telephone 61) and the speed and direction of travel of the vehicle may be calculated in a different unit (for example location system control computer 109).

It has been described above in the second to seventh embodiments that a mobile telephone 61 performs at least some functions of the speed trap detection and warning system, displays information to a user using its internal display 65, provides audio alerts to a user using internal speaker 67, and receives input from a user using input buttons 69. However, referring to FIG. 31 a separate display and input unit 151 may be provided for this purpose. The separate display and input unit 151 has a display 153 a speaker 155 and input buttons 157. It connects to mobile telephone 61 a via cable 159. Separate display and input unit 151 may optionally also incorporate processing functions described with reference to the above embodiments to be undertaken by mobile telephone 61.

The invention claimed is:

1. A speed trap detection and warning system for a vehicle, comprising:
   a signal processor operable to receive signals and to process the received signals to generate vehicle location data defining the location of the vehicle;
   a travel parameter calculator operable to calculate vehicle bearing data defining the direction of travel of the vehicle;
   a data store configured to store location data defining a respective location for each of a plurality of speed traps and speed trap bearing data defining a respective operating direction for each of the speed traps;
   a location comparer operable to compare the vehicle location data with the stored locations data to determine the distance of the vehicle from a stored location and operable to determine whether to alert the user in dependence upon an alert threshold;
   a direction data processor operable to use the calculated vehicle bearing data and the stored speed trap bearing data to determine whether to alert the user in dependence upon whether the vehicle is travelling in a direction in which a speed trap is operational; and
   an alerter operable to alert a user to the presence of a speed trap, the alerter being controlled, in use, to alert the user if it is determined by both the location comparer and the direction data processor that the user is to be alerted.

2. A system according to claim 1, wherein:
   the travel parameter calculator is operable to generate vehicle bearing data defining a range of directions representing the direction of travel of the vehicle;
   the data store is configured to store speed trap bearing data for each speed trap defining a range of operating directions; and
   the direction data processor is operable to compare the range of directions representing the direction of travel of the vehicle with the stored range of directions for a speed trap, and is arranged to determine tat the vehicle is travelling in a direction in which the speed trap is operational if there is an overlap in the ranges.

3. A system according to claim 1, wherein:
   the travel parameter calculator is operable to calculate the speed of travel of the vehicle;
   the data store is configured to store data defining the respective road speed limit at the location of each of the speed traps;
   the system further comprises a speed comparer operable to compare the calculated speed of the vehicle with the stored road speed limit data to determine whether to alert the user in dependence upon whether the vehicle is travelling at a speed above the road speed limit at a speed trap; and
   the alerter is controlled, in use, to alert the user if the location comparer, the direction data processor and the speed comparer all determine that the user is to be alerted.

4. A system according to claim 1, wherein:
   the system further comprises an approach calculator operable to determine whether the vehicle is travelling towards or away from a speed trap and operable to determine whether to alert the user in dependence thereon; and
   the alerter is controlled, in use, to alert the user if the location comparer, the direction data processor and the approach calculator all determine that the user is to be alerted.

5. A system according to claim 1, wherein the signal processor is operable to process satellite signals to generate the vehicle location data.

6. A system according to claim 1, wherein the signal processor is operable to process signals transmitted between a plurality of transmitters, a receiver at a known location and a receiver in the vehicle to generate the vehicle location data.

7. A system according to claim 6, wherein the signal processor is operable to process signals defining the relative timing at signals transmitted from a plurality of transmitters in a mobile telecommunications network to a receiver at a known location and a receiver in the vehicle to generate the vehicle location data.

8. A system according to claim 1, wherein:
   the data store is configured to store the respective road speed limit at the location of each of the speed traps; and
   the system includes a controller operable to read the road speed limit at a speed trap and inform the user thereof when the user is alerted to the presence of the speed trap by the alerter.

9. A system according to claim 1, wherein:
the data store is configured to store the respective road number at the location of each of the speed traps; and
the system includes a controller operable to read the number of the road on which a speed trap is located and inform the user thereof when the user is alerted to the presence of the speed trap by the alerter.

10. A system according to claim 1, further comprising a distance calculator operable to calculate and inform the user of the distance between the speed trap and the vehicle when the user is alerted to the presence of the speed trap by the alerter.

11. A system according to claim 1, further comprising:
a speed calculator operable to process the received signals to determine the speed of travel of the vehicle; and
a controller operable to display to the user on a display the determined speed of travel.

12. A system according to claim 1, wherein:
the data store is configured to store data defining the respective type of each of the speed traps; and
the system includes a controller operable to read the type of the speed trap and inform the user thereof when the user is alerted to the presence of the speed trap by the alerter.

13. A system according to claim 1, further comprising an interface controller operable to interface with a remote data store when the system or part thereof is connected thereto, the interface controller being operable to send request data to the remote data store, receive location and speed trap bearing data from the remote data store, and store the received data in the data store.

14. A system according to claim 1, further comprising an electromagnetic wave detector operable to detect electromagnetic waves of predetermined frequencies incident thereon, and wherein the system is operable to enable the electromagnetic wave detector for operation when it is determined by both the location comparer the direction data processor that the user is to be alerted.

15. A system according to claim 14, wherein:
the data store is configured to store the respective type of each of the speed traps; and
the system is operable to enable the electromagnetic wave detector for operation when it is determined by both the location comparer and the direction data processor that the user is to be alerted, and it is also determined that the speed trap is of a predetermined type.

16. A system according to claim 1, wherein the location data and speed trap data of each of a plurality of speed traps is stored in the data store.

17. A system according to claim 1, wherein the signal processor, travel parameter calculator, data store, location comparer, direction data processor and alerter are provided in one or more units for carrying in the vehicle.

18. A system according to claim 1, wherein the components thereof are divided between one or more units remote from the vehicle and one or more units for carrying in the vehicle, the unit(s) remote from the vehicle being operable to communicate with the unit(s) for carrying in the vehicle.

19. A system according to claim 18, wherein the signal processor, travel parameter calculator, data store, location comparer and direction data processor are provided in one or more units remote from the vehicle and the alerter is provided in one or more units for carrying in the vehicle, the unit(s) remote from the vehicle being operable to communicate with the unit(s) for carrying in the vehicle.

20. A system according to claim 18, wherein the signal processor and travel parameter calculator are provided in one or more units remote from the vehicle, and the data store, location comparer, direction data processor and alerter are provided in one or more units for carrying in the vehicle, the unit(s) remote from the vehicle being operable to communicate with the unit(s) for carrying in the vehicle.

21. A system according to claim 18, wherein the signal processor, travel parameter calculator, and alerter are provided in one or more units for carrying in the vehicle and the data store, location comparer and direction data processor are provided in one or more units remote from the vehicle, the unit(s) remote from the vehicle being operable to communicate with the unit(s) for carrying in the vehicle.

22. A speed trap detection and warning apparatus, comprising:
a signal processor operable to receive signals and to process the received signals to generate vehicle location data defining the location of a vehicle;
a travel parameter calculator operable to calculate vehicle bearing data defining the direction of travel of the vehicle;
a data store configured to store location data defining a respective location for each of a plurality of speed traps and speed trap bearing data defining a respective operating direction for each of the speed traps;
a location comparer operable to compare the vehicle location data with the stored location data to determine the distance of the vehicle from a stored location and operable to determine whether to alert the user in dependence upon an alert threshold;
a direction data processor operable to use to calculated vehicle bearing data and the stored speed trap bearing data to determine whether to alert the user in dependence upon whether the vehicle is travelling in a direction in which a speed trap is operational; and
a signal generator operable to generate a signal for transmission to an apparatus within the vehicle for causing the receiving apparatus to alert the user to the presence of a speed trap, the signal generator being controlled, in use, to generate a signal if it is determined by both the location comparer and the direction data processor that the user is to be alerted.

23. A speed trap detection and warning apparatus for carrying in a vehicle, comprising:
a signal receiver operable to receive signals defining the location and direction of travel of the vehicle;
a data store configured to store location data defining a respective location for each of a plurality of speed traps and speed trap bearing data defining a respective operating direction for each of the speed traps;
a location comparer operable to compare the location defined in the received signals with the stored location data to determine the distance of the vehicle from a stored location and operable to determine whether to alert the user in dependence upon an alert threshold;
a direction data processor operable to use the direction of travel defined in the received signals and the stored speed trap bearing data to determine whether to alert the user in dependence upon whether the vehicle is travelling in a direction in which a speed trap is operational; and
an alerter operable to alerting a user to the presence of a speed trap, the alerter being controlled, in use, to alert the user if it is determined by both the location comparer and the direction data processor that the user is to be alerted.

24. A speed trap detection and warning apparatus comprising:
- a signal receiver operable to receive signals defining the location and direction of travel of a vehicle;
- a data store configured to store location data defining a respective location for each of a plurality of speed traps and speed trap bearing data defining a respective operating direction for each of the speed traps;
- a location comparer operable to compare the location defined in the received signals with the stored location data to determine the distance of the vehicle from a stored location and operable to determine whether to alert the user in dependence upon an alert threshold;
- a direction data processor operable to use the direction of travel of the vehicle defined in the received signals and the stored speed trap bearing data to determine whether to alert the user in dependence upon whether the vehicle is travelling in a direction in which a speed trap is operational; and
- a signal generator operable to generate a signal for transmission to an apparatus within the vehicle for causing the receiving apparatus to alert the user to the presence of a speed trap, the signal generator being controlled, in use, to generate a signal if it is determined by both the location comparer and the direction data processor that the user is to be alerted.

25. A method of alerting the driver of a vehicle to the presence of a speed trap, comprising:
- processing signals to generate vehicle location data defining the location of the vehicle;
- calculating vehicle bearing data defining the direction of travel of the vehicle;
- a location alert determining process of comparing the vehicle location data with stored location data defining a respective location for each of a plurality of speed traps; to determine the distance of the vehicle from a stored location and to determine whether to alert the user in dependence upon an alert threshold; a direction alert determining process of using the calculated vehicle bearing data and stored speed trap bearing data defining a respective operating direction for each speed trap to determine whether to alert the user in dependence upon whether the vehicle is travelling a direction in which a speed trap is operational; and
- alerting the driver to the presence of a speed trap when it is determined in both the location alert determining process and the direction alert determining process that the user is to be alerted.

26. A speed trap detection and warning system for a vehicle, comprising:
- signal processing means for receiving signals and for processing the received signals to generate vehicle location data defining the location of the vehicle;
- travel parameter calculating means for calculating vehicle bearing data defining the direction of travel of the vehicle;
- storage means far storing location data defining a respective location for each of a plurality of speed traps and speed trap bearing data defining a respective operating direction for each of the speed traps;
- location comparing means for comparing the vehicle location data with the stored locations data to determine the distance of the vehicle from a stored location and for determining whether to alert the user in dependence upon an alert threshold;
- direction data processing means for using the calculated vehicle bearing data and the stored speed trap bearing data to determine whether to alert the user in dependence upon whether the vehicle is travelling in a direction in which a speed trap is operational; and
- alerting means for alerting a user to the presence of a speed trap, the alerting means being controlled, in use, to alert the user if it is determined by both the location comparing means and the direction data processing means that the user is to be alerted.

27. A speed trap detection and warning apparatus, comprising:
- signal processing means for receiving signals and for processing the received signals to generate vehicle location data defining the location of a vehicle;
- travel parameter calculating means for calculating vehicle bearing data defining the direction of travel of the vehicle;
- storage means for storing location data defining a respective location for each of a plurality of speed traps and speed trap bearing data defining a respective operating direction for each of the speed traps;
- location comparing means for comparing the vehicle location data with the stored locations data to determine the distance of the vehicle from a stored location and for determining whether to alert the user in dependence upon an alert threshold;
- direction data processing means for using the calculated vehicle bearing data and the stored speed trap bearing data to determine whether to alert the driver in dependence upon whether the vehicle is travelling in a direction in which a speed trap is operational; and
- signal generating means for generating a signal for transmission to an apparatus within the vehicle for causing the receiving apparatus to alert the user to the presence of a speed trap, the signal generating means being controlled, in use, to generate a signal if it is determined by both the location comparing means and the direction data processing means that the user is to be alerted.

28. A speed trap detection and warning apparatus for carrying in a vehicle, comprising:
- means for receiving signals defining the location and direction of travel of the vehicle;
- storage means for storing location data defining a respective location for each of a plurality of speed traps and speed trap bearing data defining a respective operating direction for each of the speed traps;
- location comparing means for comparing the location defined in the received signals with the stored location data to determine the distance of the vehicle from a stored location and for determining whether to alert the user in dependence upon an alert threshold;
- direction data processing means for using the direction of travel defined in the received signals and the stored speed trap bearing data to determine whether to alert the user in dependence upon whether the vehicle is travelling in a direction in which a speed trap is operational; and
- alerting means for alerting a user to the presence of a speed trap, the alerting means being controlled, in use, to alert the user if it is determined by both the location comparing means and the direction data processing means that the user is to be alerted.

29. A speed trap detection and warning apparatus comprising:
- means for receiving signals defining the location and direction of travel of a vehicle;
- storage means far storing location data defining a respective location for each of a plurality of speed traps and speed tap bearing data defining a respective operating direction for each of the speed traps;

location comparing means for comparing the location defined in the received signals with the stored location data to determine the distance of the vehicle from a stored location and for determining whether to alert the user in dependence upon an alert threshold;

direction data processing means for using the direction of travel of the vehicle defined in the received signals and the stored speed trap bearing data to determine whether to alert the user in dependence upon whether the vehicle is travelling in a direction in which a speed trap is operational; and signal generating means for generating a signal for transmission to an apparatus within the vehicle for causing the receiving apparatus to alert the user to the presence of a speed trap, the signal generating means being controlled, in use, to generate a signal if it is determined by both the location comparing means and the direction data processing means that the user is to be alerted.

30. A system according to claim 1, wherein the system is operable to change the alert threshold used by the location comparer in accordance with input from a user.

* * * * *

UNITED STATES PATENT AND TRADEMARK OFFICE
CERTIFICATE OF CORRECTION

PATENT NO.        : 7,183,942 B2
APPLICATION NO.   : 10/182291
DATED             : February 27, 2007
INVENTOR(S)       : Rock et al.

It is certified that error appears in the above-identified patent and that said Letters Patent is hereby corrected as shown below:

At Claim 2, Column 30, line 16, please replace "tat" with --that.--

At Claim 26, Column 33, line 57, please replace "far" with --for.--

Signed and Sealed this

Twenty-first Day of August, 2007

JON W. DUDAS
*Director of the United States Patent and Trademark Office*